United States Patent [19]

Skeels et al.

[11] Patent Number: 5,401,488
[45] Date of Patent: Mar. 28, 1995

[54] SUBSTITUTION OF SN IN PLACE OF AL IN THE FRAMEWORK OF MOLECULAR SIEVE VIA TREATMENT WITH FLUORIDE SALTS

[75] Inventors: Gary W. Skeels, Brewster; Diane M. Chapman, Ossining; Edith M. Flanigen, White Plains, all of N.Y.

[73] Assignee: UOP, Des Plaines, Ill.

[21] Appl. No.: 904,800

[22] Filed: Jun. 26, 1992

Related U.S. Application Data

[63] Continuation-in-part of Ser. No. 450,931, Dec. 14, 1989, abandoned, which is a continuation-in-part of Ser. No. 133,372, Dec. 15, 1987, abandoned.

[51] Int. Cl.⁶ .............................................. C01B 33/34
[52] U.S. Cl. ...................................... 423/715; 423/713; 423/DIG. 21; 423/DIG. 25; 423/DIG. 28; 502/77; 502/78; 502/79; 502/85
[58] Field of Search ............... 423/326, 328, 329, 330, 423/118, 700, 713, 714, 715, DIG. 21, DIG. 25, DIG. 28; 502/60, 78, 79, 85, 86, 77

[56] References Cited

U.S. PATENT DOCUMENTS

| | | | |
|---|---|---|---|
| 3,130,007 | 4/1964 | Breck | 423/328 |
| 3,216,789 | 11/1965 | Breck et al. | 423/328 |
| 3,308,069 | 3/1967 | Wadlinger et al. | 423/328 |
| 3,442,795 | 5/1969 | Kerr et al. | 208/120 |
| 3,493,519 | 2/1970 | Kerr et al. | 423/328 |
| 3,506,400 | 4/1970 | Eberly, Jr. et al. | 423/328 |
| 3,513,108 | 5/1970 | Kerr | 423/328 |
| 3,594,331 | 7/1971 | Elliott, Jr. | 502/60 |
| 3,640,681 | 2/1972 | Pickert | 423/328 |
| 3,702,886 | 11/1972 | Argauer et al. | 423/328 |
| 3,941,871 | 3/1976 | Dwyer et al. | 423/328 |
| 3,992,466 | 11/1976 | Plank et al. | 423/328 |
| 4,086,186 | 4/1978 | Rubin et al. | 423/328 |
| 4,241,036 | 12/1980 | Flanigen et al. | 423/328 |
| 4,257,885 | 3/1981 | Grose et al. | 423/308 |
| 4,329,328 | 5/1982 | McAnespie et al. | 423/326 |
| 4,405,502 | 9/1983 | Klotz | 502/73 |
| 4,503,023 | 3/1985 | Breck et al. | 423/328 |
| 4,610,856 | 9/1986 | Skeels et al. | 423/328 |
| 4,711,770 | 12/1987 | Skeels et al. | 423/328 |
| 4,840,779 | 6/1989 | Cannan | 423/328 |
| 4,933,161 | 6/1990 | Vaughan et al. | 423/328 |

FOREIGN PATENT DOCUMENTS

| | | |
|---|---|---|
| 1127134 | 7/1982 | Canada .................................. 423/328 |
| 13630 | 7/1980 | European Pat. Off. . |
| 14059 | 8/1980 | European Pat. Off. . |
| 902354 | 5/1986 | European Pat. Off. . |
| 904614 | 6/1987 | European Pat. Off. . |
| 2831630 | 2/1980 | Germany . |
| 2024790 | 1/1980 | United Kingdom . |

OTHER PUBLICATIONS

Tielen et al., "Isomorphic Substitution in Zeolites . . . ", Proc. Int. Symp. Zeolite Catal., Siofok, Hungary, May 13, 1985, pp. 1–18.
Breck et al., "Zeolite Chemistry II . . . ", Molecular Sieves II, ACS Symp. Ser., 40, pp. 271–280 (1977).
Brunauer et al., "Adsorption of Gasps in Multimolecular Layers", JACS, vol. 60, pp. 309–319 (1938).
Skeels et al., "Zeolite Chemistry V . . . ", Proc. 6th Int. Zeolite Conf., Ed. Olson et al., Butterworth & Co., Ltd., pp. 87–96 (1984).
Szoskak et al., "Incorporation and Stability of Iron . . . ", JCS Far. Trans. I, vol. 83, pp. 487–494 (1987).

*Primary Examiner*—R. Bruce Breneman
*Attorney, Agent, or Firm*—Thomas K. McBride; Eugene I. Snyder; Frank S. Molinaro

[57] ABSTRACT

Molecular sieve compositions are prepared by extracting aluminum and substituting chromium and/or tin for extracted aluminum to give molecular sieve products containing framework chromium and/or tin atoms. The process of preparing the chromium and/or tin-containing molecular sieves involves contacting a starting molecular sieve with a solution or slurry of at least one of a fluoro salt of chromium or a fluoro salt of tin under effective process conditions to provide for aluminum extraction and substitution of chromium and/or tin.

4 Claims, 15 Drawing Sheets

SUBSTITUTION OF SN IN PLACE OF AL IN THE FRAMEWORK OF MOLECULAR SIEVE VIA TREATMENT WITH FLUORIDE SALTS

CROSS REFERENCE TO RELATED APPLICATIONS

This patent application is a Continuation-in-Part of prior U.S. Patent application Ser. No. 07/450,931, filed on Dec. 14, 1989, now abandoned, which in turn is a continuation-in-part of U.S. patent application Ser. No. 07/133,372, filed on Dec. 15, 1987, now abandoned.

FIELD OF THE INVENTION

The instant invention relates to molecular sieve compositions, the method for their preparation and to processes employing them. More particularly it relates to molecular sieve compositions topologically related to prior known molecular sieves but which are characterized as containing framework atoms of tin, and preferably having a very low content of defect sites in the structure, as hereinafter disclosed. In general the preparative process involves contacting a molecular sieve preferably with an aqueous solution of a fluoro salt of tin, preferably a fluoro salt which does not form insoluble salts with aluminum, under conditions suitable to insert tin for aluminum in the framework.

BACKGROUND OF THE INVENTION

The crystal structures of naturally occurring and as-synthesized zeolitic aluminosilicates are composed of $AlO_4^-$ and $SiO_4$ tetrahedra which are cross-linked by the sharing of oxygen atoms. The term $AlO_4^-$, $SiO_4$ and the like, are used to depict the tetrahedral atoms Al, Si and others, in four-fold coordination with oxygen, within the framework of the zeolite. It is understood that each of the four oxygen atoms thus depicted is linked to an additional tetrahedral atom, thus completing the charge requirements placed on each tetrahedral unit. The electrovalence of each tetrahedron containing an aluminum atom is balanced by association with a cation. Most commonly this cation is a metal cation such as $Na^+$ or $K^+$ but organic species such as quaternary ammonium ions are also employed in zeolite synthesis and in some instances appear as cations in the synthesized product zeolite. In general the metal: cations are, to a considerable extent at least, replaceable with other cations including $H^+$ and $NH_4^+$. In many instances the organic cation species are too large to pass through the pore system of the zeolite and hence cannot be directly replaced by ion exchange techniques. Thermal treatments can reduce these organic cations to $H^+$ or $NH_4^+$ cations which can be directly ion-exchanged. Thermal treatment of the $H^+$ or $NH_4^+$ cationic forms of the zeolites can result in the substantial removal of these cations from their normal association with the $AlO_4^-$ tetrahedra thereby creating an electrovalent imbalance in the zeolite structure which must be accompanied by structural rearrangements to restore the electrovalent balance. Commonly when $AlO_4^-$ tetrahedra constitute about 40% or more of the total framework tetrahedra, the necessary structural rearrangements cannot be accommodated and the crystal structure collapses. In more siliceous zeolites, the structural integrity is substantially maintained but the resulting "decationized" form has certain significantly different properties from its fully cationized precursor.

The relative instability of aluminum in zeolites, particularly in the non-metallic cationic or the decationized form, is well recognized in the art. For example, in U.S. Pat. No. 3,640,681, issued to P. E. Pickert on Feb. 3, 1972, there is disclosed a process for extracting framework aluminum from zeolites which involves dehydroxylating a partially cation deficient form of the zeolite and then contacting it with acetylacetone or a metal derivative thereof to chelate and solubilize aluminum atoms. Ethylenediaminetetraacetic acid has been proposed as an extractant for extracting aluminum from a zeolite framework in a process which is in some respects similar to the Pickert process. It is also known that calcining the $H^+$ or $NH_4^+$ cation forms of zeolites such as zeolite Y in an environment of water vapor, either extraneous or derived from dehydroxylation of the zeolite itself, is effective in removing framework aluminum by hydrolysis. Evidence of this phenomenon is set forth in U.S. Pat. No. 3,506,400, issued Apr. 14, 1970 to P. E. Eberly, Jr. et al.; U.S. Pat. No. 3,493,519, issued Feb. 3, 1970 to G. T. Kerr et al.; and U.S. Pat. No. 3,513,108, issued May 19, 1970 to G. T. Kerr. In those instances in which the crystal structure of the product composition is retained after the rigorous hydrothermal treatment infrared analysis indicated the presence of substantial hydroxyl groups exhibiting a stretching frequency in the area of about 3740, 3640 and 3550 $cm^{-1}$. The infrared analytical data of U.S. Pat. No. 3,506,400 is especially instructive in this regard. An explanation of the mechanism of the creation of these hydroxyl groups is provided by Kerr et al. in U.S. Pat. No. 3,493,519, wherein the patentees state that the aluminum atoms in the lattice framework of hydrogen zeolites can react with water resulting in the removal of aluminum from the lattice in accordance with the following equation:

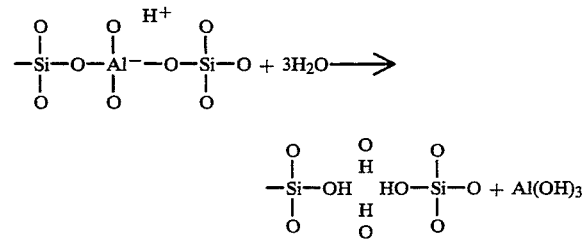

The aluminum removed from its original lattice position is capable of further reaction with cationic hydrogen, according to Kerr et al. to yield aluminum-containing i.e., hydroxoaluminum, cations by the equation:

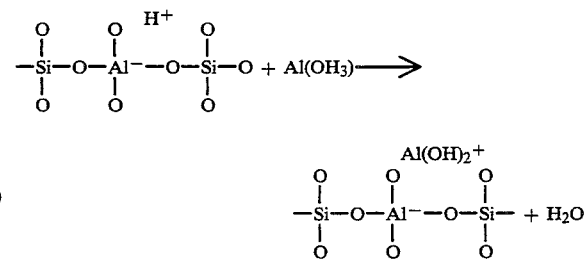

It has been suggested by Breck, D. W. and Skeels, G. W., "Zeolite Chemistry II. The Role of Aluminum in the Hydrothermal Treatment of Ammonium-Exchanged Zeolite Y, Stabilization", Molecular Sieves—II, A. C. S. Symposium Series 40, pages 271 to 280

(1977), that stabilization of NH$_4$Y occurs through hydrolysis of sufficient framework aluminum to form stable clusters of these hydroxoaluminum cations within the sodalite cages, thereby holding the zeolite structure together while the framework anneals itself through the migration of some of the framework silicon atoms.

It is alleged in U.S. Pat. No. 3,594,331, issued Jul. 20, 1971 to. C. H. Elliott, that fluoride ions in aqueous media, particularly under conditions in which the pH is less than about 7, are quite effective in extracting framework aluminum from zeolite lattices, and in fact when the fluoride concentration exceeds about 15 grams active fluoride per 10,000 grams of zeolite, destruction of the crystal lattice by the direct attack on the framework silicon as well as on the framework aluminum can result. A fluoride treatment of this type using from 2 to 22 grams of available fluoride per 10,000 grams of zeolite (anhydrous) in which the fluorine is provided by ammonium fluorosilicate is also described therein. The treatment is carried out for the purpose of improving the thermal stability of the zeolite. It is theorized by the patentee that the fluoride in some manner becomes attached to the constructional alkali metal oxide, thereby reducing the fluxing action of the basic structural Na$_2$O which would otherwise result in the collapse of the crystal structure. Such treatment within the constraints of the patent disclosure has no effect on either the overall silicon content of the zeolite product or the silicon content of a unit cell of the zeolite.

Since stability is quite obviously, in part at least, a function of the Al$_2$O$_3$ content of the zeolite framework, it would appear to be advantageous to obtain zeolites having lower proportions of Al$_2$O$_3$ while avoiding the structural changes inherent in framework aluminum extraction. Despite considerable effort in this regard, however, only very modest success has been achieved, and this has applied to a few individual species only.

A process for increasing the SiO$_2$/Al$_2$O$_3$ ratio in zeolites is disclosed in: commonly assigned U.S. Pat. No. 4,503,023, issue date Mar. 5, 1985; commonly assigned U.S. Pat. No. 4,610,856, issue date Sep. 9, 1986, U.S. Pat. No. 4,711,770, issue date Dec. 8, 1987 (U.S. patent application Ser. No. 880,103, filed Jun. 30, 1986), and in Skeels, G. W. and Breck, D. W. "Proceedings of the Sixth International Zeolite Conference", edited by David Olson and Attilio Bisio, Butterworth & Co. Ltd., pages 87 to 96 (1984). The process disclosed therein comprises inserting silicon atoms as SiO$_4$ tetrahedra into the crystal lattice of an aluminosilicate having a SiO$_2$/Al$_2$O$_3$ molar ratio of at least 3 and pore diameters of at least 3 Angstroms with a fluoro-silicate salt in an amount of at least 0.0075 moles per 100 grams of the zeolitic aluminosilicate on an anhydrous basis, said fluorosilicate salt being in the form of an aqueous solution having a pH value within the range of 3 to about 7 and brought into contact with the zeolitic aluminosilicate at a rate sufficiently slow to preserve at least 60 percent of the crystallinity of the starting zeolitic aluminosilicate.

Commonly assigned U.S. Pat. No. 4,892,720 describes ammonium fluoride salts of the metal cations iron and/or titanium which are used to treat the zeolites in an aqueous medium. Framework aluminum is complexed by the fluoride and removed from the zeolite. The metal cation is inserted into the framework in place of the aluminum.

Various attempts have been made to substitute chromium or tin into a zeolite framework via primary synthesis methods but none have been truly successful so far. Attempts to synthesize zeolites of the pentasil family of zeolites (ZSM-5 like) with a number of ions other than aluminum have been made. In some cases chromium or tin is found with the zeolite but not in the framework of the zeolite. The likelihood that either chromium or tin is not a part of the zeolite framework in primary synthesis products rests on the fact that such a high pH is required for synthesis that it is probable that the chromium or tin are present as oxides and/or hydrous oxides. For example, in U.S. Pat. No. 4,405,502 (Klotz) discloses the presence of up to 12.40 weight percent of Cr$_2$O$_3$ with the crystalline chromosilicate (Example IV), but the Cr$_2$O$_3$ in the product is present as amorphous or crystalline oxides. The examples teach that the chromium, initially dissolved in water, is rapidly precipitated as the hydroxide before ever coming in contact with the silica source. Further, "these results show that as the chromium factor became larger, more and more Cr$_2$O$_3$ was detected in the product." (Column 24, lines 15–17.)

Marosi et al., in German Patent No. 2,831,630, disclose the presence of between 0.50 weight percent and 3.00 weight percent of Cr$_2$O$_3$ with a ZSM-5 type structure. The amount of chromium that would be included in the framework of the ZSM-5, if indeed it were located therein, would range from 0.4 to 2.5 atoms out of 100 framework tetrahedral atoms. In the only Example where a product composition is given (1), the solid product would contain only 0.7 Cr atoms out of 100 in the framework, a value less than the compositions of the present invention. In Example 2 of U.K. Patent Application GB 2,024,790, (Taramasso et al.), a 6.00 weight percent of Cr$_2$O$_3$ with a ZSM-5 type structure was obtained and which was designated "TRS-28". While the claims teach that the chromium atoms either, "entered the crystalline lattice in place of silicon atoms" or "in the form of salts of bisilicic or polysilicic acids", the evidence presented in the examples fairly teach that the chromium is not within the lattice framework of the ZSM-5 product. Surface areas of all of the products of the invention are given which indicate that there is a substantial reduction relative to a typical ZSM-5. This is evidence of some amorphous or dense phase present with the zeolite. Typically ZSM-5 or its' more siliceous analog silicalite will have a surface area, (BET), of greater than 400 square meters per gram. The chromium containing product of the U.K. Patent Application GB 2,024,790, had a surface area (BET) of 380 square meters per gram, a value at least 5% less than what might be expected of a pure zeolite sample. Additionally, the chromium containing product of said invention containing 6.0 weight percent Cr$_2$O$_3$ would be expected to have an ion exchange capacity of 0.79 meq/gram, providing all of the chromium atoms were to be positioned in the framework in tetrahedral coordination with four oxygen atoms. However, only 0.0058 meq/gram of cations were actually found in the calcined (550° C.) product, a value at least two orders of magnitude less than what would be necessary to balance the framework negative charges, if chromium were indeed in the framework. In order for chromium to be in the framework in tetrahedral coordination with four oxygen atoms, it is a requirement that there be present a positively charged species or cation in order to balance the negative charge caused by the presence of the trivalent chromium ion sharing the negative charges on four separate oxygen atoms with silicon. Lacking the cation, it is not possible for the chromium to be tetrahedrally coordinated with oxygen in this way and hence, the chromium of this example is not in the framework of the zeolite synthesized in the example. The converse is not necessarily true, namely, that if a positively charged cation is found to balance the negative charge on the chromium to satisfy the requirement of tetrahedral coordination with oxygen, that the chromium is in the framework. It would be evident that the chromium is in tetrahedral coordination with oxygen, but it does not necessarily prove that the chromium is located in the zeolite framework. It is probable that, like amorphous aluminosilicates, the amorphous chromosilicates can have tetrahedrally coordinated chromium atoms and hence ion exchange capacity.

European Patent Application 13,630 (Rubin et al.) discloses the presence of between 0.63 weight percent and 2.90 weight percent of $Cr_2O_3$ with a ZSM-12 type structure. The samples described in the Tables of the patent application, particularly the products containing chromium, show a substantial loss of surface area. This indicates that the purity of the as-synthesized products is questionable and that they must contain amorphous material. A relative relationship can also be found in the Tables, namely that as the chromium content of the synthesis product increases, the reported X-ray crystallinity decreases.

In European Patent Application 14,059 (Rubin et al.) between 0.09 weight percent and 1.26 weight percent of $Cr_2O_3$ with a ZSM-11 type structure was obtained. Similar observations can be made with these products; that the products containing chromium have reduced X-ray crystallinity, substantially reduced adsorption capacity for n-hexane and cyclohexane and substantially lower surface areas when compared to a product which does not contain chromium. Each observation taken alone would not preclude the incorporation of chromium in the ZSM-11 framework. However, taken together, these data are substantive evidence for the precipitation of an amorphous chromium containing phase with the zeolite, which under the very basic synthesis conditions employed is the expected result.

Dwyer et al. in U.S. Pat. No. 3,941,871 disclose the presence of tin in place of or as part of the organic template in a ZSM-5 type of a structure but not as a part of the ZSM-5 framework structure itself. In U.S. Pat. No. 4,329,328 (McAnespic et al.) the synthesis of a stannosilicate is suggested, but no examples of such synthesis are given nor are any properties of such materials suggested.

The above-mentioned references, while they may suggest the incorporation of the chromium or tin metal ions into the frameworks of the respective zeolites, provide consistent evidence that the metal ions are not included in the framework, and are merely precipitated with the zeolite as some other probably amorphous phase during the course of the synthesis process. Tielen et al. in "Proceedings of the International Symposium on Zeolite Catalysis", Siofok, Hungary, May 13, 1985, commented on isomorphic substitution in zeolites, stating that, "Generally speaking these new materials are claimed based upon their novel chemical composition or XRD spectrum or both. This novelty does not necessarily mean that the new materials contain the new element, or at least part of it, substituted in the zeolite framework. As far as we are aware, only in the case of boron substitution sound proof is available for its presence in the zeolite lattice." The reason for this failure is then obvious, since the very synthesis conditions used to synthesize the zeolite products are such that a nearly insoluble metal hydroxide precipitates thereby limiting the ability of the metal oxide to incorporate into the silicate units during crystal growth. This feature was only recently pointed out by Szostak et al. in Journal of Chemical Society, Faraday Trans. I, page 83 (1987). By recognizing the critical nature of the pH they were able to, for the first time, synthesize the ferrisilicate analog of ZSM-5.

It should be further pointed out that Tielen at the top of page 9 states "based on this table and the evidence mentioned in the introduction, elements with ionic radii between 0.020 and 0.061 are potential candidates for incorporation into a framework . . ." Using the values given for the Shannon references (radii in tetrahedral coordination) it is observed that $Sn^{+4}$ has an ionic radius of 0.069 nm or 0.69 Å (note that Shannon reports this value as the crystal radii) which is outside the range stipulated by Tielen and thus would not be expected to be in the framework. Although values for $Cr^{+3}$ and $Sn^{+2}$ are not provided in Tielen, they are provided by R. D. Shannon in his original paper (Acta Cryst. A 32, 751–767 (1976)) as $Cr^{+3}=0.755$ and $Sn^{+2}=1.36$. It should be noted that the values for $Cr^{+3}$ and $Sn^{+2}$ are for octahedral coordination and the number for tetrahedral coordination would be expected to be smaller. Further, the numbers presented by Tielen are the crystal radii (see Shannon Table 1, page 752). Accordingly, none of these metal ions would be expected to be in the framework.

Another reference which has been cited in this art is Canadian Patent No. 1,127,134 to Morrison. This reference discloses an "aluminosilicate zeolite" which contains a metal oxide selected from the group consisting of indium, boron, ruthenium, platinum, chromium, rare earth, vanadium, palladium, molybdenum, mercury, tellurium, silver and mixtures thereof. However, there is no mention or hint that these metals are or could be in the framework. Indeed, on page 6, lines 1–7, the patentees state that it is not known whether the metal is present as a metal or as a metal compound. Given this uncertainty, it would be pure speculation to state that Morrison discloses an aluminosilicate zeolite where some of the aluminum in the framework has been replaced by chromium or some other metal. Accordingly, there is nothing in Morrison that suggests a zeolite having chromium as a framework metal.

Finally, U.S. Pat. No. 4,933,161 (Vaughan) issued Jun. 12, 1990 discloses a process for replacing aluminum with tin (+4) in the zeolite framework. It is the inventor's contention that treating a zeolite with a tin compound under acidic hydrothermal conditions replaces some of the framework aluminum with tin. However, the conditions used by Vaughan would not result in framework aluminum being replaced by tin (+4). As will be shown in greater details int he examples, treating an ammonium Y zeolite by Vaughan's method gives a product that has lost a major fraction of its crystallinity and has virtually lost all of its cation equivalency indicating that considerable amounts of aluminum has been lost from the framework. In contrast, the molecular sieves of this ivnention retain at least 70% of their crystallinity and show only a small decrease in their cation equivalency. (See Examples 25 and 26).

The above mentioned references do suggest that it is desirable to synthesize zeolites or molecular sieves containing chromium or tin in the framework tetrahedral sites. However the methods employed in the references leave little doubt that the metal has been deposited with the zeolite either as an oxide or hydroxide or as an amorphous metal silicate. The references further demonstrate the difficulty involved in the incorporation of these metal ions in the zeolite tetrahedral framework positions. The uniqueness of the method of the current application which relies on the solubility of the chromium and tin metal ions in an acidic medium, and the Secondary Synthesis procedure to incorporate the metal ions into the framework is further demonstrated. As for the obviousness of the Secondary Synthesis procedure to incorporate any metal ion into the framework of an existing zeolite, all attempts to use this process with the ions of phosphorus or boron have thus far been unsuccessful. Boron is the only metal ion thus far that has been successfully incorporated into the pentasil zeolite framework via primary synthesis methods (Tielen et al.). Only by careful control of the Secondary Synthesis conditions can one be successful in incorporating iron and/or titanium, or chromium and/or tin into the framework of existing zeolites or molecular sieves.

Secondary Synthesis as used herein means a process whereby a molecular sieve product is treated by some method (Secondary Synthesis) to obtain a molecular sieve product that is either not obtainable by primary synthesis methods or is prepared with great difficulty or is not normally found in nature.

The present invention relates to novel zeolite compositions which contain significant framework tetrahedral atoms, which are not found to any significant level either in naturally occurring zeolites or in synthetic zeolites.

In the present invention, zeolite Y, zeolite L, mordenite and zeolite LZ-202 (an omega type zeolite prepared without the use of a templating agent as disclosed in U.S. Pat. No. 4,840,779) are treated with aqueous ammonium fluoride salts of either or both chromium or tin. During the treatment aluminum is removed from the molecular sieve framework and the metal ion is incorporated therein. By means of this invention, the metal ions of chromium and/or tin can be incorporated into molecular sieve frameworks where they are not normally found in nature.

SUMMARY OF THE INVENTION

Figure 13:
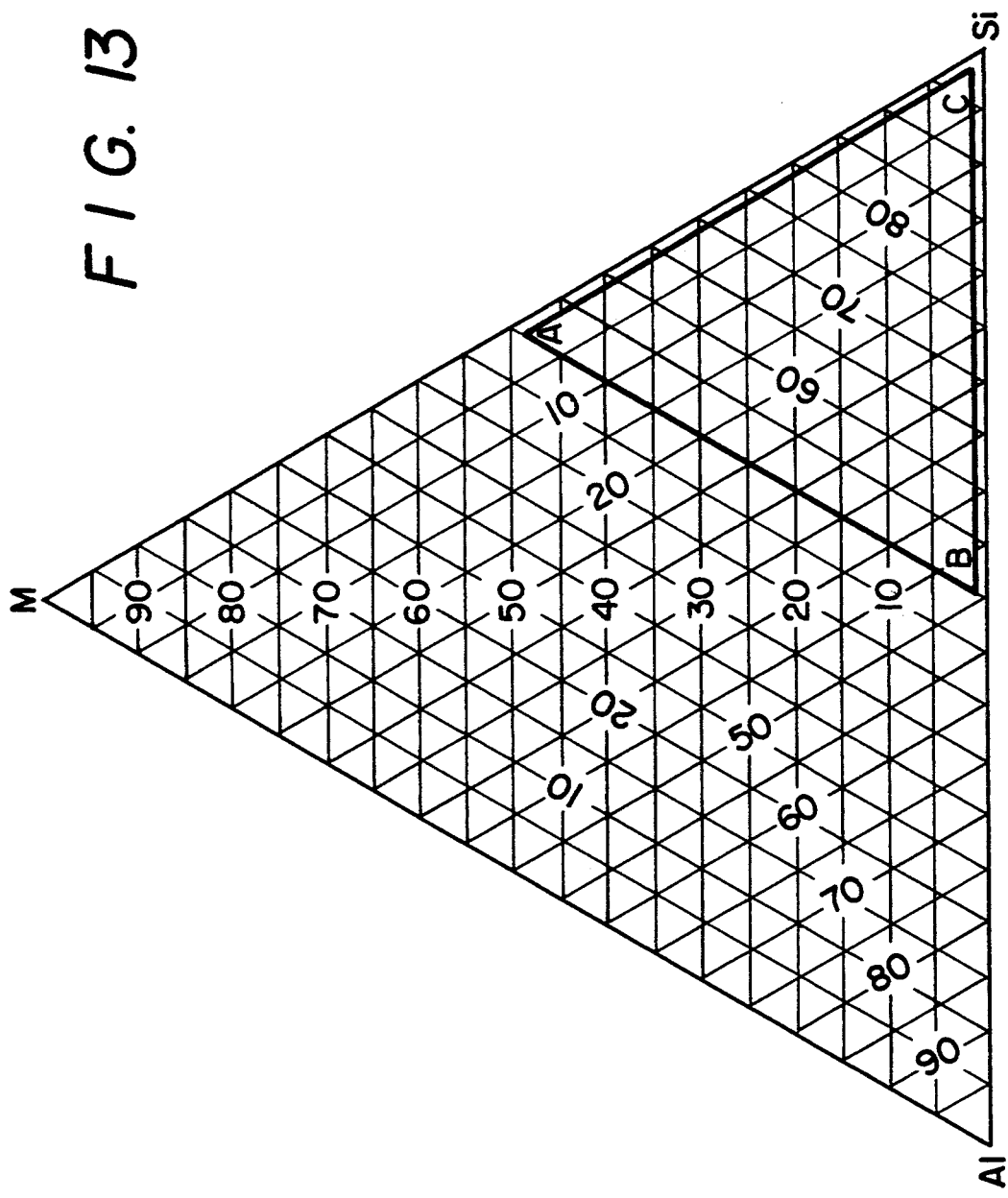
FIG. 13 is a ternary diagram wherein parameters relating to the instant compositions are set forth as mole fractions.

As stated this invention relates to a molecular sieve, a process for preparing the molecular sieve and processes which use the molecular sieve. Accordingly, one embodiment of the invention is a molecular sieve composition having a three-dimensional microporous framework structure which has a unit empirical formula on an anhydrous basis of:

$$(Sn_wAl_xSi_y)O_2$$

where "w", "x" and "y" are the mole fractions of tin, aluminum and silicon, respectively, present as framework tetrahedral oxide units said mole fractions being such that they are within the triagonal area defined by points A, B, and C of FIG. 13, which points have the following values of w, x and y:

| Point | w | x | y |
|-------|------|------|------|
| A | 0.49 | 0.01 | 0.50 |
| B | 0.01 | 0.49 | 0.50 |
| C | 0.01 | 0.01 | 0.98 | said molecular sieve characterized in that it has a cation equivalency of at least about 0.8 and an oxygen adsoprtion capacity of at least 70% of its theoretical capacity as measured at 100 torr and 90° K.

Another embodiment of the invention is a process for preparing a molecular sieve having a three dimensional microporous framework structure which has a unit empirical formula on an anhydrous basis of $$(Sn_wAl_xSi_y)O_2$$

where "w", "x" and "y" are the mole fractions of tin, aluminum and silicon, respectively, present as framework tetrahedral oxide units said mole fractions being such that they are within the triagonal area defined by points A, B, and C of FIG. 13, the process comprising contacting a crystalline microporous aluminosilicate zeolite having a framework structure of aluminum and silicon tetrahedral oxide units, pore diameters of at least about 3 Angstroms and a molar ratio of $SiO_2/Al_2O_3$ of at least 2, with a fluoro salt of tin, said fluoro salt being in the form of an aqueous solution or slurry, at a pH of about 3 to about 7 whereby framework aluminum atoms of the zeolite are removed and replaced by extraneous tin atoms.

Yet another embodiment of the invention is a molecular sieve prepared by the process described above and having an empirical formula on an anhydrous basis of $$(Al_{(a-N)}Si_bSn_c\square z)O_2$$

where "(a−N)" represents the mole fraction of aluminum atoms, "a" represents the mole fraction of aluminum atoms present in the framework of the zeolite and varies from about 0.01 to about 0.49, "N" represents the mole fraction of aluminum atoms removed from the framework of the zeolite and varies from about 0.01 to about 0.49, "b" represents the mole fraction of silicon and varies from about 0.5 to about 0.98, "c" represents the mole fraction of tin atoms and varies from about 0.01 to about 0.49; "$\square$" represents the framework defect sites; "z" represents the mole fraction of defect sites in the framework of the molecular sieve and varies from greater than zero to about 0.2; the molecular sieve characterized in that it has a cation equivalency of at least about 0.8, has retained at least 70% of the oxygen storage capacity of the zeolite at 100 torr and 90° K and the difference between the mole fraction of framework defect sites of the zeolite and the molecular sieve (Δz) is less than about 0.10.

A further embodiment of the invention is a molecular sieve having a three-dimensional microporous framework structure of tin, aluminum and silicon tetrahedral oxide units and which has a unit empirical formula on an anhydrous basis of $$Al_uSi_vSn_w\square z)O_2$$

where u is the mole fraction of aluminum and ranges from about 0.01 to about 0.49, v is the mole fraction of silicon and ranges from about 0.5 to about 0.98, w is the mole fraction of tin and ranges from about 0.01 to about 0.49, $\square$ is framework defect sites and z is the mole fraction of defect sites in the framework and ranges from greater than zero to about 0.2 characterized in that the molecular sieve has a cation equivalency of at least about 0.8 and an oxygen adsorption capacity of at least 70% of its theoretical capacity as measured at 100 torr and −183° C.

These and other objects and embodiments will become more apparent after a more detailed description of the invention.

DETAILED DESCRIPTION OF THE INVENTION

The present invention relates to new molecular sieve compositions and to the processes for their preparation. The molecular sieves of the instant invention have three-dimensional microporous crystal framework oxide structures of "$MO_2$", $AlO_2$ and $SiO_2$ in tetrahedral units which have a unit empirical formula on an anhydrous basis of:

$$(M_wAl_xSi_y)O_2 \qquad (1)$$

wherein "M" represents at least one of chromium or tin; and "w", "x" and "y" are as defined above represent the mole fractions of "M", aluminum and silicon, respectively, present as tetrahedral oxides.

The term "unit empirical formula" is used herein according to its common meaning to designate the simplest formula which gives the relative number of moles of chromium and/or tin (M), aluminum and silicon which form "$MO_2$", $AlO_2$, and $SiO_2$ tetrahedral units within the molecular sieve. The unit empirical formula is given in terms of chromium and/or tin, aluminum and silicon as shown in Formula (1), above, and does not include other compounds, cations or anions which may be present as a result of the preparation or the existence of other impurities or materials in the bulk composition not containing the aforementioned tetrahedral units.

The instant process generally comprises a method for removing framework aluminum from zeolites having $SiO_2/Al_2O_3$ mole ratios of about 2 or greater and substituting therefore one or more elements selected from the group consisting of chromium and/or tin. The resulting molecular sieves contain chromium and/or tin and have crystal structures similar to that of the initial zeolite.

The process of the invention comprises contacting a crystalline zeolite having pore diameters of at least about 3 Angstroms and having a molar $SiO_2/Al_2O_3$ ratio of at least 2, with an effective amount of at least one of a fluoro salt of chromium or a fluoro salt of tin, preferably in an amount of at least 0.001 moles per 100 grams of zeolite starting material, said fluoro salt being in the form of an aqueous solution or slurry and brought into contact with the zeolite either incrementally or continuously at a slow rate (optionally in the presence of a buffer) whereby framework aluminum atoms of the zeolite are removed and replaced by chromium and/or tin atoms. It is desirable that the process be carried out such that at least 60 percent, preferably at least 80 percent, and more preferably at least 90 percent of the crystal structure of the starting zeolite is retained and that the Defect Structure Factor (hereinafter defined) is increased by less than 0.10, and preferably by less than 0.08.

Crystalline zeolite starting materials suitable for the practice of the present invention can be any naturally occurring or synthetically produced zeolite species which have pores large enough to permit the passage of water, chromium and/or tin fluoro salts and reaction products through their internal cavity system. These materials can generally be represented, in terms of molar ratios of oxides, as $$M'_{2/n}O:Al_2O_3:xSiO_2:yH_2O$$

wherein "M'" is a cation having the valence "n", "x" is a value of at least about 2, and preferably about 3, and "y" has a value of from zero to about 9. This value of "y" depends upon the degree of hydration and the capacity of the particular zeolite to hold adsorbed water. Alternatively, the framework composition of the naturally occurring or synthetic zeolite starting material can be expressed in terms of the mole fraction of framework tetrahedra, $TO_2$, as:

$$(Al_aSi_b)O_2 \qquad (2)$$

wherein "a" is the mole fraction of framework tetrahedral sites occupied by aluminum atoms and "b" is the mole fraction of framework tetrahedral sites occupied by silicon atoms. Should the framework of the starting material contain atoms in addition to silicon and aluminum, these materials may be similarly expressed in terms of their "$TO_2$" formula in terms of their fractional occupation of the framework of the starting material. The algebraic sum of all of the subscripts within the brackets is equal to 1. In the above example, $a+b=1$.

Representative of the crystalline aluminosilicate zeolite molecular sieves include, but are not limited to erionite, mordenite, clinoptilolite, zeolite Y, zeolite L, zeolite LZ-202 (an omega type zeolite prepared without the use of a templating agent as disclosed in European Patent U.S. Pat. No. 4,840,779), zeolite omega, zeolite beta, zeolite TMA offretite, LZ-105, ZSM-5, ZSM-34 and ZSM-35. Zeolite Y is disclosed in U.S. Pat. No. 3,130,007; zeolite L is disclosed in U.S. Pat. No. 3,216,789; LZ-105 is disclosed in U.S. Pat. No. 4,257,885; zeolite omega is disclosed in U.S. Pat. No. 4,241.036; zeolite beta is disclosed in U.S. Pat. No. 3,308,069; ZSM-5 is disclosed in U.S. Pat. No. 3,702,886; ZSM-34 is disclosed in U.S. Pat. No. 4,086,186; and ZSM-35 is disclosed in U.S. Pat. No. 3,992,466. Both naturally occurring and synthetically prepared zeolite molecular sieves can be used.

For reasons more fully explained hereinafter, the starting zeolite should be able to withstand the initial loss of framework aluminum atoms to at least a modest degree without collapse of the crystal structure unless the process is to be carried out at a very slow rate, or the process is to be buffered. In general the ability to withstand aluminum extraction and maintain a high level of crystallinity is directly proportional to the initial $SiO_2/Al_2O_3$ molar ratio of the zeolite. Accordingly, it is preferred that the $SiO_2/Al_2O_3$ ratio is preferably at least about 2.0, and more preferably about 3. It is also preferred that at least about 50 percent, and more preferably at least 95 percent of the $AlO_4^-$ tetrahedra of the naturally occurring or as-synthesized zeolite are present in the starting zeolite. Most advantageously the starting zeolite contains as many as possible of its original $AlO_4^-$ tetrahedra, i.e. the starting zeolite has not been subjected to any post-formation treatment which either extensively removes aluminum atoms from their original framework sites or converts them from the normal conditions of 4-fold coordination with oxygen.

The cation population of the starting zeolite is not a critical factor insofar as substitution of chromium and-/or tin for framework aluminum is concerned, but since the substitution mechanism may involve the in situ formation of salts of at least some of the zeolitic cations, it is generally advantageous that these salts be water-soluble to a substantial degree to facilitate their removal from the molecular sieve product. It is found that ammonium or hydronium cations form the most soluble salts in this regard and it is accordingly preferred that partially or at least 50 percent, most preferably 85 or more percent, of the zeolite cations be ammonium or hydronium cations. Sodium, one of the most common cations present in zeolites, is found to form $Na_3AlF_6$, which is only very sparingly soluble in either hot or cold water. When this compound is formed as precipitates within the structural cavities of the zeolite it is quite difficult to remove by water washing. Its removal, moreover, is important if thermal stability of the molecular sieve product is desired since substantial amounts of fluoride can cause crystal collapse at temperatures as low as 500° C.

For purposes of simplifying the description of the products of the above process, as above defined the framework composition of the zeolite starting material and the products of the instant process are expressed in terms of mole fractions of framework tetrahedra, i.e., the "$TO_2$", where T represents the substituting tetrahedral atom in the framework. The starting zeolite may be expressed as:

$$(Al_aSi_b\square_z)O_2$$

whereas "a" is the mole fraction of aluminum tetrahedra in the framework; "b" is the mole fraction of silicon tetrahedra in the framework; "$\square$" denotes defect sites in the framework; and "z" is the mole fraction of defect sites in the zeolite framework. In many cases the "z" value for the starting zeolite is zero and the defect sites are simply eliminated from the expression. Numerically the sum of the values $a+b+z=1$.

If defect sites are present, the molecular sieves of this invention can have a unit empirical formula expressed in terms of the mole fractions of framework tetrahedra $(TO_2)$ of:

$[Al_uSi_vM_w\square_z]O_2$ where u is the mole fraction of aluminum and ranges from about 0.01 to about 0.5, v is the mole fraction of silicon and ranges from about 0.5 to about 0.98, M is chromium, tin or mixtures thereof, w is the mole fraction of M and ranges from about 0.01 to about 0.49, is framework defect sites and z is the mole fraction of defect sites in the framework and ranges from greater than zero to about 0.2.

When the molecular sieves of this invention are prepared by the specific process of this invention, then the molecular sieve can have a unit empirical formula expressed in terms of the mole fractions of tetrahedra ($TO_2$) of:

$[Al_{(a-N)}Si_bM_c\square_z]O_2$ wherein: "N" is defined as the mole fraction of aluminum tetrahedra removed from the framework during the treatment and varies from about 0.01 to about 0.49; "a" is the mole fraction of aluminum tetrahedra present in the framework of the starting zeolite and varies from about 0.01 to about 0.49; "b" is the mole fraction of silicon tetrahedra present in the framework of the zeolite and varies from about 0.5 to about 0.98; "$\square$" is the framework defect sites; "z" is the mole fraction of defect sites in the framework and varies from greater than zero to about 0.2; "M" denotes chromium and/or tin; and "c" is the mole fraction of chromium and/or tin tetrahedra resulting from the fluoro salt treatment of the instant process and varies from about 0.01 to about 0.49. Numerically, the sum of the values:

$(a-N)+b+c+z=1;$

The term "Defect Structure Factor" for any given zeolite is equivalent to the "z" value of that particular zeolite. The net change in Defect Structure Factors between the starting zeolite and the product zeolite is equivalent to "$\Delta z$".

$\Delta z = z(\text{product zeolite}) - z(\text{starting zeolite})$

Theoretically, there should be no change in the silicon content and therefore "c" should equal $(N-\Delta z)$ where "$\Delta z$" is the net change in the mole fraction of defect sites in the zeolite framework resulting from the treatment. However, in reality fluoride does sometimes react with silicon of the molecular sieve particularly on the surface of the crystals of the more siliceous molecular sieves causing etching and transport of silicon atoms to other defect sites of the crystal. Hence "c" will not always be actually equal to $(N-\Delta z)$.

The chromium and/or tin-containing molecular sieve compositions prepared by the instant processes have framework aluminum removed from the starting zeolite with substitution of chromium and/or tin. The process generally comprises:

(a) contacting at effective process conditions a zeolite with an effective amount of at least one of a fluoro salt of chromium or a fluoro salt of tin; and (b) isolating the chromium and/or tin-containing molecular sieve product from the reaction mixture.

The instant process generally comprises contacting a crystalline zeolite having a pore diameter of at least about 3 Angstroms and having a molar $SiO_2/Al_2O_3$ ratio of at least 2, with at least 0.0075 moles of a fluoro salt of chromium or a fluoro salt of tin, per 100 grams of zeolite starting material, said fluoro salt being in the form of a solution or slurry. The fluoro salt is preferably provided as an aqueous solution or slurry but it is believed that solutions or slurries employing alcohols and other organic solvents may be employed.

It is necessary that the solution or slurry be maintained at an effective pH. The "effective pH" is a pH such that under effective process conditions; a) a monomeric species of the chromium and/or tin is present in the reaction solution; and b) the pH is high enough to avoid undue destructive acidic attack on the particular zeolite structure, apart from the intended reaction with an effective amount of the fluoro salt. The effective amount of fluoro salt is that amount which provides sufficient fluoride and chromium and/or tin for the process and the desired amount of chromium and/or tin in the final molecular sieve product. The effective pH value for this invention is generally greater than one (1), more preferably greater than 3 (three) and most preferably in the range of about 3 to about 7 (seven).

A pH of about 3 or more usually assures that no acid degradation of the zeolite occurs but it may not necessarily be the optimum pH for the formation of monomeric species of either chromium and/or tin in the solution. At pH values below about 3 crystal degradation of many zeolites is found to be unduly severe. Whereas at pH values higher than 7, insertion of the chromium and/or tin may be slow from a practical standpoint as a result of the solubility of chromium and/or tin at these pHs and as a result of certain polymerization reactions. A pH of 7 and above typically results in no monomeric species of either chromium and/or tin being present in the solution so that very little substitution of these metal atoms in the framework would occur. Frequently the polymeric species of chromium and/or tin will precipitate as solid oxides or hydrous oxides at pH 7 or above.

The fluoro salt solution or slurry is brought into contact with the zeolite either incrementally or continuously at a slow rate whereby framework aluminum atoms of the zeolite are removed and replaced by chromium and/or tin atoms from the fluoro salt.

The solution or slurry of the fluoro salt, preferably aqueous, is brought into contact with the zeolite either incrementally or continuously at an effective rate such that a portion of the framework aluminum atoms are removed and replaced by chromium and/or tin atoms at a rate which preferably retains at least 80 percent and more preferably at least 90 percent of the crystal structure of the starting zeolite.

The fluoro salt used as the aluminum extractant and also as the source of chromium and/or tin, which is inserted into the zeolite structure in place of the extracted aluminum, can be any of the fluoro salts having the general formula:

$A_{2/b}MF_6$ or $A_{2/b}MF_4$ where "M" is tin and "A" is a metallic or non-metallic cation, having the valence "b". Cations represented by "A" include alkylammonium, $H^+$, $NH_4^+$, $Mg^{++}$, $Li^+$, $Na^+$, $K^+$, $Ba^{++}$, $Cd^{++}$, $Cu^+$, $Cu^{++}$, $Ca^{++}$, $Cs^+$, $Fe^{++}$, $Co^{++}$, $Pb^{++}$, $Mn^{++}$, $Rb^+$, $Ag^+$, $Sr^{++}$, $Tl^+$ and $Zn^{++}$, or the formula $A_{2/b}MF_5$, where "M" is chromium. The ammonium and hydronium cation forms of the fluoro salt are generally preferred because of their solubility in water and also because these cations form water soluble by-product salts upon reaction with the zeolite, e.g., $(NH_4)_3AlF_6$ and/or $(NH_4)_2AlF_5$. Other salts which may be used include a combination of salts of $MF_3$ and $3/2(NH_4HF_2)$ or $MF_4$ and $NH_4HF_2$ where M is chromium or tin. Preferred fluoro salts are $(NH_4)_3CrF_5$; $CrF_3.3/2((NH_4)HF_2)$; $NH_4SnF_3$; $SnF_2.3/2(NH_4HF_2)$ and $SnF_4.NH_4HF_2$.

The manner in which the fluoro salt of chromium or the fluoro salt of tin and the starting zeolite are brought into contact and the overall process of substituting chromium and/or tin for aluminum in the zeolite framework is believed to be a two step process in which the aluminum extraction step tends to, unless controlled, proceed very rapidly while the insertion of chromium and/or tin is generally relatively slow, if dealumination becomes too extensive without the substitution of chromium and/or tin the crystal structure becomes seriously degraded and ultimately collapses. While not wishing to be bound by any particular theory, it appears that fluoride ion acts as the agent for extraction of framework aluminum in accordance with the equation:

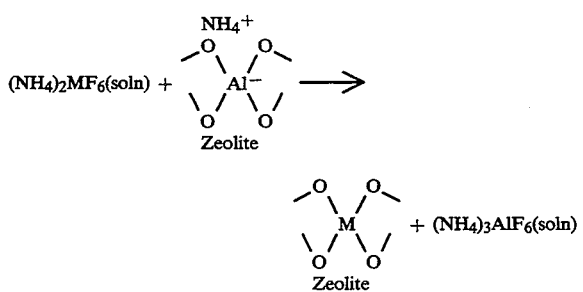

It is important, therefore, that the initial dealumination step be inhibited and the step involving insertion of chromium and/or tin be promoted to achieve the desired molecular sieve product. It is found that the various zeolites have varying degrees of resistance toward degradation as a consequence of framework aluminum extraction without substitution of chromium and/or tin into the framework. Accordingly, for the reasons stated above the pH is preferably within the range of 3 to 7. The higher pH inhibits the rate and amount of dealumination. Also, increasing the reaction temperature tends to increase the rate of substitution of chromium and/or tin. Increasing the reaction temperature has been found to have less of an effect on dealumination than the pH of the solution. Therefore, the pH may be considered a means of controlling dealumination while temperature may be considered as a means of controlling the substitution rate.

Whether it is necessary or desirable to buffer the reaction system or select a particular fluoro salt concentration to control the pH is readily determined for each zeolite species by routine observation and evaluation. The question of whether the reaction system may advantageously be buffered will in large part depend on the selection of the particular starting zeolite, since zeolites have varying tolerances to acid and base media. For example, some zeolites such as mordenite and clinoptilolite can withstand very low pH conditions and a high level of dealumination without collapse of the crystal structure. When it is advantageous to buffer the reaction mixture in a particular pH range the reaction mixture may be buffered in a manner as generally heretofore employed in the art. The use of buffering salts, such as ammonium acetate, or use of an inert solid to react with excess acid or base, e.g. clays or aluminas, may be suitable to buffer the pH of the reaction mixture.

Theoretically, there is no lower limit for the concentration of fluoro salt of chromium and/or tin in the aqueous solution or slurry employed. A slow rate of addition of the fluoro salt generally provides adequate time for the insertion of chromium and/or tin as a framework substitute for extracted aluminum before excessive aluminum extraction occurs with consequent collapse of the crystal structure. Practical commercial considerations, however, may require that the reaction proceed as rapidly as possible, and accordingly the conditions of reaction temperature and reagent concentrations will necessarily be optimized with respect to each zeolite starting material and with respect to commercial operation. In general it is believed that the more highly siliceous the zeolite, the higher the permissible reaction temperature and the lower the pH conditions which may be employed in the instant process. In general the preferred effective reaction temperature is within the range between about 10° C. and about 99° C., preferably between about 20° C. and 95° C., but temperatures of 125° C. or higher and as low as 0° C. are believed employable in some instances with some zeolite starting materials and with fluoro salts in a form other than aqueous solutions or slurries. The maximum concentration of fluoro salt in the aqueous solution employed is, of course, interrelated to the temperature and pH factors and also with the time of contact between the zeolite and the solution and the relative proportions of zeolite and fluoro salt. Solutions having fluoro salt concentrations of between about $10^{-3}$ moles per liter of solution and up to saturation of the solution can be employed, but it is preferred that concentrations in the range of between about 0.5 and about 1.0 moles per liter of solution be used. In addition, as hereinbefore discussed, slurries of the fluoro salts of chromium and/or tin may be employed. The aforementioned concentration values are with respect to true solutions, and are not intended to apply to the total fluoro salts in slurries of the salts in water. Even very slightly soluble fluoro salts can be slurried in water and used as a reagent, the undissolved solids being readily available to replace dissolved molecular species consumed in reaction with the zeolite. As stated hereinabove, the amount of dissolved fluoro salts employed with respect to the particular zeolite being treated will depend to some extent upon the physical and chemical properties of the individual zeolites and other effective process conditions. However, the minimum value for the amount of fluoro salt to be added is preferably at least equivalent to the minimum mole fraction of aluminum to be removed from the zeolite.

In specifying the proportions of the zeolite starting material or adsorption properties of the zeolite product and the like herein, the "anhydrous state" of the zeolite will be intended unless otherwise stated. The term "anhydrous state" is employed herein to refer to a material substantially devoid of both physically adsorbed and chemically adsorbed water. In general a zeolite may be prepared in the anhydrous state by heating the zeolite in dry air at about 450° C. for about 4 hours.

It is apparent from the foregoing that, with respect to effective process conditions, it is desirable that the integrity of the zeolite crystal structure be substantially maintained throughout the process, and that, in addition to having chromium and/or tin atoms inserted into the lattice, the zeolite retains at least 60 percent, preferably at least 70 and more preferably at least 90 percent of its original crystallinity. A convenient technique for assessing the crystallinity of the products relative to the crystallinity of the starting material is the comparison of the relative intensities of the d-spacings of their respective X-ray powder diffraction patterns. The sum of the peak heights, in terms of arbitrary units above background, of the starting material is used as the standard and is compared with the corresponding peak heights of the products. When, for example, the numerical sum of the peak heights of the molecular sieve product is 85 percent of the value of the sum of the peak heights of the starting zeolite, then 85 percent of the crystallinity has been retained. In practice it is common to utilize only a portion of the d-spacing peaks for this purpose, as for example, five of the six strongest d-spacings. In zeolite Y these d-spacings correspond to the Miller Indices 331, 440, 533, 642 and 555. Products of the instant invention will have a certain fraction of the framework tetrahedra replaced by tin and/or chromium atoms. Because atoms of these heavier elements are incorporated there may be a decrease in the X-ray crystallinity values due to scatter because of the heavier elements. In this case, more reliable indicia of the crystallinity retained by the zeolite product are the degree of retention of surface area or the degree of retention of the adsorption capacity. Surface areas can be determined by the well-known Brunauer-Emmett-Teller method (B-E-T). See for example, Journal of American Chemical Society, Volume 60, page 309 (1938) using nitrogen as the adsorbate. In determining the adsorption capacity, the capacity for oxygen at 90° K ($-183°$ C.) and 100 Torr is preferred. Accordingly, the compositions of this invention are characterized in that they retain at least 60, preferably 70 and most preferably 90 percent of the capacity of the starting zeolite. Since it is preferred that the starting zeolite be highly crystalline and not have any defect, it is preferred that the instant compositions have at least 60, preferably 70 and most preferably 90 percent of its theoretical oxygen adsorption capacity as measured at 100 torr and 90° K.

The present compositions are also characterized in that they have a cation equivalency of at least 0.8. Cation equivalency is the molar ratio of $M'^+/Al$ in the molecular sieve.

Four-fold coordination of aluminum in the zeolite framework produces a net negative charge on the zeolite framework, requiring a cation $M^+$ to balance the charge. The Cation Equivalent, $M^+/Al$, can be a direct measure of the amount of framework aluminum in the zeolite. Cations, here represented as the monovalent species, $M^+$, can be any cation capable of entering the zeolite pores and balancing the framework charges. Representative of such cation species are $Na^+$, $K^+$, $NH_4^+$, $Ca^{++}$, $Mg^{++}$, Rare Earth$^{+++}$, $H^+$, and even hydroxoaluminum cation species $Al(OH)_2^+$, $Al(OH)_2^+$, $AlO^+$, etc. Of course, hydroxoaluminum cations are not framework atoms, and thus when present they will have the effect of reducing the measured Cation Equivalent $M^+/Al$, since Al is taken to represent all of the aluminum present in the zeolite composition. Other non-cationic aluminum species such as forms of amorphous $Al_2O_3$ may also be present with the zeolite composition. This form of amorphous $Al_2O_3$ results from degradation to the zeolite that may occur as the result of a particular treatment. Presence of an amorphous $Al_2O_3$ phase will also have the effect of reducing the value of the Cation Equivalent, $M^+/Al$, since Al is taken to represent all of the Al present in the zeolite composition. It is obvious then, that a low value for the Cation Equivalent indicates the presence of a substantial amount of zeolite degradation or the presence of a substantial amount of cationic aluminum. The higher the value for the Cation Equivalent, the greater the amount of the compositional Al present in the framework of the zeolite.

It is highly desirous that the residual Al be present in the framework of the molecular sieve instead of as an aluminum cation species or as amorphous $Al_2O_3$, especially if the desired utility of the tin substituted product is in a catalytic application. Cation Equivalency can be directly related to the ion exchange capacity of the zeolite. The catalytic application would require that the Sn substituted zeolite product be acid exchanged (either $H^+$ or an $NH_4^+$ form) to produce the catalytically active form of the zeolite on calcination. Since the Secondary Synthesis process has already reduced the aluminum content of the zeolite by substitution of the Sn for Al, it is important that as many as possible of the remaining Al be present at framework Al, thus insuring that the exchange capacity for the potential acidic species $H^+$ and $NH_4^+$ is maximized.

It is advantageous to perform the routine chemical analysis on a form of the zeolite in which $M'$ is an equivalent monovalent cation other than hydrogen. This avoids the uncertainty which can arise in the case of divalent or polyvalent metal zeolite cations as to whether the full valence of the cation is employed in balancing the net negative charge associated with each $AlO_4^-$ tetrahedron.

ANALYSIS OF THE SUBSTITUTION MECHANISM

The following is a hypothetical description of the mechanism involved and may not be the actual mechanism that is taking place. This description is based upon the present available data and analysis of the substitution products of this invention. This hypothetical description seems to be consistent with that data and may help to explain this unique process.

All available evidence, to date, indicates that the above described process of this invention is unique in being able to produce zeolites essentially free of defect structure and having chromium and/or tin inserted into the framework by a secondary synthesis process. In untreated, i.e. naturally occurring or as-synthesized zeolites the original tetrahedral structure is conventionally represented as

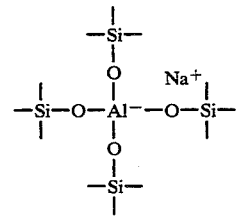

After treatment with a complexing agent such as ethylene-diamine-tetraacetic acid ($H_4EDTA$) in which a stoichiometric reaction occurs whereby framework aluminum atoms along with an associated cation such as sodium is removed as NaAlEDTA, it is postulated that the tetrahedral aluminum is replaced by four protons which form a hydroxyl "nest", as follows:

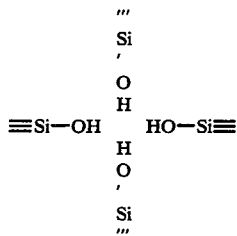

In the practice of this invention, a two-step process is envisioned. In the first step of the treatment, tetrahedral aluminum atoms are first hydrolyzed and removed from the zeolite framework, whereupon they immediately react to form a more stable aluminum species or compound (i.e. aluminum fluoride species).

In the second step, ions of suitable size and coordination number are inserted into the vacant tetrahedral sites created by the dealumination.

Commonly assigned U.S. Pat. No. 4,892,720 involves replacement of framework aluminum by either iron and/or titanium. The present work involves replacement by either tin atoms or chromium atoms or both into vacant framework sites created by the dealumination.

The individual steps of the process can be accomplished in separate operations. However, it is more desirable to perform both steps in a single efficient operation. A particularly efficient class of compounds which can effect the dealumination and framework substitution steps in a single operation can be designated by $J_xTF_y$, where T represents the substituting tetrahedral atom. The substituting tetrahedral atom (T) when hydrolyzed in solution forms a hydroxylated species and an acid. The acid subsequently attacks the Al in the framework to cause the dealumination. The fluoride (F) serves to complex with the removed aluminum atoms, and J is the charge-balancing cation or cations. While the process is carried out in an aqueous system, it is not necessary that the $J_xTF_y$ compound be dissolved in the solution. It is only necessary that it be sufficiently soluble to initiate the reaction with the zeolite. It is important that the reaction byproduct (the aluminum fluoride) be in a form that is readily removed from the zeolite by a washing step, subsequent to the substitution reaction. The presence of fluoride in the zeolite product in concentrations as low as 1 weight percent (or even lower), results in decreased thermal stability of the zeolite crystals. The residual fluoride can react with Si in the zeolite at elevated temperatures to cause the zeolite crystal to collapse.

Salts of the class of compounds $J_xTF_y$ which have been used in the practice of this invention are:
$NH_4SnF_3$; $3(NH_4F) \cdot CrF_3$; $3(NH_4HF_2) \cdot CrF_3$, $SnF_2 \cdot NH_4HF_2$; $SnF_4 \cdot NH_4HF_2$; and $CrF_3 \cdot NH_4HF_2$.

Among the list of zeolites known to react with one or more of the above listed compounds to effect framework substitution are: the synthetic zeolite Y, mordenite, zeolite L and zeolite LZ-202 (an omega type zeolite prepared without the use of a templating agent as disclosed in (U.S. Pat. No. 4,840,779). With all of these zeolites, the reaction to dealuminate the starting zeolite and replace the removed aluminum atoms with a different tetrahedral atom did take place, at least to some extent, although the resulting zeolite may not have been the optimum product.

The chemistry of the process can be envisioned approximately in the following way. In the first step an aqueous slurry of the zeolite is contacted with a solution of $J_xTF_y$ salt. In some cases, because of the limited solubility of $J_xTF_y$, the zeolite and the salt can be slurried together. The salt hydrolyzes in aqueous solution to form acid, $H_3O^+$ and free fluoride. One example of this hydrolysis where T=Sn and J=NH$_4$ can be depicted as follows:

a) $(NH_4)_2SnF_6 \rightarrow 2(NH_4)^+ + 2F^- + SnF_4$
b) $SnF_4 + 2H_2O \rightarrow SnF_3OH + H_3O^+ + F^-$
c) $SnF_3OH + 2H_2O \rightarrow SnF_2(OH)_2 + H_3O^+ + F^-$
d) $SnF_2(OH)_2 + 2H_2O \rightarrow SnF(OH)_3 + H_3O^+ + F^-$
e) $SnF(OH)_3 + 2H_2O \rightarrow Sn(OH)_4 + H_3O^+ + F^-$ The acid thus formed $(H_3O)^+$, reacts rapidly to dealuminate the zeolite. The removed aluminum rapidly reacts with the free fluoride to form aluminum fluoride salts such as $AlF_3$, $(NH_4)_2AlF_5$, and $(NH_4)_3AlF_6$.

This reaction is the most crucial part of the process, since the dealumination step is very rapid. If too much dealumination occurs (without substitution into the vacant tetrahedral sites), the zeolite quickly loses its crystal structure. The use of a buffer such as ammonium acetate, thereby keeping the pH greater than about 6.0, can be used to slow down the hydrolysis so that the slower substitution step can take place. Another method of controlling the dealumination step is to add the $J_xTF_y$ solution very slowly to the zeolite slurry. In this manner, some substitution can occur before the zeolite framework is excessively dealuminated to the point of causing crystal collapse. With the slow addition of the $J_xTF_y$ solution, the zeolite itself acts as a "buffer" in the system.

The second step is the substitution of a new tetrahedral atom into the zeolite structure in place of the removed aluminum atom. This step has been found to be the overall rate-limiting or slow step. Increasing the temperature of the system increases the rate of substitution, but it may also speed up the rate of other undesirable side reactions such as the dealumination or the continued hydrolysis of T to form a polymeric species which will no longer be able to substitute in the framework defect sites. The exact chemistry of the substitution step is not known in detail. It can be suggested that dealumination of the zeolite leaves a hydroxyl nest in the vacant site, which in turn reacts with the hydrolyzed form of the substituting tetrahedral atom.

The stepwise reaction can be depicted as follows:

Dealumination:

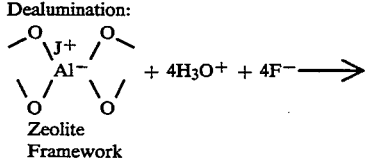

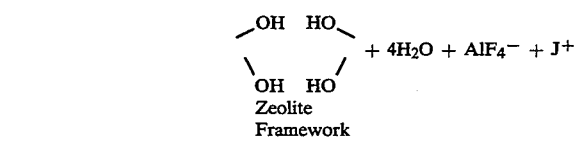

Substitution:

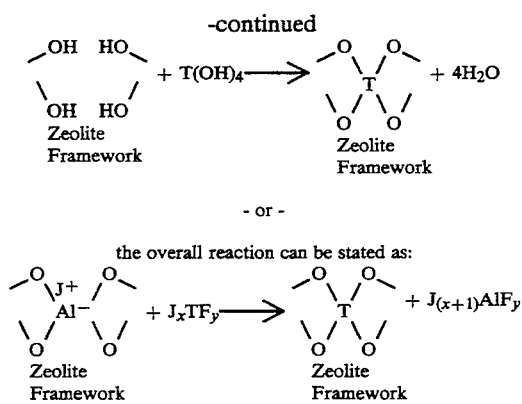

THE EXPERIMENTAL CONDITIONS

The infrared spectrum of the aluminum depleted zeolite will show a broad nondescript absorption band beginning at about 3750 cm$^{-1}$ and extending to about 3000 cm$^{-1}$. The size of this absorption band or envelope increases with increasing aluminum depletion of the zeolite. The reason that the absorption band is so broad and without any specific absorption frequency is that the hydroxyl groups in the vacant sites in the framework are coordinated in such a way that they interact with each other (hydrogen bonding). The hydroxyl groups of adsorbed water molecules are also hydrogen-bonded and produce a similar broad absorption band as do the "nest" hydroxyls. Also, certain other zeolitic hydroxyl groups, exhibiting specific characteristic absorption frequencies within the range of interest, will if present, cause infrared absorption bands in these regions which are superimposed on the band attributable to the "nest" hydroxyl groups. These specific hydroxyls are created by the decomposition of ammonium cations or organic cations present in the zeolite.

It is, however, possible to treat zeolites, prior to subjecting them to infrared analysis, to avoid the presence of the interfering hydroxyl groups and thus be able to observe the absorption attributable to the "nest" hydroxyls only. The hydroxyls belonging to adsorbed water are avoided by subjecting the hydrated zeolite sample to vacuum activation at a moderate temperature of about 200° C. for about 1 hour. This treatment permits desorption and substantially complete removal of the adsorbed water. Complete removal of adsorbed water can be ascertained by noting when the infrared absorption band at about 1640 cm$^{-1}$, the bending frequency of water molecules, has been removed from the spectrum.

The decomposable ammonium cations can be removed, at least in large part, by ion-exchange and replaced with metal cations, preferably by subjecting the ammonium form of the zeolite to a mild ion exchange treatment with an aqueous NaCl solution. The OH absorption bands produced by the thermal decomposition of ammonium cations are thereby avoided. Accordingly the absorption band over the range of 3745 cm$^{-1}$ to about 3000 cm$^{-1}$ for a zeolite so treated is almost entirely attributable to hydroxyl groups associated with defect structure and the absolute absorbance of this band can be a measure of the degree of aluminum depletion.

It is found, however, that the ion-exchange treatment, which must necessarily be exhaustive even though mild, required considerable time. Also the combination of the ion-exchange and the vacuum calcination to remove adsorbed water does not remove every possible hydroxyl other than defect hydroxyls which can exhibit absorption in the 3745 cm$^{-1}$ to 3000 cm$^{-1}$ range. For instance, a rather sharp band at 3745 cm$^{-1}$ has been attributed to the Si—OH groups situated in the terminal lattice positions of the zeolite crystals and to amorphous (non-zeolitic) silica from which physically adsorbed water has been removed. For these reasons it is preferred to use a somewhat different criterion to measure the degree of defect structure in the zeolite products of this invention.

In the absence of hydrogen-bonded hydroxyl groups contributed by physically adsorbed water, the absorption frequency least affected by absorption due to hydroxyl groups other than those associated with framework vacancies or defect sites is at 3710±5 cm$^{-1}$. Thus the relative number of defect sites remaining in a zeolite product of this invention can be gauged by first removing any adsorbed water from the zeolite, determining the value of the absolute absorbance in its infrared spectrum at a frequency of 3710 cm$^{-1}$, and comparing that value with the corresponding value obtained from the spectrum of a zeolite having a known quantity of defect structure. The following specific procedure has been arbitrarily selected and used to measure the amount of defect structure in the products prepared in the Examples appearing hereinafter. Using the data obtained from this procedure it is possible, using simple mathematical calculation, to obtain a single and reproducible value hereinafter referred to as the "Defect Structure Factor", denoted hereinafter by the symbol "z", which can be used in comparing and distinguishing the present novel zeolite compositions from their non-chromium and/or tin containing counter-parts.

DEFECT STRUCTURE FACTOR "Z"

(A) Defect Structure Zeolite Standard

Standards with known amounts of defect structure can be prepared by treating a crystalline zeolite of the same species as the product sample with ethylenediaminetetraacetic acid by the standard procedure of Kerr as described in U.S. Pat. No. 3,442,795. In order to prepare the standard it is important that the starting zeolite be well crystallized, substantially pure and free from defect structure. The first two of these properties are readily determined by conventional X-ray analysis and the third by infrared analysis using the procedure set forth in part (B) hereof. The product of the aluminum extraction should also be well crystallized and substantially free from impurities. The amount of aluminum depletion, i.e., the mole fraction of tetrahedral defect structure of the standard samples can be ascertained by conventional chemical analytical procedure. The molar $SiO_2/Al_2O_3$ ratio of the starting zeolite used to prepare the standard sample in any given case is not narrowly critical, but is preferably within about 10% of the molar $SiO_2/Al_2O_3$ ratio of the same zeolite species used as the starting material in the practice of the process of the present invention.

(B) Infrared Spectrum of Product Samples and Defect Structure Zeolite Standard

Fifteen milligrams of the hydrated zeolite to be analyzed are pressed into a 13 mm. diameter self-supporting wafer in a KBr die under 5000 lbs. pressure. The wafer is then heated at 200° C. for 1 hour at a pressure of not greater than $1 \times 10^{-4}$ mm Hg to remove all observable traces of physically adsorbed water from the zeolite. This condition of the zeolite is evidenced by the total absence of an infrared absorption band at about 1640 cm$^{-1}$. Thereafter, and without contact with adsorbable substances, particularly water vapor, the infrared spectrum of the wafer is obtained on an interferometer system at 4 cm$^{-1}$ resolution over the frequency range of at least 3745 to 3000 cm$^{-1}$. Both the product sample and the standard sample are analyzed using the same interferometer system to avoid discrepancies in the analysis due to different apparatus. The spectrum, normally obtained in the transmission mode of operation is mathematically converted to and plotted as wave number vs. absorbance.

(C) Determination of the Defect Structure Factor

The defect structure factor (z) is calculated by substituting the appropriate data into the following formula:

$$z = \frac{AA_{(ps)} \times \text{(Mole fraction of defects in the standard)}}{AA_{(std)}}$$

wherein AA $_{(ps)}$ is the infrared absolute absorbance measured above the estimated background of the product sample at 3710 cm$^{-1}$; AA $_{(std)}$ is the absolute absorbance measured above the background of the standard at 3710 cm$^{-1}$ and the mole fraction of defects in the standard are determined in accordance with part (A) above.

Once the defect structure factor, z, is known, it is possible to determine from the wet chemical analysis of the product sample for SiO$_2$, Al$_2$O$_3$, chromium and/or tin and the cation content as M$_{2/n}$O whether chromium and/or tin has been substituted for aluminum in the zeolite as a result of the treatment and also the efficiency of the substitution of chromium and/or tin.

The essential X-ray powder diffraction patterns appearing in this specification and referred to in the appended claims are obtained using either: 1) standard X-ray powder diffraction techniques; or 2) computer based techniques using copper K-alpha radiation and using Siemens D-500 X-ray powder diffractometers with Siemens Type K-805 X-ray sources, available from Siemens Corporation, Cherry Hill, N.J., with appropriate computer interface. When employing the standard X-ray technique the radiation source is a high-intensity, copper target, x-ray tube operated at 50 Kv and 40 ma. The diffraction pattern from the copper K alpha radiation and graphite monochromator is suitably recorded by an X-ray spectrometer scintillation counter, pulse-height analyzer and strip-chart recorder. Flat compressed powder samples are scanned at 2° (2 theta) per minute, using a 2 second time constant. Interplanar spacings (d) are obtained from the position of the diffraction peaks expressed as 2 theta, where 2 theta is the Bragg angle as observed on the strip chart. Intensities are determined from the heights of diffraction peaks after subtracting background.

All of the zeolite samples were evaluated according to standard analytical procedures. The x-ray crystallinity of most samples was measured using the Siemens D-500 where peak areas as well as peak intensities of all major reflections were measured and compared against untreated samples of the starting materials. It was expected that the product of a successful experiment would maintain a major fraction of its x-ray crystallinity. Unit cell values were measured on materials possessing cubic unit cells (a$_o$).

Framework infrared spectra of the treated zeolites were compared to the framework spectra of the respective starting materials. A general overall shift of the framework absorption frequencies to higher wave numbers is a good indication of a higher silicon content in the framework. Shift of the asymmetric stretch band at about 950–1250 cm$^{-1}$ accompanies dealumination. The symmetric stretch band, 750–835 cm$^{-1}$ is more sensitive to the actual silicon content in the framework, shifting to higher wave numbers as the silicon content increases. Very little is known about the effect of substitution of atoms-other than silicon into the zeolite framework on the position of these bands. Very little effect on the position of the symmetric stretch band has been observed as a result of simple dealumination. However, because there are not studies of the effect of dealumination on the positions or shifts of the framework infrared bands with zeolites other than Y and perhaps mordenite; the lack of a substantial shift of the symmetric stretch band was not used as the sole criterion to judge the degree of metal atom substitution.

More specifically, there are no studies of the effect of substituting either chromium or tin or both for aluminum in the zeolite framework on shifts of framework infrared bands. A general assumption would be that ions larger than Al would increase the unit cell size causing a decrease in framework infrared absorption band positions. Conversely, substitution of ions smaller than Al into the zeolite framework would cause a decrease in unit cell size and an increase in framework infrared absorption band positions.

The hydroxyl region infrared spectrum was used to evaluate the relative amount of framework defect sites in the zeolite product of this invention. For a more thorough description of this method of evaluation see U.S. Pat. No. 4,503,023. Briefly, using standard procedures, the absolute absorbance (above background) at 3710 cm$^{-1}$ was measured and compared to a standard sample of aluminum-depleted NaY which contained a known number of defects. The defect structure factor (z) of the reference standard was 0.140 and gave rise to an absolute absorbance value of 0.330 at 3710 cm$^{-1}$ of the infrared spectrum. The reference value of z in this case is the mole fraction of vacant tetrahedral sites in the zeolite framework of the aluminum-depleted NaY. Fourteen percent of all of the tetrahedral sites do not contain a tetrahedral atom (Si or Al), but rather, some form of hydrogen-bonded OH groups.

EXAMPLES

The following examples are provided to illustrated the invention and are not intended to be limiting thereof.

Practice of the invention is demonstrated by the following examples. After the substitution of Sn and Cr in place of Al in the framework of zeolites via treatment with aqueous ammonium fluoride salts, all the zeolite products were washed well in hot distilled water following reaction. Samples of the dried powders were examined by x-ray powder diffraction techniques for retention of crystallinity. Those samples judged to be crystalline were further examined by differential thermal analysis methods (DTA), measurement of O$_2$ adsorption isotherms at −183° C. (90° K), measurement of H$_2$O adsorption capacity at 4.6 torr and 25° C., infrared analyses of both the OH region and the mid-range (framework) region, and finally by complete chemical analysis.

In some of the X-ray patterns reported, the relative intensities of the d-spacings are indicated by the notations vs, s, m, w and vw which represent very strong, strong, medium, weak and very weak, respectively.

Examples 1 through 5 disclose the substitution of $Cr^{3+}$ in the framework of Zeolite Y and the resulting product was designated LZ-239.

EXAMPLE 1

Two gm NH$_4$Y (anhydrous weight) containing 8.544 millimoles of Al were slurried in 100 ml distilled water heated at 75° C. Fifty ml of a second solution containing 21.36 millimoles CrF$_3$ and 64.08 millimoles NH$_4$HF$_2$ in 250 ml distilled water, was added incrementally to the zeolite slurry at a rate of 2 ml every 5 minutes. Following the addition of the chrome solution, the temperature was raised to 95° C. and the slurry was digested for 3 hours at 95° C. A green colored product was obtained which was filtered, washed free of soluble fluoride with hot distilled water, dried and characterized. The product contained 11 weight percent Cr$_2$O$_3$, it showed substantially reduced X-ray crystallinity, and an estimated unit cell value of 24.55 Å and and a substantial increase in the Defect Structure Factor, z. Reduced crystallinity may have been caused by two factors in this case. A certain amount of apparent disorder in the structure is to be expected due to the larger chromium cation which can be present both in the framework and as a hydroxylated cation [Cr(OH)$^{2+}$, Cr(OH)$_2$$^+$]. Incorporation of the heavier chromium atoms into the structure should cause loss of peak intensity and area due to the scattering of X-rays by the heavier atoms of chromium. In addition, the acidic nature of the bifluoride anion probably caused some degradation to the acid sensitive Y zeolite framework structure.

The framework mole fractions of oxides are set forth below for the starting NH$_4$Y and the LZ-239 product.

(a) Mole fractions of oxides (TO$_2$): Starting NH$_4$Y: (Al$_{0.277}$Si$_{0.705}$☐$_{0.018}$)O$_2$ LZ-239 Product: (Al$_{0.115}$Cr$_{0.075}$Si$_{0.634}$☐$_{0.176}$)O$_2$ (b) Mole Fraction of Aluminum Removed, N: 0.162

(c) Percent of Aluminum Removed, N/a×100: 58

(d) Change in Defect Structure Factor, $z$: 0.158

(e) Moles of Chromium Substituted per Mole of Aluminum Removed, c/N :0.463

EXAMPLE 2

Two gm NH$_4$Y (anhydrous weight) containing 8.544 millimoles of Al were slurried in 100 ml distilled water heated at 75° C. Fifty ml of a second solution containing 21.36 millimoles CrF$_3$ and 64.08 millimoles NH$_4$F in 250 ml distilled water, was added incrementally to the zeolite slurry at a rate of 2 ml every 5 minutes. Following the addition of the chrome solution, the temperature was raised to 95° C. and the slurry was digested for 3 hours at 95° C. The product was filtered, washed free of soluble fluoride with hot distilled water, dried and characterized. A green colored product which was obtained contained 10 weight percent Cr$_2$O$_3$. It showed good retention of X-ray crystallinity, and an estimated unit cell value of 24.58 Å. The SEM (Scanning Electron Microscope photograph for zeolite LZ-239 of this example are shown in FIGS. 1B, 2B, 2C, 3A, 3B and 4B.

The framework mole fractions of oxides are set forth below for the starting NH$_4$Y and the LZ-239 product.

(a) Mole fractions of oxides (TO$_2$): Starting NH$_4$Y: (Al$_{0.277}$Si$_{0.705}$☐$_{0.018}$)O$_2$ LZ-239 Product: (Al$_{0.210}$Cr$_{0.080}$Si$_{0.660}$☐$_{0.050}$)O$_2$ (b) Mole Fraction of Aluminum Removed, N: 0.067

(c) Percent of Aluminum Removed, N/a×100: 24

(d) Change in Defect Structure Factor, $z$: 0.032.

(e) Moles of Chromium Substituted per Mole of Aluminum Removed, c/N: 1.19

EXAMPLE 3

Figure 5A:
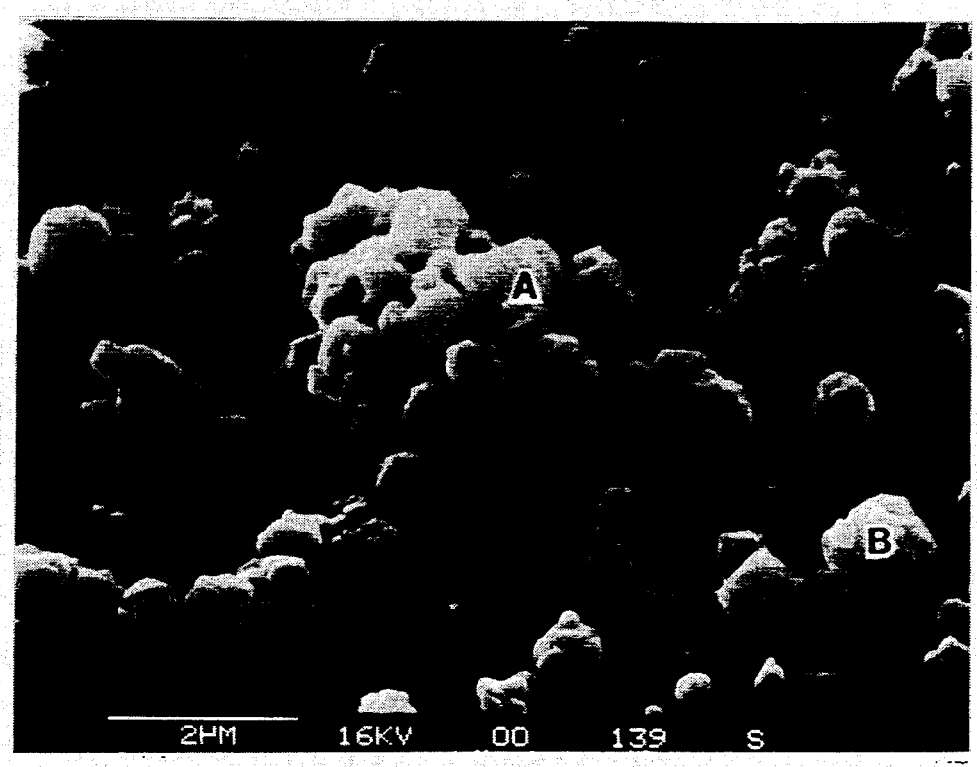
FIG. 5A is a SEM (Scanning Electron Microscope) photograph for zeolite LZ-239, (Example 3), as hereinafter discussed.
Figure 5B:
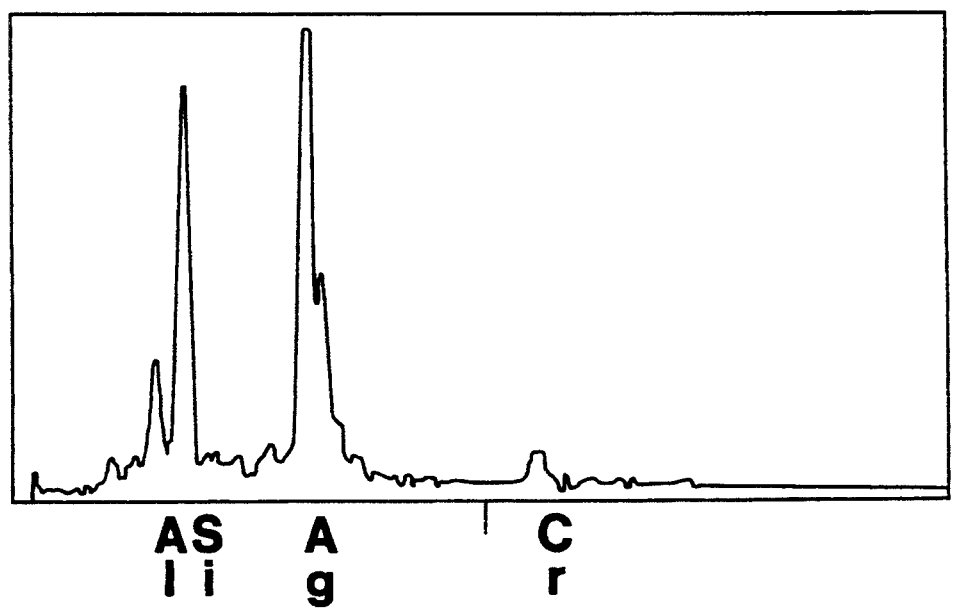
FIG. 5B is an EDAX (Energy Dispersive Analysis by X-ray) spot probe at point A in the photograph of FIG. 5A for zeolite LZ-239, (Example 3), as hereinafter discussed.
Figure 5C:
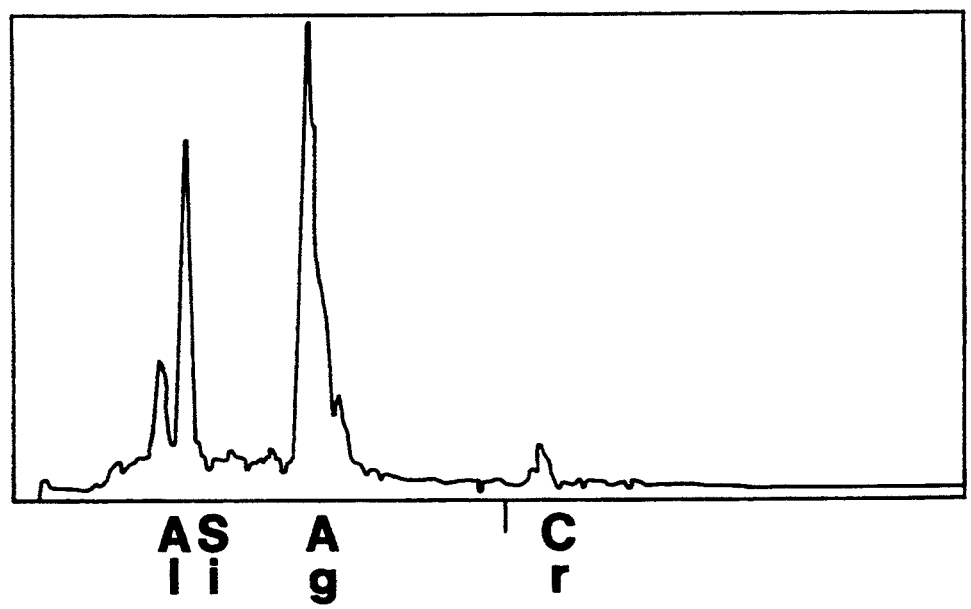
FIG. 5C is an EDAX (Energy Dispersive Analysis by X-ray) spot probe at point B in the photograph of FIG. 5A for zeolite LZ-239, (Example 3), as hereinafter discussed.

Two gm NH$_4$Y (anhydrous weight) containing 8.544 millimoles of Al were slurried in 100 ml distilled water heated at 75° C. Fifty ml of a second solution containing 21.36 millimoles CrF$_3$ and 64.08 millimoles NH$_4$$^F$ in 250 ml distilled water, was added incrementally to the zeolite slurry at a rate of 2 ml every 5 minutes. Following the addition of the chrome solution, the temperature was raised to 95° C. and the slurry was digested for half an hour. The product was filtered, washed free of soluble fluoride with hot distilled water, dried and characterized. The product contained 10 weight percent Cr$_2$O$_3$, showed good retention of X-ray crystallinity, and an estimated unit cell value of 24.63 Å. The SEM (Scanning Electron Microscope) photograph for zeolite LZ-239 is shown in FIG. 5A and the EDAX results for Example 3 are shown in FIGS. 5B and 5C.

The framework mole fractions of oxides are set forth below for the starting NH$_4$Y and the LZ-239 product.

(a) Mole fractions of oxides (TO$_2$): Starting NH$_4$Y: (Al$_{0.277}$Si$_{0.705}$☐$_{0.018}$)O$_2$ LZ-239 Product: (Al$_{0.206}$Cr$_{0.082}$Si$_{0.665}$☐$_{0.047}$)O$_2$ (b) Mole Fraction of Aluminum Removed, N/a: 0.071

(c) Percent of Aluminum Removed, N/a×100: 26

(d) Change in Defect Structure Factor, $z$: 0.029.

(e) Moles of chromium Substituted per Mole of Aluminum Removed, c/N: 1.15

EXAMPLE 4

Figure 6A:
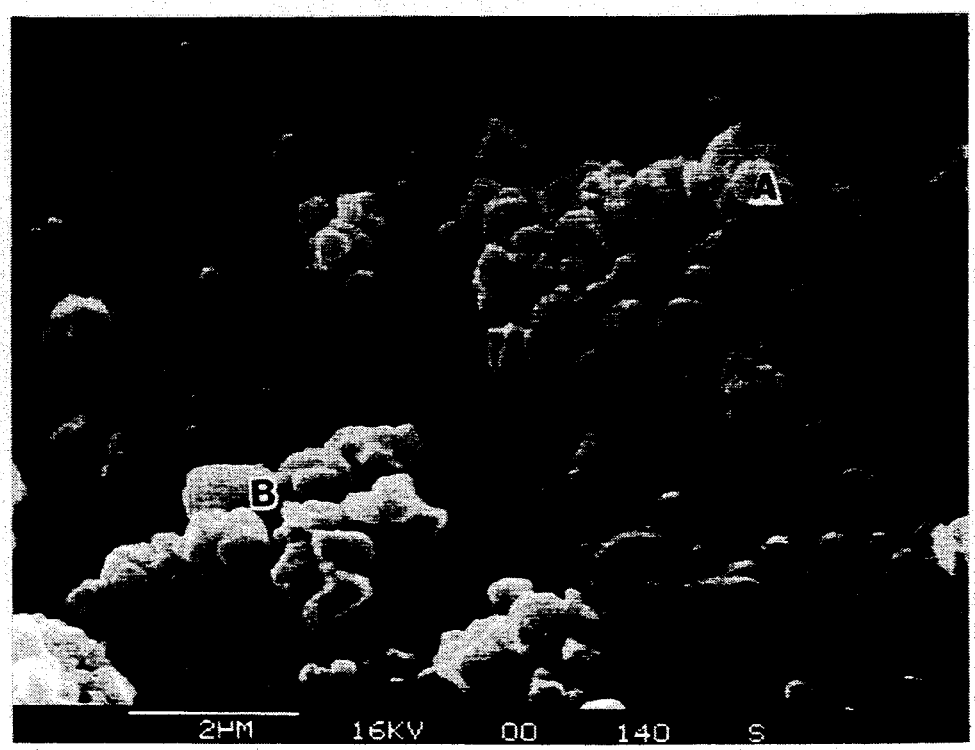
FIG. 6A is a SEM (Scanning Electron Microscope) photograph for zeolite LZ-239, (Example 4), as hereinafter discussed.
Figure 6B:
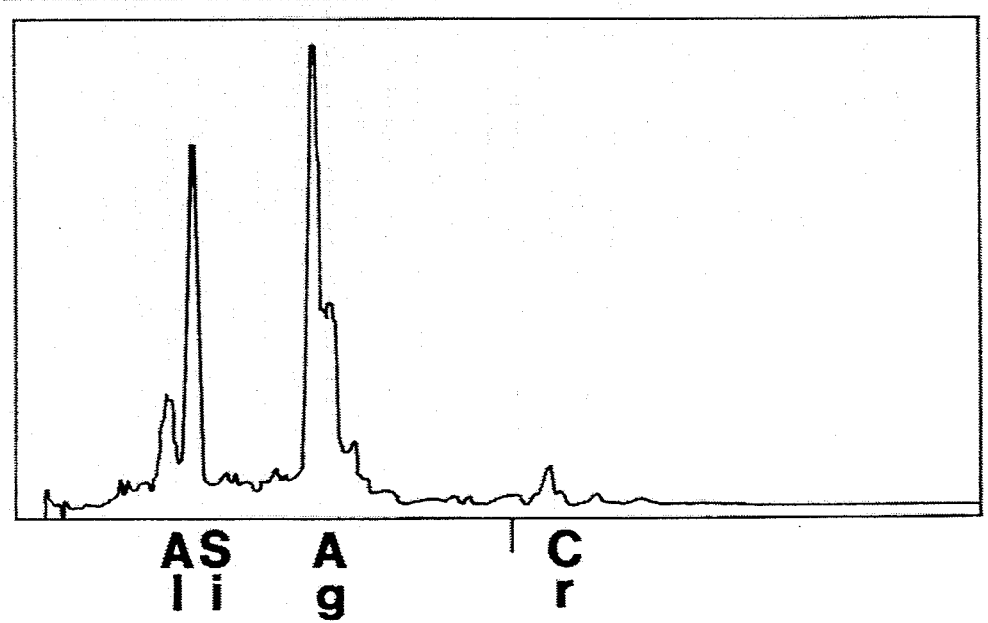
FIG. 6B is an EDAX (Energy Dispersive Analysis by X-ray) spot probe at point A in the photograph of FIG. 5A for zeolite LZ-239, (Example 4), as hereinafter discussed.

Two gm NH$_4$Y (anhydrous weight) containing 8.544 millimoles of Al were slurried in 100 ml distilled water heated at 75° C. Fifty ml of a second solution containing 21.36 millimoles CrF$_3$ and 64.08 millimoles NH$_4$F in 250 ml distilled water, was added incrementally to the zeolite slurry at a rate of 2 mi every 5 minutes. The slurry was digested for half an hour at 75° C. The product was filtered, washed free of soluble fluoride with hot distilled water, dried and characterized. The product contained 10 weight percent Cr$_2$O$_3$, showed good retention of X-ray crystallinity, and an estimated unit cell value of 24.64 Å. The SEM (Scanning Electron Microscope) photograph for zeolite LZ-239 is shown in FIG. 6A, and the EDAX results for Example 4 are shown in FIG. 6B.

The framework mole fractions of oxides are set forth below for the starting NH$_4$Y and the LZ-239 product.

(a) Mole fractions of oxides (TO$_2$): Starting NH$_4$Y: (Al$_{0.277}$Si$_{0.705}$☐$_{0.018}$)O$_2$ LZ-239 Product: (Al$_{0.204}$Cr$_{0.079}$Si$_{0.658}$☐$_{0.059}$)O$_2$ (b) Mole Fraction of Aluminum Removed, N: 0.073

(c) Percent of Aluminum Removed, N/a×100: 26

(d) Change in Defect Structure Factor, $z$: 0.041

(e) Moles of chromium Substituted per Mole of Aluminum Removed, c/N: 1.08

The molecular sieves denominated herein as LZ-239 have the characteristic crystal structure of zeolite Y as indicated by an X-ray powder diffraction pattern having at least the d-spacings as set forth in Table A.

TABLE A

| LZ-239 Cr$^{3+}$ Substituted Zeolite Y | |
|---|---|
| D(A) | Relative Intensity |
| 13.9–14.3 | vs |
| 8.4–8.8 | m |
| 7.2–7.6 | m |
| 5.5–5.7 | s |
| 4.6–4.8 | m |
| 4.3–4.5 | m |
| 3.7–3.9 | s |
| 3.2–3.4 | m |
| 2.7–2.9 | m |

The summary of the Chemical Analyses and Product Properties of Examples 1, 2, 3 and 4 are disclosed in Table B.

TABLE B

| | Summary of the Chemical Analyses and Product Properties of Examples 1–4 | | | | |
|---|---|---|---|---|---|
| | Starting NH$_4$Y | Example 1 (LZ-239) | Example 2 (LZ-239) | Example 3 (LZ-239) | Example 4 (LZ-239) |
| Chemical Analyses: | | | | | |
| Na$_2$O, wt. % | 2.32 | 1.06 | 1.97 | 1.64 | 1.66 |
| (NH$_4$)$_2$O, wt. % | 9.92 | 2.60 | 6.77 | 6.00 | 5.79 |
| Al$_2$O$_3$, wt. % | 21.78 | 11.47 | 18.62 | 17.05 | 17.38 |
| Cr$_2$O$_3$, wt. % | — | 11.15 | 10.58 | 10.10 | 9.93 |
| SiO$_2$, wt. % | 65.21 | 74.45 | 68.83 | 64.80 | 65.93 |
| F$_2$, wt. % | — | 0.40 | 0.87 | 0.80 | 0.61 |
| SiO$_2$/Al$_2$O$_3$ | 5.08 | 11.01 | 6.27 | 6.45 | 6.53 |
| SiO$_2$/[Al$_2$O$_3$ + Cr$_2$O$_3$] | 5.08 | 6.67 | 4.54 | 4.62 | 4.65 |
| M$^+$/Al | 1.07 | 0.60 | 0.89 | 0.85 | 0.81 |
| X-Ray Crystallinity: | | | | | |
| % by Area | 100 | 24 | 57 | 57 | 57 |
| % by Intensity | 100 | 22 | 55 | 57 | 56 |
| Unit Cell, a$_O$ in A | 24.71 | 24.55 | 24.58 | 24.63 | 24.64 |
| Framework Infrared: | | | | | |
| Asym, Stretch, cm$^{-1}$: | 1019 | 1050 | 1029 | 1029 | 1028 |
| Sym. Stretch, cm$^{-1}$: | 787 | 799 | 793 | 793 | 792 |
| Hydroxyl Region infrared: | | | | | |
| Absorb. @ 3710 cm$^{-1}$: | 0.042 | 0.415 | 0.117 | 0.111 | 0.139 |
| Defect Factor, z: | 0.018 | 0.176 | 0.050 | 0.047 | 0.059 |
| McBain Absorption Values: | | | | | |
| wt. % O$_2$ @ 100 torr and 90K: | 32.7 | 22.0 | 26.8 | 25.8 | 29.2 |
| wt. % H$_2$O @ 4.6 torr and 2.5° C.: | 30.6 | 22.2 | 26.5 | 26.4 | 28.9 |

EXAMPLE 5

Figure 1A:
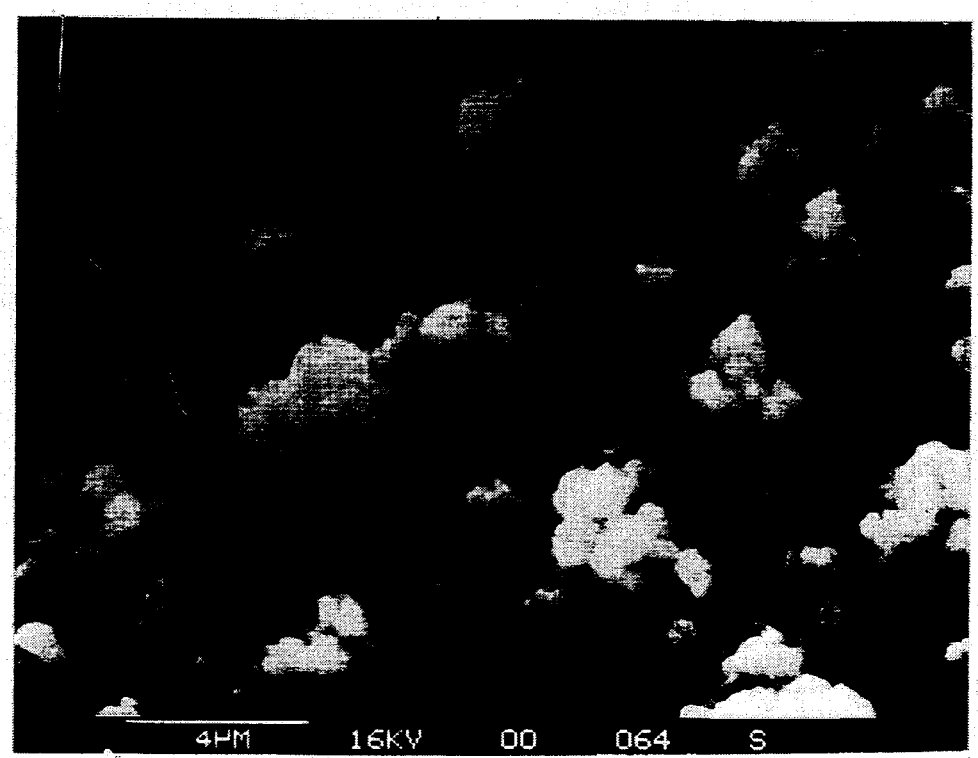
FIG. 1A is a SEM (Scanning Electron Microscope) photograph for zeolite LZ-239, (Example 2), as hereinafter discussed.
Figure 1B:
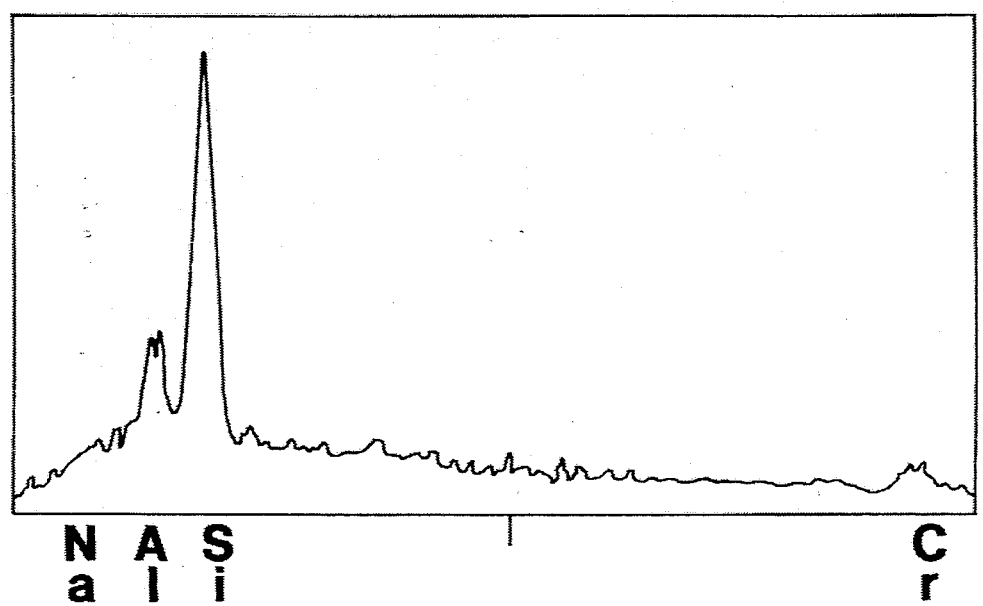
FIG. 1B is an EDAX (Energy Dispersive Analysis by X-ray) Area scan for the photograph of FIG. 1A for zeolite LZ-239, (Example 2), as hereinafter discussed.
Figure 2A:
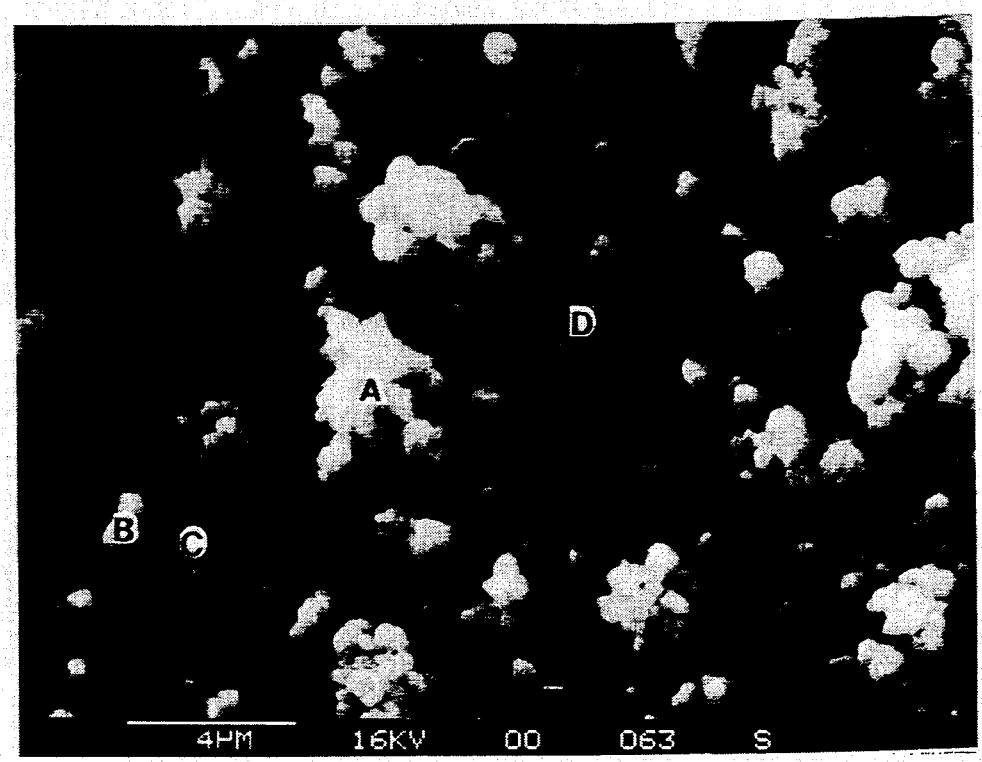
FIG. 2A is SEM (Scanning Electron Microscope) photograph for zeolite LZ-239, (Example 2), as hereinafter discussed.
Figure 2B:
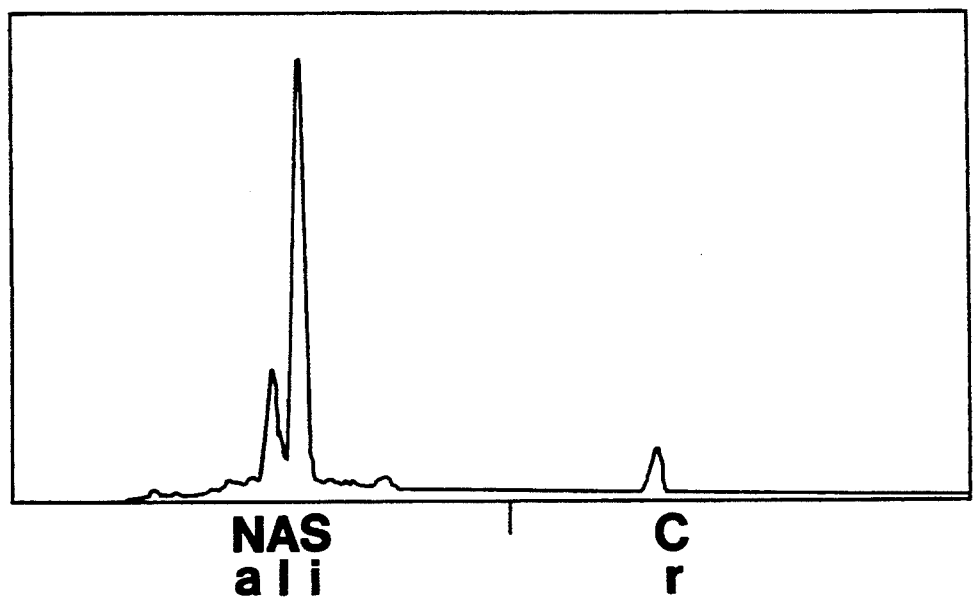
FIG. 2B is an EDAX (Energy Dispersive Analysis by X-ray) spot probe at point A in the photograph of FIG. 2A for zeolite LZ-239, (Example 2), as hereinafter discussed.
Figure 2C:
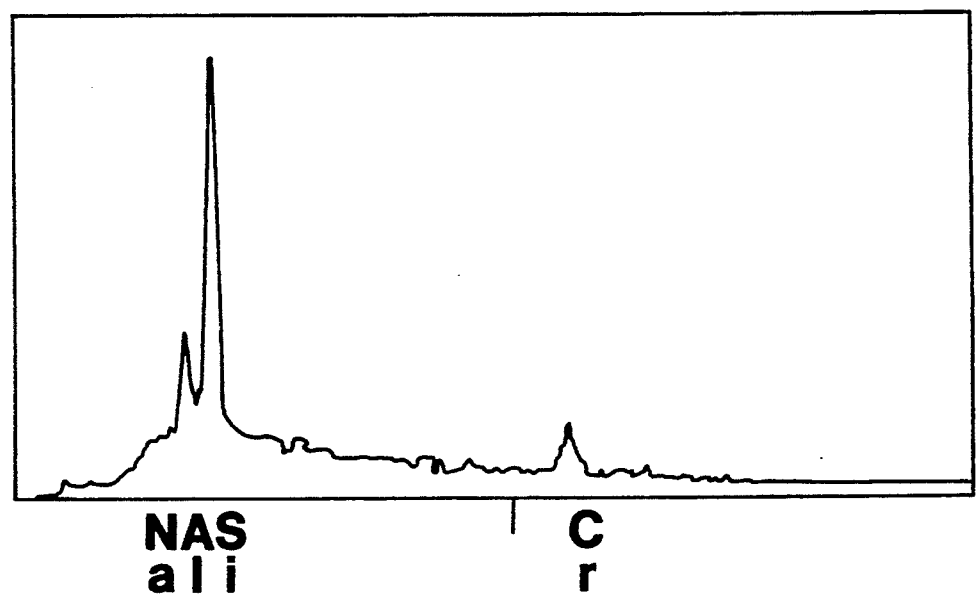
FIG. 2C is an EDAX (Energy Dispersive Analysis by X-ray) spot probe at point B in the photograph of FIG. 2A for zeolite LZ-239, (Example 2), as hereinafter discussed.
Figure 3A:
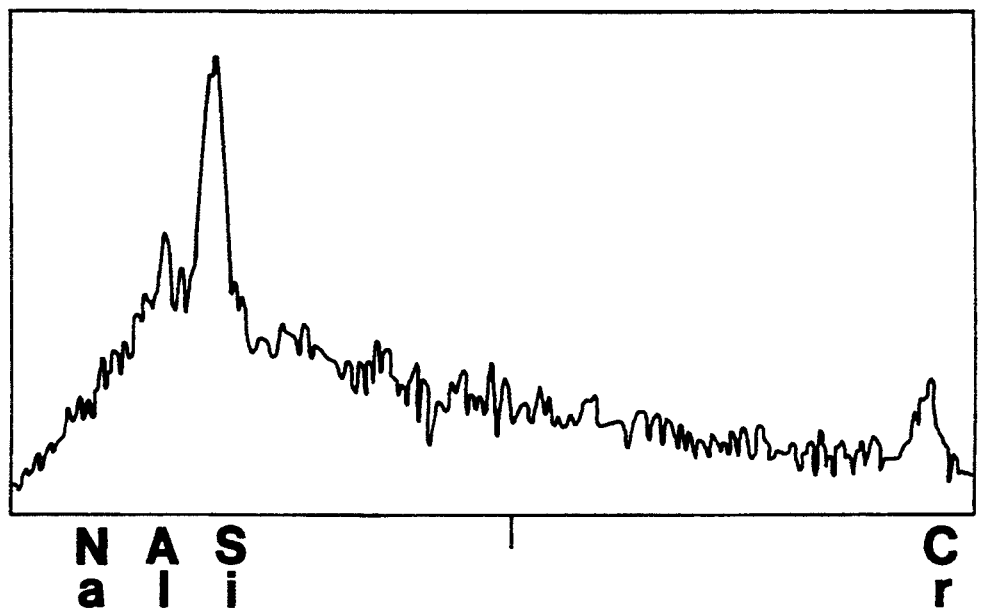
FIG. 3A is an EDAX (Energy Dispersive Analysis by X-ray) spot probe at point C in the photograph of FIG. 2A for zeolite LZ-239, (Example 2), as hereinafter discussed.
Figure 3B:
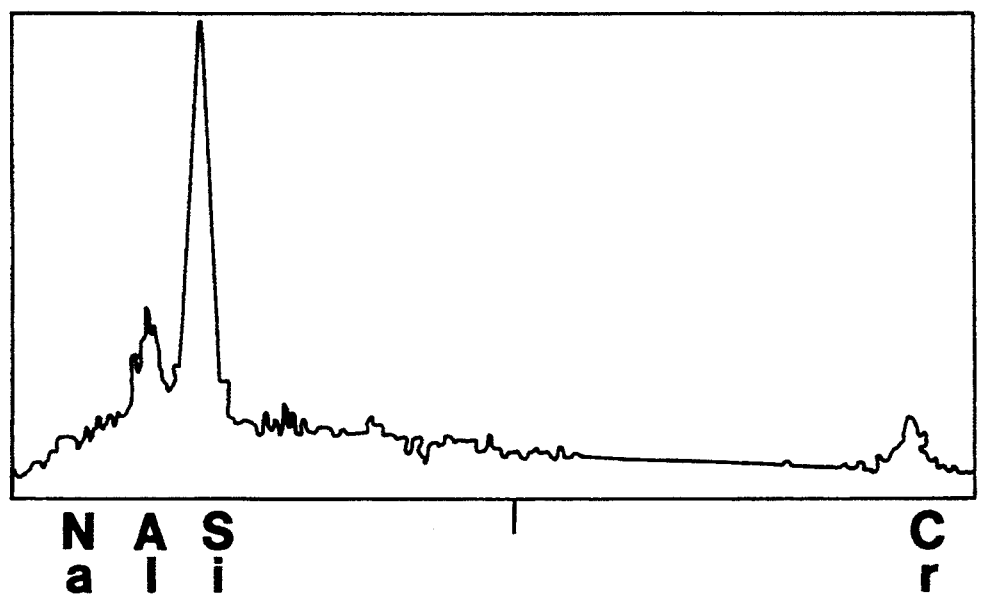
FIG. 3B is an EDAX (Energy Dispersive Analysis by X-ray) spot probe at point D in the photograph of FIG. 2A for zeolite LZ-239, (Example 2), as hereinafter discussed.
Figure 4A:
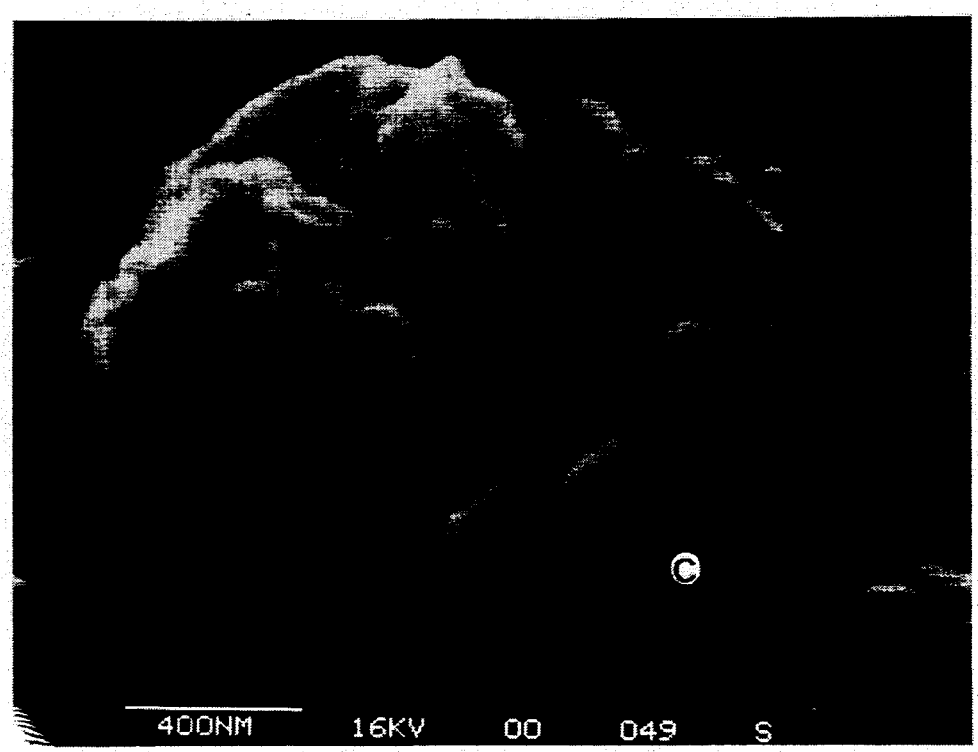
FIG. 4A is a SEM (Scanning Electron Microscope) photograph for zeolite LZ-239, (Example 2), as hereinafter discussed.
Figure 4B:
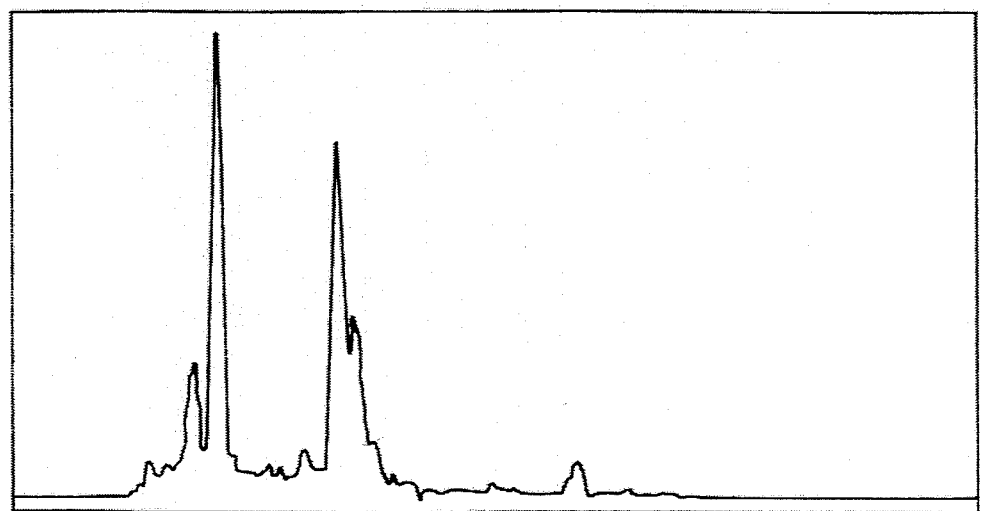
FIG. 4B is an EDAX (Energy Dispersive Analysis by X-ray) spot probe at point C in the photograph of FIG. 4A for zeolite LZ-239, (Example 2), as hereinafter discussed.

The products of Examples 2, 3 and 4 above were examined by SEM (Scanning Electron Microscopy) and EDAX analysis techniques. Using standard coating methods, the samples were first coated by carbon and examined, then coated with gold or silver and reexamined. The carbon coated samples provide better surfaces for EDAX analysis. Better resolution of the respective peaks of the different elements are obtained without interference from the large peaks due to gold or silver used to coat the samples. The gold or silver coating makes the sample a better conductor and better resolution of the details of the crystal surface is obtained. The crystals were examined first after carbon coating to obtain elemental analysis by EDAX. The substituting element, Cr, was located and the relative distribution of the element throughout the crystals was noted. Then the sample was coated with either gold or silver and the crystallite morphology was examined to ascertain whether there were unusual material deposits or whether the zeolite crystals had been altered. A sample showing the usual crystal morphology of the respective zeolite, with no spurious crystalline or amorphous "junk", and a relatively even distribution throughout the crystals of the substituting ion, was considered to be consistent with a conclusion that the substituting ion had indeed substituted into the zeolite framework. EDAX of the product of Example 2 showed that Cr was well dispersed throughout the zeolite crystals. Significant levels of Cr were found on crystals of all sizes. The amount of Cr was similar throughout the individual crystals in the sample and was no different from an EDAX area scan showing Cr distribution throughout the entire sample. (See FIGS. 1A, 1B, 2A, 2B, 2C, 3A and 3B). The silver coated sample showed fairly clean crystal surfaces with no evidence of any extraneous material deposited on or with the zeolite as a result of the Secondary Synthesis treatment. (See FIGS. 4A and 4B.)

A typical SEM and EDAX of the product of Example 3 is shown in FIGS. 5A and 5B and for Example 4 in FIGS. 6A and 6B. All are consistent with the other properties measured on the samples showing Cr substituting for Al in the framework of the Y zeolite. Cr substituted Y zeolite is denoted LZ-239.

EXAMPLE 6

Example 6 discloses the sbustitution of Cr$^{3+}$ in the framework of zeolite mordenite and the resulting product was designated LZ-249.

Twenty-five gm (anhydrous weight) of hydronium exchanged mordenite Zeolon was used. (Zeolon is a Trademark of Norton Co., Worcester, Mass., U.S.A.), H$_3$O$^+$ modenite, containing 49.85 millimoles of Al were slurried in 200 ml distilled water heated at 75° C. Fifty ml of a second solution containing 24.92 millimoles CrF$_3$ and 74.78 millimoles NH$_4$F in 50 ml distilled water, was added incrementally to the zeolite slurry at a rate of 2 ml every 4 minutes. Following the addition of the chrome solution, the temperature was raised to 95° C. and the slurry was digested for 3 hours at 95° C. The product was filtered. The first filtrate was green in color but was clear on continued washing with water. The solid product was green and was washed free of soluble fluoride with hot distilled water, dried and characterized. The product contained 3.5 weight percent $Cr_2O_3$ and showed excellent retention of X-ray crystallinity. The molecular sieves denominated herein as LZ-249 have the characteristic crystal structure of zeolite mordenite as indicated by an X-ray powder diffraction pattern having at least the d-spacings as set forth in Table C.

TABLE C

LZ-249 $Cr^{3+}$ Substituted Mordenite

| D(A) | Relative Intensity |
|---|---|
| 13.3–13.7 | m |
| 8.8–9.2 | m |
| 6.4–6.6 | s |
| 4.4–4.6 | s |
| 3.9–4.1 | s |
| 3.7–3.9 | m |
| 3.4–3.6 | vs |
| 3.3–3.5 | s |
| 3.1–3.3 | s |

The framework mole fractions of oxides are set forth below for the starting $H_3O^+$ and the LZ-249 product.

(a) Mole fractions of oxides $(TO_2)$: Starting $H_3O^+$ mordenite: $(Al_{0.097}Si_{0.715}\square_{0.188})O_2$ LZ-249 Product: $(Al_{0.083}Cr_{0.026}Si_{0.777}\square_{0.114})O_2$ (b) Mole Fraction of Aluminum Removed, N: 0.014

(c) Percent of Aluminum Removed, N/a×100: 14

(d) Change in Defect Structure Factor, $z$: −0.074

(e) Moles of Chromium Substituted per Mole of Aluminum Removed, c/N:1.86

A comparison of the $Cr^{3+}$ substituted product, designated LZ-249, with the starting $H_3O^+$ mordenite is shown in Table D.

TABLE D

Summary of the Chemical Analyses and Product Properties of Examples 1–4

| | Starting $H_3O^+$ mordenite | Example 6 (LZ-249) |
|---|---|---|
| Chemical Analyses: | | |
| $Na_2O$, wt. % | 0.54 | 0.14 |
| $(NH_4)_2O$, wt. % | — | 2.97 |
| $Al_2O_3$, wt. % | 10.17 | 7.78 |
| $Cr_2O_3$, wt. % | — | 3.54 |
| $SiO_2$, wt. % | 88.01 | 85.53 |
| $F_2$, wt. % | — | 0.40 |
| $SiO_2/Al_2O_3$ | 14.69 | 18.66 |
| $SiO_2/[Al_2O_3 + Cr_2O_3]$ | 14.69 | 14.29 |
| $M^+/Al$ | 0.09 | 0.89 |
| X-Ray Crystallinity: | | |
| % by Area | 100 | 107 |
| % by Intensity | 100 | 114 |
| Framework Infrared: | | |
| Asym. Stretch cm.$^{-1}$: | 1080 | 1080 |
| Sym. Stretch, cm$^{-1}$: | 788 | 793 |
| Hydroxyl Region Infrared: | | |
| Absorb. @ 3710 cm$^{-1}$: | 0.442 | 0.269 |
| Defect Factor, z: | 0.188 | 0.114 |
| McBain Absorption Values: | | |
| wt. % $O_2$ @ 100 torr and 90K: | 18.68 | 18.27 |
| wt. % $H_2O$ @ 4.6 torr and 25° C.: | 15.68 | 14.03 |
| wt. % neopentane @ 500 torr & 25° C.: | 5.96 | 5.08 |
| wt. % $SF_6$ @ 400 torr and 25° C. | 10.59 | 8.63 |

EXAMPLE 7

Example 7 discloses the substitution of $Cr^{3+}$ in the framework of zeolite LZ-202 and the resulting product was designated LZ-250.

LZ-202 is an omega type zeolite, possessing structure and properties similar to zeolite omega, but synthesized in an organic-free medium. Twenty five gm (anhydrous weight) of ammonium exchanged LZ-202 containing 91.70 millimoles of Al were slurried in 200 ml distilled water heated at 75° C. A second solution containing 45.85 millimoles $CrF_3$ and 137.55 millimoles $NH_4F$ in 100 ml distilled water was added incrementally to the zeolite slurry at a rate of 5 ml every 5 minutes. Following the addition of the chrome solution, the temperature was raised to 95° C. and the slurry was digested for 3 hours at 95° C. The product was filtered. The first filtrate was green in color but was clear on washing with water. The solid product was green and was washed free of soluble fluoride with hot distilled water, dried and characterized. The product contained 8.5 weight percent $Cr_2O_3$ and showed fair retention of X-ray crystallinity. However, measurements of the McBain adsorption capacity showed almost complete retention of pore volume and is probably a better measure of crystallinity retention than X-ray. Incorporation of the heavier chromium atom into the framework would cause reduced intensity and area values due to scatter. The molecular sieves denominated herein as LZ-250 have the characteristic crystal structure of zeolite LZ-202 as indicated by an X-ray powder diffraction pattern having at least the d-spacings as set forth in Table E.

TABLE E

LZ-250 $Cr^{3+}$ Substituted Zeolite LZ-202

| D(A) | Relative Intensity |
|---|---|
| 15.4–15.8 | m |
| 8.9–9.3 | vs |
| 7.6–8.0 | s |
| 6.6–7.0 | s |
| 5.7–6.1 | s |
| 4.6–4.8 | m |
| 3.7–3.9 | s |
| 3.6–3.8 | m |
| 3.5–3.7 | m |
| 3.4–3.6 | s |
| 3.05–3.25 | s |
| 2.98–3.18 | s |
| 2.92–3.12 | m |
| 2.81–3.01 | s |

A comparison of the $Cr^{3+}$ substituted product, LZ-250, with the starting $NH_4^+$ zeolite LZ-202 is shown in the following Table F.

TABLE F

Summary of the Chemical Analyses and Properties of LZ-250 with the Starting $NH_4^+$ zeolite LZ-202.

| | Starting $NH_4$ LZ-202 | Example 7 (LZ-250) |
|---|---|---|
| Chemical Analyses: | | |
| $Na_2O$, wt. % | <0.02 | — |
| $(NH_4)_2O$, wt. % | 8.78 | 7.06 |
| $Al_2O_3$, wt. % | 18.70 | 14.98 |
| $Cr_2O_3$, wt. % | — | 8.53 |
| $SiO_2$, wt. % | 72.98 | 69.79 |
| $F_2$, wt. % | — | 0.83 |
| $SiO_2/Al_2O_3$ | 6.62 | 7.91 |
| $SiO_2/[Al_2O_3 + Cr_2O_3]$ | 6.62 | 5.72 |
| $M^+/Al$ | 0.92 | 0.92 |
| X-Ray Crystallinity: | | |

TABLE F-continued

Summary of the Chemical Analyses and Properties of LZ-250 with the Starting $NH_4^+$ zeolite LZ-202.

| | Starting $NH_4$ LZ-202 | Example 7 (LZ-250) |
|---|---|---|
| % by Area | 100 | 55 |
| % by Intensity | 100 | 61 |
| Framework Infrared: | | |
| Asym. Stretch, $cm^{-1}$: | 1038 | 1042 |
| Sym. Stretch, $cm^{-1}$: | 816 | 817 |
| Hydroxyl Region Infrared: | | |
| Absorb. @ 3710 $cm^{-1}$: | 0.114 | 0.118 |
| Defect Factor, z: | 0.048 | 0.050 |
| McBain Absorption Values: | | |
| wt. % $O_2$ @ 100 torr and 90K: | 18.18 | 18.02 |
| wt. % $H_2O$ @ 4.6 torr and 25° C.: | 18.48 | 17.02 |
| wt. % neopentane @ 500 torr & 25° C.: | 1.50 | 3.90 |
| wt. % $SF_6$ @ 400 torr and 25° C. | — | 3.18 |

The framework mole fractions of oxides are set forth below for the starting $NH_4$-LZ-202 and the LZ-250 product.

(a) Mole fractions of oxides ($TO_2$): Starting $NH_4$-LZ-202: $(Al_{0.221}Si_{0.731}\square_{0.048})O_2$ LZ-250 Product: $(Al_{0.178}Cr_{0.068}Si_{0.704}\square_{0.050})O_2$ (b) Mole Fraction of Aluminum Removed, N: 0.043
(c) Percent of Aluminum Removed, N/a×100: 19
(d) Change in Defect Structure Factor, $_z$: 0.002
(e) Moles of chromium Substituted per Mole of Aluminum Removed, c/N: 1.58

EXAMPLE 8

Example 8 discloses the substitution of $Cr^{3+}$ in the framework of zeolite L and the resulting product was designated LZ-251.

Twenty-five gm (anhydrous weight) of ammonium exchanged zeolite L, $NH_4^+$ zeolite L, containing 95.25 millimoles of Al were slurried in 200 ml distilled water heated at 75° C. 100 ml of a second solution containing 47.62 millimoles $CrF_3$ and 142.88 millimoles $NH_4F$ in distilled water was added incrementally to the zeolite slurry at a rate of 5 ml every 5 minutes. Following the addition of the chrome solution, the temperature was raised to 95° C. and the slurry was digested for 3 hours at 95° C. The product was filtered and washed free of soluble fluoride. All of the filtrates were colorless. The solid product was green, contained 8.3 weight percent $Cr_2O_3$ and showed good retention of X-ray crystallinity. Again, measurement of the retention of adsorption capacity is a better measure of the retained crystallinity of the product due to scatter of X-rays by the heavier chromium atom. The molecular sieves denominated herein as LZ-251 have the characteristic crystal structure of zeolite L as indicated by an X-ray powder diffraction pattern having at least the d-spacings as set forth in Table G.

TABLE G

LZ-251 $Cr^{3+}$ Substituted Zeolite L

| D(A) | Relative Intensity |
|---|---|
| 15.6–16.0 | vs |
| 5.9–6.1 | s |
| 5.7–5.9 | m |
| 4.5–4.7 | s |
| 4.3–4.5 | m |
| 4.2–4.4 | m |
| 3.8–4.0 | m |
| 3.56–3.76 | m |
| 3.38–3.58 | m |
| 3.18–3.38 | m |
| 3.08–3.28 | s |
| 2.97–3.17 | m |
| 2.81–3.01 | m |

The framework mole fractions of oxides are set forth below for the starting $NH_4L$ and the LZ-251 product.

(a) Mole fractions of oxides ($TO_2$): Starting $NH_4L$: $(Al_{0.248}Si_{0.732}\square_{0.020})O_2$ LZ-251 Product: $(Al_{0.194}Cr_{0.069}Si_{0.690}\square_{0.047})O_2$ (b) Mole Fraction of Aluminum Removed, N: 0.054
(c) Percent of Aluminum Removed, N/a×100: 22
(d) Change in Defect Structure Factor, $_z$: 0.027
(e) Moles of chromium Substituted per Mole of Aluminum Removed, c/N: 1.28

A comparison of the $Cr^{3+}$ substituted product, LZ-251, with the starting $NH_4^+$ zeolite L is shown in the following Table H.

TABLE H

Summary of the Chemical Analyses and Properties of LZ-251 with the Starting $NH_4$ zeolite L

| | Starting $NH_4$ L | Example 8 (LZ-251) |
|---|---|---|
| Chemical Analyses: | | |
| $K_2O$, wt. % | 3.51 | 2.98 |
| $(NH_4)_2O$, wt. % | 7.89 | 5.71 |
| $Al_2O_3$, wt. % | 19.42 | 15.71 |
| $Cr_2O_3$, wt. % | — | 8.33 |
| $SiO_2$, wt. % | 67.80 | 65.83 |
| $F_2$, wt. % | — | 0.89 |
| $SiO_2/Al_2O_3$ | 5.92 | 7.11 |
| $SiO_2/[Al_2O_3 + Cr_2O_3]$ | 5.92 | 5.24 |
| $M^+/Al$ | 1.00 | 0.92 |
| X-Ray Crystallinity: | | |
| % by Area | 100 | 64 |
| % by Intensity | 100 | 64 |
| Framework Infrared: | | |
| Asym. Stretch, $cm^{-1}$: | 1028 | 1031 |
| Sym. Stretch, $cm^{-1}$: | 768 | 772 |
| Hydroxyl Region Infrared: | | |
| Absorb. @ 3710 $cm^{-1}$: | 0.048 | 0.111 |
| Defect Factor, z: | 0.020 | 0.047 |
| McBain Absorption Values: | | |
| wt. % $O_2$ @ 100 torr and 90K: | 16.14 | 15.78 |
| wt. % $H_2O$ @ 4.6 torr and 25° C.: | 17.97 | 17.16 |
| wt. % neopentane @ 500 torr & 25° C.: | — | 8.41 |
| wt. % $SF_6$ @ 400 torr and 25° C. | — | — |

EXAMPLE 9

Example 9 discloses the substitution of $Sn^{2+}$ in the framework of zeolite Y and the resulting product was designated LZ-238.

Two gm $NH_4^+$ zeolite Y (anhydrous weight) containing 8.544 millimoles of Al were slurried in 100 ml distilled water heated at 75° C. Fifty five ml of a second solution containing 4.27 millimoles $NH_4SnF_3$ in distilled water wasd added incrementally to the zeolite slurry at a rate of 5 ml every 5 minutes. Following addition of the fluorostannate solution, the slurry was digested for 3 hours at 95° C. The solid product was filtered, washed free of soluble fluoride, dried and characterized. The LZ-238 product was yellow and contained 22.7 weight percent SnO as determined by chemical analysis. Based on the total characterization of the product, it is believed that a large fraction of the tin has replaced aluminum in the zeolite framework. The remainder of the tin is present both as cation and as a precipitated oxide, SnO. The X-ray powder pattern showed a trace of SnO in the background of the pattern and a substantial reduction in the X-ray crystallinity of the Y zeolite. However, McBain adsorption capacities measured on the product show that at least 80 percent of the void volume of the LZ-238 was retained. The reduced X-ray crystallinity may be due to scatter caused by incorporation of the heavier tin atom into the structure of the zeolite. The molecular sieves denominated herein as LZ-238 have the characteristic crystal structure of zeolite Y as indicated by an X-ray powder diffraction pattern having at least the d-spacings as set forth in Table I.

TABLE I

LZ-238 $Sn^{2+}$ Substituted Zeolite Y

| D(A) | Relative Intensity |
|---|---|
| 13.9–14.3 | vs |
| 8.4–8.8 | m |
| 7.2–7.6 | m |
| 5.5–5.7 | s |
| 4.6–4.8 | m |
| 4.3–4.5 | m |
| 3.7–3.9 | s |
| 3.2–3.4 | m |
| 2.7–2.9 | m |

A comparison of the $Sn^{2+}$ substituted product, LZ-238, with the starting $NH_4^+$ zeolite Y is shown in the following Table J.

TABLE J

Summary of the Chemical Analyses and Properties of LZ-238 with the Starting $NH_4^+$ zeolite Y

| | Starting $NH_4$ Y | Example 9 (LZ-238) |
|---|---|---|
| Chemical Analyses: | | |
| $Na_2O$, wt. % | 2.32 | 1.78 |
| $(NH_4)_2O$, wt. % | 9.92 | 4.99 |
| $Al_2O_3$, wt. % | 21.78 | 14.96 |
| $Sn_2O_3$, wt. % | — | 22.68 |
| $SiO_2$, wt. % | 65.21 | 53.56 |
| $F_2$, wt. % | — | 0.07 |
| $SiO_2/Al_2O_3$ | 5.08 | 6.07 |
| $SiO_2/[Al_2O_3 + SnO/2]$ | 5.08 | 3.86 |
| $M^+/Al$; ($Na^+, NH_4^+$): | 1.07 | 0.85 |
| X-Ray Crystallinity: | | |
| % by Area | 100 | 30 |
| % by Intensity | 100 | 29 |
| Unit Cell, $a_0$ in A: | 24.71 | 24.54 |
| Framework Infrared: | | |
| Asym. Stretch, $cm^{-1}$: | 1019 | 1027 |
| Sym. Stretch, $cm^{-1}$: | 787 | 792 |
| Hydroxyl Region Infrared: | | |
| Absorb. @ 3710 $cm^{-1}$: | 0.042 | 0.123 |
| Defect Factor, z: | 0.018 | 0.052 |
| McBain Absorption Values: | | |
| wt. % $O_2$ @ 100 torr and 90K: | 32.70 | 23.54 |
| wt. % $H_2O$ @ 4.6 torr and 25° C.: | 30.60 | 24.48 |
| wt. % neopentane @ 500 torr & 25° C.: | — | — |
| wt. % $SF_6$ @ 400 torr and 25° C. | — | — |

The framework mole fractions of oxides are set forth below for the starting $NH_4Y$ and the LZ-238 product.

(a) Mole fractions of oxides ($TO_2$): Starting $NH_4Y$: $(Al_{0.277}Si_{0.705}\square_{0.018})O_2$ LZ-238 Product: $(Al_{0.206}Sn_{0.118}Si_{0.624}\square_{0.052})O_2$ (b) Mole Fraction of Aluminum Removed, N: 0.071

(c) Percent of Aluminum Removed, $N/a \times 100$: 26

(d) Change in Defect Structure Factor, $z$: 0.034

(e) Moles of chromium Substituted per Mole of Aluminum Removed, c/N: 1.66

EXAMPLE 10

Example 10 discloses the substitution of $Sn^{2+}$ in the framework of zeolite mordenite and the resulting product was designated LZ-252.

Figure 7A:
FIG. 7A is a SEM (Scanning Electron Microscope) photograph for zeolite LZ-252, (Example 10), as hereinafter discussed.
Figure 7B:
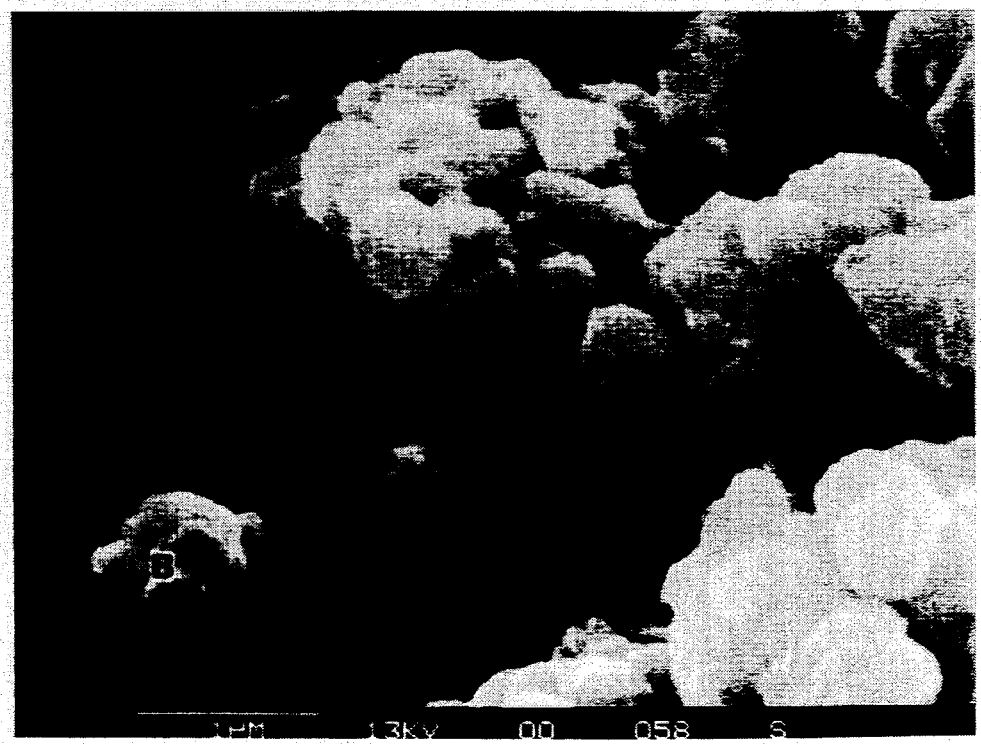
FIG. 7B is a SEM (Scanning Electron Microscope) photograph for zeolite LZ-252, (Example 10), as hereinafter discussed.
Figure 8A:
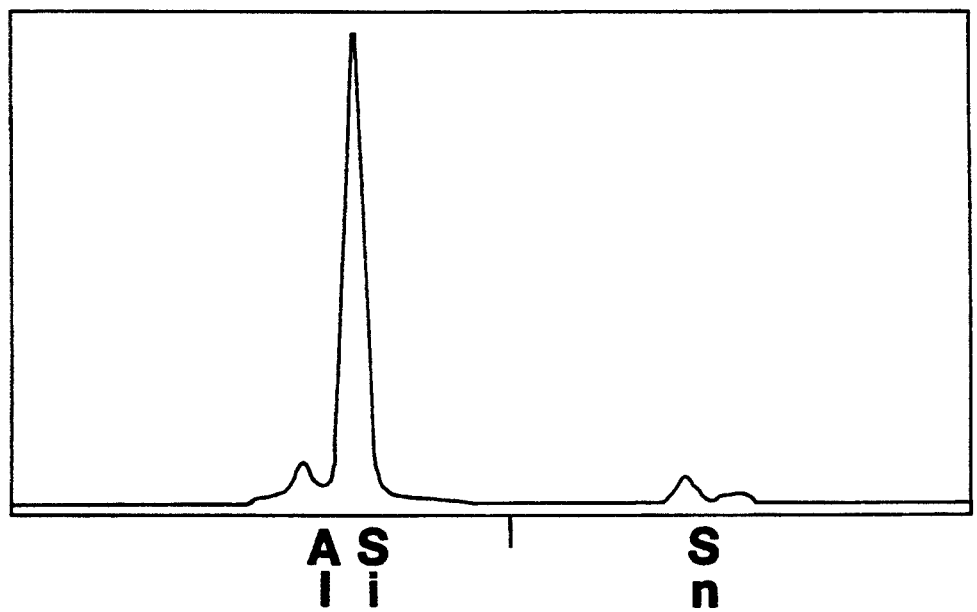
FIG. 8A is an EDAX (Energy Dispersive Analysis by X-ray) Area scan for the photograph of FIG. 7A for zeolite LZ-252, (Example 10), as hereinafter discussed.
Figure 8B:
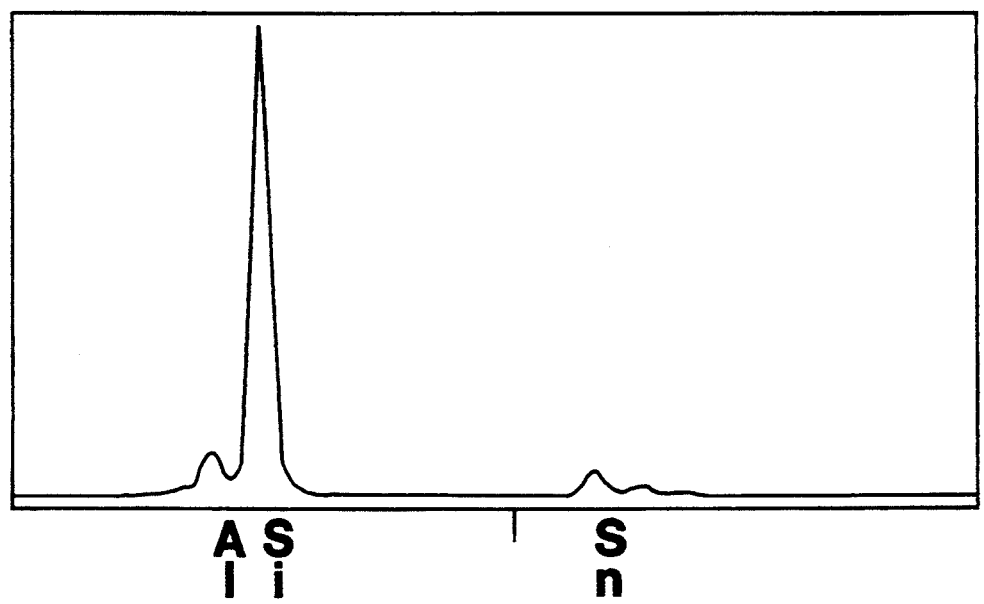
FIG. 8B is an EDAX (Energy Dispersive Analysis by X-ray) spot probe at point B in the photograph of FIG. 7B for zeolite LZ-252, (Example 10), as hereinafter discussed.

Twenty-five gm (anhydrous weight) of hydronium exchanged mordenite Zeolon was used. (Zeolon is a Trademark of Norton Co., Worcester, Mass., U.S.A.), $H_3O^+$ mordenite, containing 49.85 millimoles of Al were slurried in 200 ml distilled water heated at 75° C. A second solution containing 24.92 millimoles $NH_4SnF_3$ in 100 ml distilled water was added incrementally to the zeolite slurry at a rate of 5 ml every 5 minutes. Following the addition of the tin solution, the temperature was raised to 95° C. and the slurry was digested for 3 hours at 95° C. The product was filtered, washed free of soluble fluoride with hot distilled water, dried and characterized. The product was colorless, contained 12.3 weight percent SnO and showed good retention of X-ray crystallinity. No crystalline SnO was detected in the background of the X-ray powder pattern. The SEM (Scanning Electron Microscope) photographs for zeolite LZ-252 are shown in FIGS. 7A and 7B, and the EDAX results for Example 10 are shown in FIGS. 8A and 8B. The molecular sieves denominated herein as LZ-252 have the characteristic crystal structure of zeolite mordenite as indicated by an X-ray powder diffraction pattern having at least the d-spacings as set forth in Table K.

TABLE K

LZ-252 $Sn^{2+}$ Substituted Mordenite

| D(A) | Relative Intensity |
|---|---|
| 13.3–13.7 | s |
| 8.8–9.2 | vs |
| 6.4–6.6 | s |
| 4.4–4.6 | s |
| 3.9–4.1 | s |
| 3.7–3.9 | m |
| 3.4–3.6 | vs |
| 3.3–3.5 | s |
| 3.1–3.3 | s |

The framework mole fractions of oxides are set forth below for the starting $H_3O^+$ mordenite and the LZ-252 product.

(a) Mole fractions of oxides ($TO_2$): Starting $H_3O^+$ mordenite: $(Al_{0.097}Si_{0.715}\square_{0.088})O_2$ LZ-252 Product: $(Al_{0.-58}Sn_{0.052}Si_{0.764}\square_{0.126})O_2$ (b) Mole Fraction of Aluminum Removed, N: 0.039

(c) Percent of Aluminum Removed, $N/a \times 100$: 40

(d) Change in Defect Structure Factor, $z$: −0.062

(e) Moles of chromium substituted per mole of aluminum Removed, c/N: 1.33

A comparison of the $Sn^{2+}$ substituted product, LZ-252, with the starting $H_3O^+$ mordenite, is shown in the following Table L.

TABLE L

Summary of the Chemical Analyses and Properties of LZ-252 with the Starting $H_3O^+$ mordenite.

| | Starting $H_3O^+$ mordenite | Example 10 (LZ-252) |
|---|---|---|
| Chemical Analyses: | | |
| $Na_2O$, wt. % | 0.54 | — |
| $(NH_4)_2O$, wt. % | — | 2.03 |
| $Al_2O_3$, wt. % | 10.17 | 5.18 |
| SnO, wt. % | — | 12.27 |
| $SiO_2$, wt. % | 88.01 | 80.29 |
| $F_2$, wt. % | — | 0.10 |
| $SiO_2/Al_2O_3$ | 14.69 | 26.31 |
| $SiO_2/[Al_2O_3 + SnO/2]$ | 14.69 | 13.87 |
| $M^+/Al$ | 0.09 | 0.77 |
| X-Ray Crystallinity: | | |
| % by Area | 100 | 65 |
| % by Intensity | 100 | 65 |
| Framework Infrared: | | |
| Asym. Stretch, $cm^{-1}$: | 1080 | 1082 |
| Sym. Stretch, $cm^{-1}$: | 788 | 804 |
| Hydroxyl Region Infrared: | | |
| Absorb. @ 3710 $cm^{-1}$: | 0.442 | 0.298 |
| Defect Factor, z: | 0.188 | 0.126 |
| McBain Absorption Values: | | |
| wt. % $O_2$ @ 100 torr and 90K: | 18.68 | 14.99 |
| wt. % $H_2O$ @ 4.6 torr and 25° C.: | 15.68 | 11.29 |
| wt. % neopentane @ 500 torr & 25° C.: | 5.96 | 1.43 |
| wt. % $SF_6$ @ 400 torr and 25° C. | 10.59 | 3.63 |

EXAMPLE 11

Example 11 discloses the substitution of $Sn^{2+}$ in the framework of zeolite LZ-202 and the resulting product was designated LZ-253.

Figure 9:
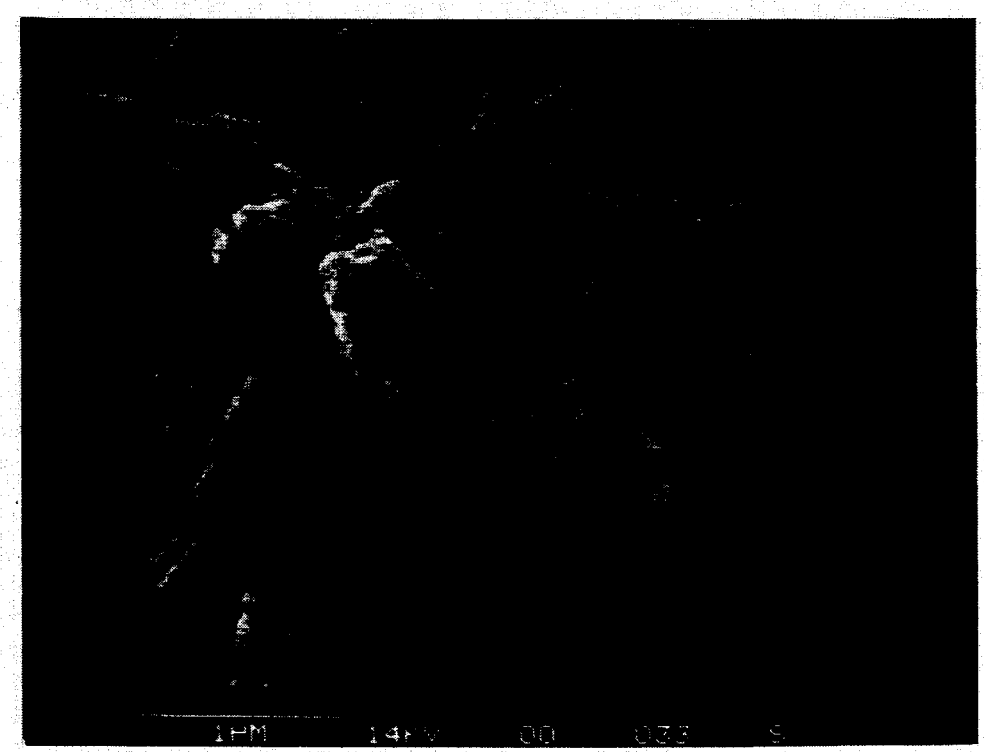
FIG. 9, is a SEM (Scanning Electron Microscope) photograph for zeolite LZ-253, (Example 11), as hereinafter discussed.
Figure 10A:
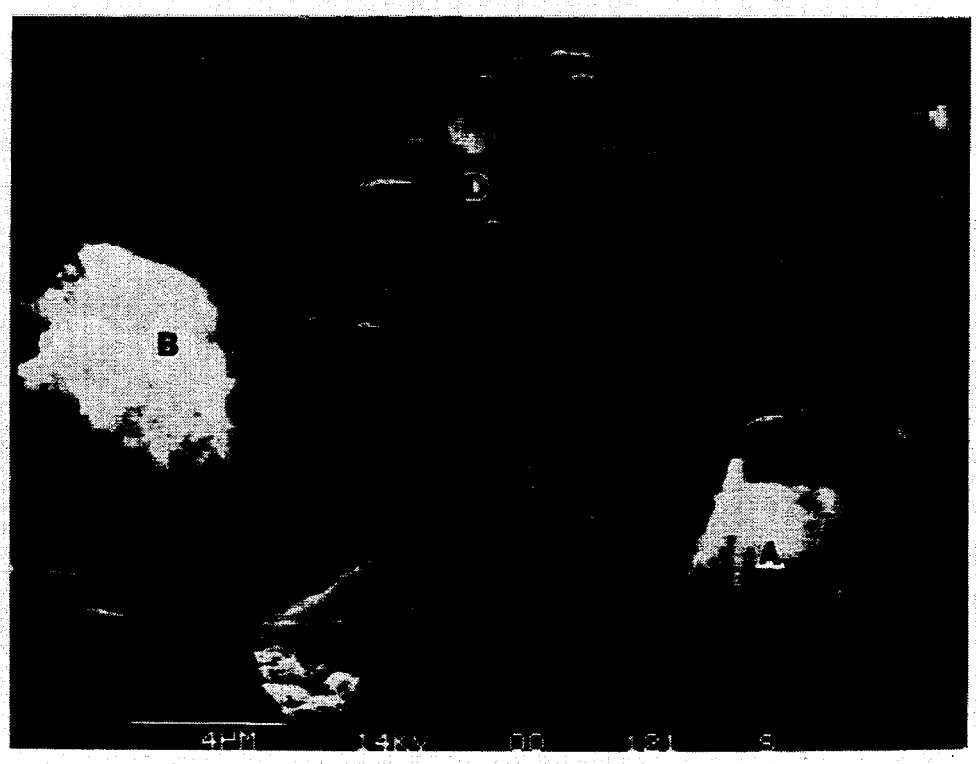
FIG. 10A is a SEM (Scanning Electron Microscope) photograph for zeolite LZ-253, (Example 11), as hereinafter discussed.

LZ-202 is an omega type zeolite, possessing structure and properties similar to zeolite omega, but synthesized in an organic-free medium. Twenty-five gm (anhydrous weight) of ammonium exchanged LZ-202 containing 91.70 millimoles of Al were slurried in 200 ml distilled water heated at 75° C. A second solution containing 45.85 millimoles $NH_4SnF_3$ in 100 ml distilled water was added incrementally to the zeolite slurry at a rate of 5 ml every 5 minutes. Following the addition of the tin solution, the temperature was raised to 95° C. and the slurry was digested for 3 hours at 95° C. The product was filtered, washed free of soluble fluoride with hot distilled water, dried and characterized. The product contained 15.6 weight percent SnO and showed reduced X-ray crystallinity. McBain adsorption values indicate retention of at least 90 percent of the void volume showing that the reduced X-ray crystallinity is probably due to scatter caused by incorporation of the heavier tin atom into the framework structure of the zeolite. The SEM (Scanning Electron Microscope) photographs for zeolite LZ-253 are shown in FIGS. 9, 10A and 11A, and the EDAX results for Example 11 are shown in FIGS. 10B, 11B, 12A and 12B. The molecular sieves denominated herein as LZ-253 have the characteristic crystal structure of zeolite LZ-202 as indicated by an X-ray powder diffraction pattern having at least the d-spacings as set forth in Table M.

TABLE M

LZ-252 $Sn^{2+}$ Substituted Zeolite LZ-202

| D(Å) | Relative Intensity |
|---|---|
| 15.4–15.8 | m |
| 8.9–9.3 | vs |
| 7.6–8.0 | s |
| 6.6–7.0 | s |
| 5.7–6.1 | s |
| 4.6–4.8 | m |
| 3.7–3.9 | s |
| 3.6–3.8 | s |
| 3.5–3.7 | m |
| 3.4–3.6 | s |
| 3.05–3.25 | s |
| 2.98–3.18 | s |
| 2.92–3.12 | m |
| 2.81–3.01 | s |

A comparison of the $Sn^{2+}$ substituted product, zeolite LZ-253, with the starting $NH_4^+$ zeolite LZ-202 is shown in the following Table N.

TABLE N

Summary of the Chemical Analyses and Properties of LZ-253 with the Starting $NH_4$ zeolite LZ-202.

| | Starting $NH_4$-LZ-202 | Example 11 (LZ-253) |
|---|---|---|
| Chemical Analyses: | | |
| $Na_2O$, wt. % | <0.02 | — |
| $(NH_4)_2O$, wt. % | 8.78 | 6.67 |
| $Al_2O_3$, wt. % | 18.70 | 13.66 |
| SnO, wt. % | — | 15.63 |
| $SiO_2$, wt. % | 72.98 | 62.51 |
| $F_2$, wt. % | — | 0.11 |
| $SiO_2/Al_2O_3$ | 6.62 | 7.77 |
| $SiO_2/[Al_2O_3 + SnO/2]$ | 6.62 | 5.42 |
| $M^+/Al$ | 0.92 | 0.96 |
| X-Ray Crystallinity: | | |
| % by Area | 100 | 41 |
| % by Intensity | 100 | 41 |
| Framework Infrared: | | |
| Asym. Stretch, $cm^{-1}$: | 1038 | 1042 |
| Sym. Stretch, $cm^{-1}$: | 816 | 815 |
| Hydroxyl Region Infrared: | | |
| Absorb. @ 3710 $cm^{-1}$: | 0.114 | 0.133 |
| Defect Factor, z: | 0.048 | 0.056 |
| McBain Absorption Values: | | |
| wt. % $O_2$ @ 100 torr and 90K: | 18.18 | 15.99 |
| wt. % $H_2O$ @ 4.6 torr and 25° C.: | 18.48 | 16.40 |
| wt. % neopentane @ 500 torr & 25° C.: | 1.50 | 1.40 |
| wt. % $SF_6$ @ 400 torr and 25° C. | — | — |

The framework mole fractions of oxides are set forth below for the starting $NH_4$-LZ-202 and the LZ-253 product.

(a) Mole fractions of oxides ($TO_2$): Starting $NH_4$-LZ-202: $(Al_{0.221}Si_{0.731}\square 0.048)O_2$ LZ-253 Product: $(Al_{0.177}Sn_{0.077}Si_{0.690}\square 0.056)O_2$ (b) Mole Fraction of Aluminum Removed, N: 0.044

(c) Percent of Aluminum Removed, N/a×100: 20

(d) Change in Defect Structure Factor, $z$: −0.008

(e) Moles of chromium Substituted per Mole of Aluminum Removed, c/N: 1.75

EXAMPLE 12

Example 12 discloses the substitution of $Sn^{2+}$ in the framework of zeolite L and the resulting product was designated LZ-254.

Twenty-five gm (anhydrous weight) of ammonium exchanged zeolite L, NH$_4$+ zeolite L, containing 95.25 millimoles of Al were slurried in 200 ml distilled water heated at 75° C. 90 ml of a second solution containing 47.62 millimoles NH$_4$SnF$_3$ in distilled water was added incrementally to the zeolite slurry at a rate of 5 ml every 5 minutes. Following the addition of the tin solution, the temperature was raised to 95° C. and the slurry was digested for 3 hours at 95° C. The product was filtered and washed free of soluble fluoride. All of the filtrates were colorless. The solid product was yellow, contained 13.9 weight percent SnO and showed fair retention of X-ray crystallinity and excellent retention of McBain adsorption capacities. The molecular sieves denominated herein as LZ-254 have the characteristic crystal structure of zeolite L as indicated by an X-ray powder diffraction pattern having at least the d-spacings as set forth in Table O.

TABLE O

| LZ-254 Sn$^2$+ Substituted Zeolite L | |
|---|---|
| D(A) | Relative Intensity |
| 15.6–16.0 | vs |
| 5.9–6.1 | s |
| 5.7–5.9 | m |
| 4.5–4.7 | s |
| 4.3–4.5 | m |
| 4.2–4.4 | m |
| 3.8–4.0 | s |
| 3.56–3.76 | s |
| 3.38–3.58 | s |
| 3.18–3.38 | m |
| 3.08–3.28 | s |
| 2.97–3.17 | s |
| 2.81–3.01 | s |

The framework mole fractions of oxides are set forth below for the starting NH$_4$L and the LZ-254 product.

(a) Mole fractions of oxides (TO$_2$): Starting NH$_4$L: (Al$_{0.248}$Si$_{0.732}$ □$_{0.020}$)O$_2$ LZ-254 Product: (Al$_{0.210}$Sn$_{0.072}$Si$_{0.685}$□$_{0.033}$)O$_2$ (b) Mole Fraction of Aluminum Removed, N: 0.038

(c) Percent of Aluminum Removed, N/a×100: 15

(d) Change in Defect Structure Factor, $z$: 0.013

(e) Moles of chromium Substituted per Mole of Aluminum Removed, c/N: 1.89

A comparison of the Sn$^{2+}$ substituted product, LZ-254, with the starting zeolite L is shown in the following Table P.

TABLE P.

Summary of the Chemical Analyses and Properties of LZ-254 with the Starting NH$_4$+ zeolite LZ.

|  | Starting NH$_4$+L | Example 12 (LZ-254) |
|---|---|---|
| Chemical Analyses: | | |
| K$_2$O, wt. % | 3.51 | 2.72 |
| (NH$_4$)$_2$O, wt. % | 7.89 | 6.09 |
| Al$_2$O$_3$, wt. % | 19.42 | 15.54 |
| SnO, wt. % | — | 13.91 |
| SiO$_2$, wt. % | 67.80 | 59.67 |
| F$_2$, wt. % | — | 0.08 |
| SiO$_2$/Al$_2$O$_3$ | 5.92 | 6.52 |
| SiO$_2$/[Al$_2$O$_3$ + SnO/2] | 5.92 | 4.87 |
| M+/Al | 1.00 | 0.93 |
| X-Ray Crystallinity: | | |
| % by Area | 100 | 48 |
| % by Intensity | 100 | 49 |
| Framework Infrared: | | |
| Asym. Stretch, cm$^{-1}$: | 1028 | 1029 |
| Sym. Stretch, cm$^{-1}$: | 768 | 770 |
| Hydroxyl Region Infrared: | | |
| Absorb. @ 3710 cm$^{-1}$: | 0.048 | 0.078 |

TABLE P-continued

Summary of the Chemical Analyses and Properties of LZ-254 with the Starting NH$_4$+ zeolite LZ.

|  | Starting NH$_4$+L | Example 12 (LZ-254) |
|---|---|---|
| Defect Factor, z: | 0.020 | 0.033 |
| McBain Absorption Values: | | |
| wt. % O$_2$ @ 100 torr and 90K.: | 16.14 | 15.64 |
| wt. % H$_2$O @ 4.6 torr and 25° C.: | 17.97 | 15.15 |
| wt. % neopentane @ 500 torr & 25° C.: | — | 4.21 |
| wt. % SF$_6$ @ 400 torr and 25° C. | — | — |

EXAMPLE 13

The products of Example 10 (Sn$^{2+}$ substituted mordenite) and of Example 11 (Sn$^{2+}$ substituted zeolite LZ-202) were examined by Scanning Electron Microscopy and EDAX techniques. The LZ-252, Sn substituted mordenite, samples were examined with only carbon coating. The photographs shown in FIGS. 7A and 7B are typical and clearly show clean crystals with mordenite morphology. There is no evidence of any other phase present with the zeolite that could be construed as SnO or other tin containing material. FIG. 8A is the EDAX area scan of the crystals shown in FIG. 7A. FIG. 8B is the spot probe analysis of spot "B" in FIG. 7B. The similarity between the EDAX area scan and spot probe analyses indicate that the Sn is equally distributed over the entire zeolite and not found in isolated areas of the zeolite. Since the X-ray powder patterns did not show the presence of any extraneous crystalline phase, the SEM and EDAX are taken as supportive evidence for substitution of Sn for Al in the zeolite framework of mordenite. Further, the analytical evaluations derived from the EDAX analyses, which are compared to the chemical analysis of the elements in the product in the following Table, confirm the even distribution of the tin over the entire sample.

TABLE Q

|  | Chemical Analysis | EDAX Area Scan | EDAX Spot Probe* |
|---|---|---|---|
| Wt. % Al: | 5.37 | 5.1 | 5.6 |
| Wt. % Si: | 73.47 | 74.2 | 70.8 |
| Wt. % Sn: | 21.17 | 20.7 | 23.7 |

*Average of (4) spots on (4) separate crystals.

Figure 10B:
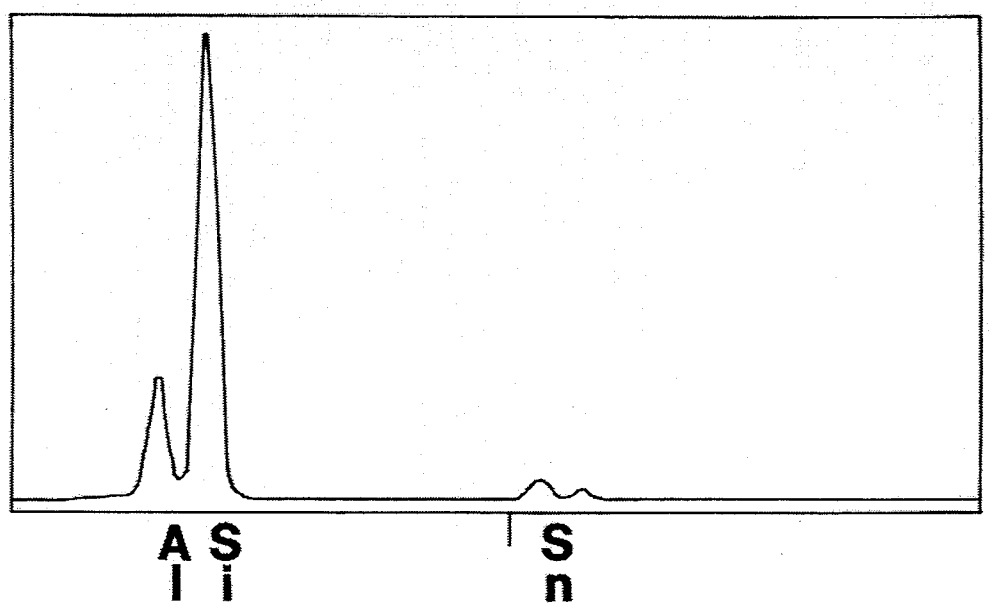
FIG. 10B is an EDAX (Energy Dispersive Analysis by X-ray) spot probe at point B in the photograph of FIG. 10A for zeolite LZ-253, (Example 11), as hereinafter discussed.
Figure 11A:
FIG. 11A is a SEM (Scanning Electron Microscope) photograph for zeolite LZ-253, (Example 11), as hereinafter discussed.
Figure 11B:
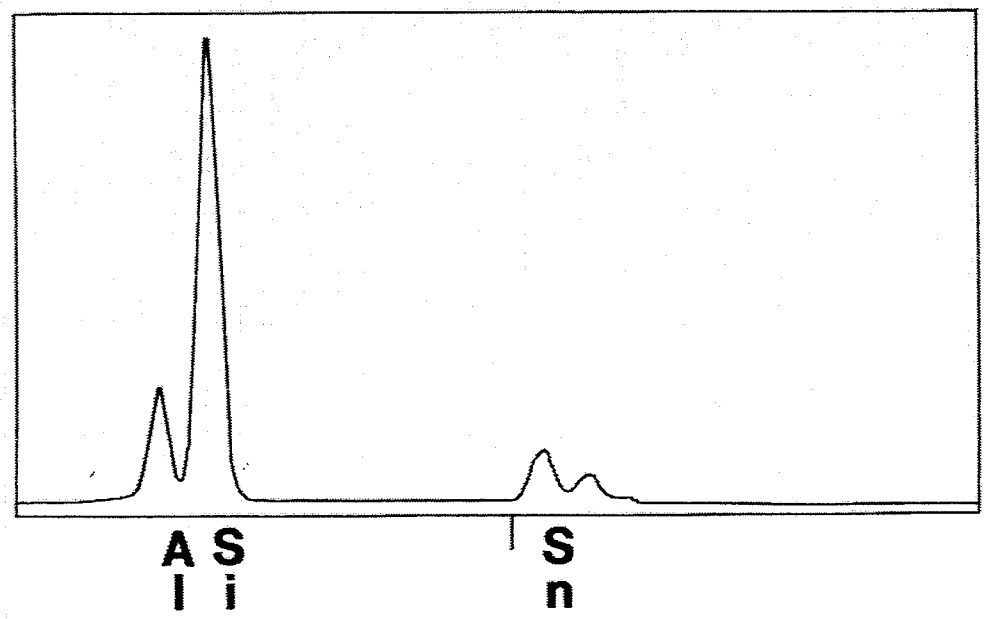
FIG. 11B is an EDAX (Energy Dispersive Analysis by X-ray) Area scan for the photograph of FIG. 11A for zeolite LZ-253, (Example 11), as hereinafter discussed.
Figure 12A:
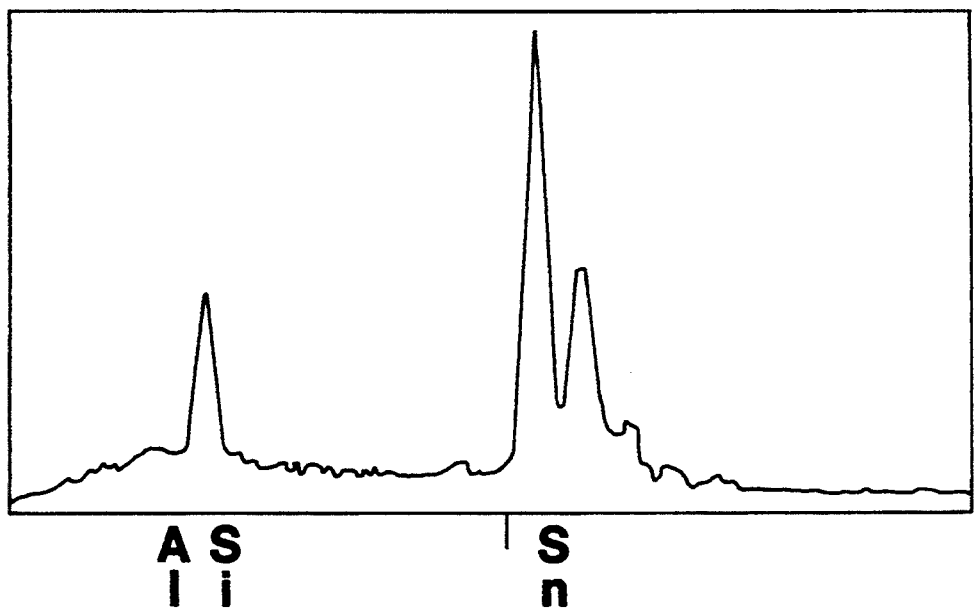
FIG. 12A is an EDAX (Energy Dispersive Analysis by X-ray) spot probe at point G in the photograph of FIG. 11A for zeolite LZ-253, (Example 11), as hereinafter discussed.
Figure 12B:
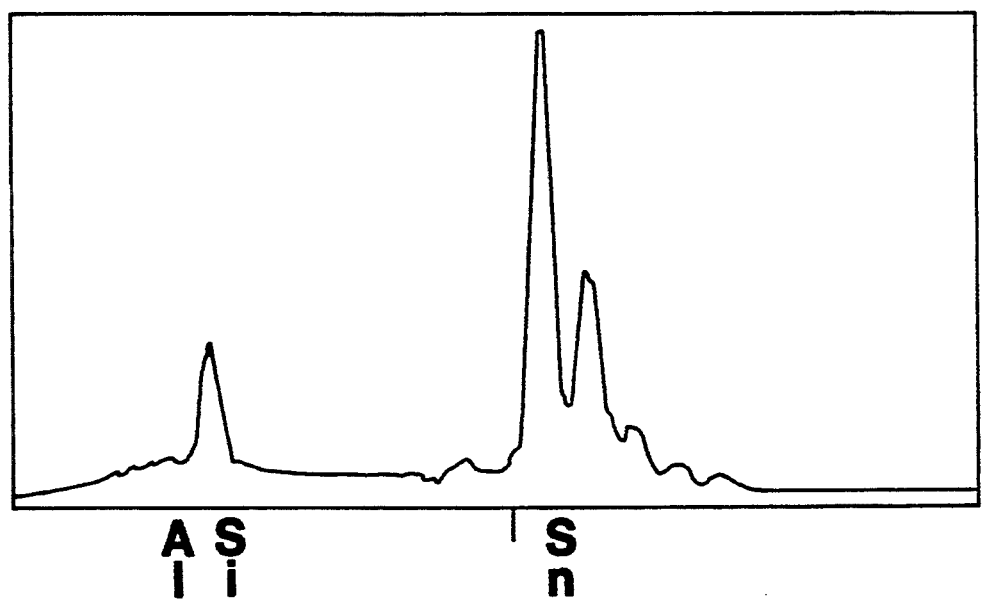
FIG. 12B is an EDAX (Energy Dispersive Analysis by X-ray) spot probe at point H in the photograph of FIG. 11A for zeolite LZ-253, (Example 11), as hereinafter discussed.

Evaluation of the LZ-253, Sn substituted NH$_4$+ zeolite LZ-202 samples are shown in FIGS. 9, 10A, 10B, 11A, 11B, 12A and 12B. A clump of zeolite crystals is shown in FIG. 9. The crystals are clean and free of any debris. The crystal morphology has the appearance of the untreated NH$_4$+ zeolite LZ-202. There is no apparent crystal degradation. FIGS. 10A and 10B show several small clumps of crystals and a typical spot probe analysis of the crystals showing the expected level of tin in the sample. FIGS. 11A and 11B show another clump of crystals of LZ-253 and an EDAX area scan covering the entire clump. Again the tin levels are as expected. Notice the strange particles at "G" and "H" in the photograph. Their morphology is obviously different from the zeolite clumps. The EDAX spot probes taken at points "G" and "H" are shown in FIGS. 12A and 12B. They are obviously tin, probably SnO, since the X-ray powder pattern had shown a trace amount of SnO in the background. The SEM and EDAX evidence is quite clear in differentiating the precipitated SnO from the LZ-253 and shows the presence of Sn in the zeolite crystals.

EXAMPLE 14

The products of Examples 6, 7, 10 and 11 were tested for n-butane cracking activity as hereinafter described and found to be active catalysts. The reactor was a cylindrical quartz tube 254 mm in length and 10.3 mm I.D. In each test the reactor was loaded with particles of the test product which were 20–40 mesh (U.S. std.) in size and in an amount of from 0.5–5 grams. The products were activated in-situ in the reactor for one hour in a stream of either flowing helium or flowing air at the temperature indicated in the following tables. The reaction feedstock was a helium-n-butane mixture containing 2 mole percent n-butane and was passed through the reactor at a rate of 50 cc/minute with the reactor temperature maintained at 500° C. Analysis of the feedstock and the reactor effluent was carried out using conventional gas chromatography techniques. The reactor effluent was analyzed after 10 minutes of on-stream operation. From the analytical data the pseudo-first-order rate constant (kA) was calculated. The results of those tests are shown in Tables R and S.

TABLE R

| Product | Ex. No. | Activation Temp. (°C.) | Consumption of n-butane (%) | % i-butane in product | KA* |
|---|---|---|---|---|---|
| $H_3O^+$ | — | 500, Helium | 84.2 | 2.2 | 81 |
| Zeolon | — | 600, Air | 76.0 | 2.0 | 107 |
| LZ-249 (Cr) | 6 | 500, Helium | 86.3 | 2.0 | 56 |
|  | 6 | 600, Air | 49.2 | 3.8 | 39 |
| LZ-252 (Sn) | 10 | 500, Helium | 40.1 | 1.9 | 14 |
|  | 10 | 600, Air | 29.1 | 3.8 | 19 |

*The lower the value for kA the lower the activity

TABLE S

| Product | Ex. No. | Activation Temp. (°C.) | Consumption of n-butane (%) | % i-butane in product | KA* |
|---|---|---|---|---|---|
| $NH_4^+$ | — | 500, Helium | 76.8 | 3.5 | 57 |
| LZ-202 | — | 500, Air | 82.1 | 4.1 | 71 |
| LZ-250 (Cr) | 7 | 500, Helium | 93.8 | 1.2 | 40 |
|  | 7 | 500, Air | 33.9 | 5.3 | 24 |
| LZ-253 (Sn) | 11 | 500, Helium | 47.1 | 2.3 | 14 |
|  | 11 | 500, Air | 74.5 | 2.7 | 52 |

*The lower the value for kA the lower the activity

EXAMPLE 15

The products of Examples 3, 8, 9 and 12 were tested for n-butane cracking activity as described in Example 14 and found to be active catalysts. The results of those tests are shown in Tables T and U.

TABLE T

| Product | Ex. No. | Activation Temp. (°C.) | Consumption of n-butane (%) | % i-butane in product | KA* |
|---|---|---|---|---|---|
| $NH_4^+$ | — | 500, Helium | — | — | 2 |
| Zeolite Y | — | 600, Air | — | 6.6 | 1 |
| LZ-239 (Cr) | 3 | 500, Helium | 33.6 | 4.5 | 24 |
|  | 3 | 500, Air | 11.5 | — | 6 |
| LZ-238 (Sn) | 9 | 500, Helium | 10.8 | 1.2 | 7 |
|  | 9 | 500, Air | 13.2 | 1.1 | 7 |

*The lower the value for kA the lower the activity

TABLE U

| Product | Ex. No. | Activation Temp. (°C.) | Consumption of n-butane (%) | % i-butane in product | KA* |
|---|---|---|---|---|---|
| $NH_4^+$ | — | 500, Helium | — | 6.5 | 3.4 |
| Zeolite L | — | 500, Air | — | 6.7 | 4.6 |
| LZ-251 (Cr) | 8 | 500, Helium | 12.7 | 5.6 | 8.1 |
| LZ-254 (Sn) | 12 | 500, Helium | 36.4 | 9.4 | 25.0 |

*The lower the value for kA the lower the activity

EXAMPLE 16

Twenty five gm. $H_3O^+$ mordenite, containing 0.0249 moles $Al_2O_3$, was slurried in 250 ml distilled water and heated at 75° C. A 100 ml. solution containing 0.0499 moles of $NH_4SnF_3$ in water was added in 5 ml. increments every 5 minutes. The amount of $Sn^{+2}$ added was sufficient to remove and replace 100% of the framework aluminum in the zeolite. The initial pH of the $H_3O^+$ mordenite was 4.11, which dropped to 3.56 during the addition of the $NH_4SnF_3$ solution, and was 3.59 at the end of the addition. Following the addition, the slurry was digested at 95° C. for 3 hours, filtered and washed free of soluble aluminum species and fluoride. The pH at the end of the digestion was 3.68. The resulting product was colorless and contained 12.28 wt.% SnO; the $SiO_2/Al_2O_3$ was 26.3, (the starting ratio of the $H_3O^+$ mordenite was 14.7). The product properties are compared to the starting $H_3O^+$ mordenite in the following Table V:

TABLE V

|  | Starting $H_3O^+$ mordenite | LZ-252 Product |
|---|---|---|
| $SiO_2/Al_2O_3$: | 14.69 | 26.31 |
| Cation Equivalent, $M^+/Al$: | 0.09 | 0.77 |
| Cation Equivalent, $M^+/(Al + 2Sn)$: | 0.09 | 0.27 |
| wt. % $Sn^{+2}$ as SnO: | 0 | 12.28 |
| wt. % fluoride: | 0 | 0.11 |
| X-ray Crystallinity, %: | 100 | 65 |
| Asym. Stretch, $cm^{-1}$: | 1080 | 1080 |
| Sym. Stretch, $cm^{-1}$: | 798 | 804 |
| McBain $O_2$, wt. %: | 19.0 | 15.0 |
| McBain $H_2O$, wt. %: | 14.8 | 11.3 |
| McBain neopentane, wt. %: | 4.4 | 1.4 |
| McBain $SF_6$, wt. %: | 9.1 | 3.6 |

The data in the above Table indicate that $Sn^{+2}$ has substituted into the zeolite framework, but there has been some loss in crystallinity as evidenced by the reduced adsorption capacities. Two samples of the $Sn^{+2}$ substituted sample described above were treated in the following manner. One sample was treated in 3.5M NaCl solution at 75° C. for two hours, filtered, washed and analyzed. The second sample was placed into 3.5M NaCl solution and titrated to pH 10 with 0.1N NaOH solution, filtered, washed and analyzed. The chemical analysis data for the two samples are shown below:

|  | NaCl Treated | Titrated with NaOH |
|---|---|---|
| $SiO_2/Al_2O_3$: | 23.87 | 24.96 |
| Cation Equivalent, $M^+/Al$: | 1.62 | 1.64 |
| Cation Equivalent, $M^+/(A + 2Sn)$: | 0.76 | 0.58 |

Ion exchange of the $Sn^{+2}$ substituted mordenite shows a substantial excess in cations relative to the amount of aluminum contained in the framework. This indicates that an additional species in the framework is negatively charged, thus requiring a cation. The only probable species is $Sn^{+2}$ in the framework.

EXAMPLE 17

Fifty gm. $H_3O^+$ mordenite, containing 0.0457 moles $Al_2O_3$, was slurried in 500 ml distilled water and heated at 75° C. A 200 ml. solution containing 0.0913 moles of $SnF_2$ and 0.0913 moles $NH_4HF_2$ in water was added continuously at a rate of 2 ml. per minute. The amount of $Sn^{+2}$ added was sufficient to remove and replace 100% of the framework aluminum in the zeolite. The initial pH of the $H_3O^+$ mordenite was 1.84, which increased to 2.77 at the end of the addition of the $SnF_2$ solution. Following the addition, the slurry was digested at 95° C. for 3 hours, filtered and washed free of soluble aluminum species and fluoride. The pH at the end of the digestion was 2.66. The resulting product was colorless and contained 6.39 wt. % SnO; the $SiO_2/Al_2O_3$ was 30.9, (the starting ratio of the $H_3O^+$ mordenite was 16.4). The product properties are compared to the starting $H_3O^+$ mordenite in the following Table W:

TABLE W

| | Starting $H_3O^+$ mordenite | LZ-252 Product |
|---|---|---|
| $SiO_2/Al_2O_3$: | 16.45 | 30.93 |
| Cation Equivalent, $M^+/Al$: | 0.08 | 0.73 |
| Cation Equivalent, $M^+/(Al + 2Sn)$: | 0.08 | 0.46 |
| wt. % $Sn^{+2}$ as SnO: | 0 | 6.39 |
| wt. % fluoride: | 0 | 0.07 |
| X-ray Crystallinity, %: | 100 | 88 |
| Asym. Stretch, $cm^{-1}$: | 1082 | 1094 |
| Sym. Stretch, $cm^{-1}$: | 797 | 810 |
| Absorbance at 3710 $cm^{-1}$: | 0.403 | 0.218 |
| "z" value: | 0.171 | 0.093 |
| McBain $O_2$, wt. %: | 19.6 | 16.4 |
| McBain $H_2O$, wt. %: | 15.2 | 10.1 |
| McBain neopentane, wt. %: | 5.2 | 1.2 |
| McBain $SF_6$, wt. %: | 11.4 | 0.6 |

The data in the above Table indicate that $Sn^{+2}$ has substituted into the zeolite framework, but there has been some apparent loss in crystallinity as evidenced by the reduced adsorption capacities. However, the X-ray crystallinity value for the substituted product remains high and the amount of defects in the structure are reduced compared to the starting $H_3O^+$ mordenite.

Four samples of the $Sn^{+2}$ substituted sample described above were treated in the following manner. One sample was titrated with 0.1N NaOH solution, filtered, washed and analyzed. A second sample was placed into 3.5M $NH_4Cl$ solution, filtered, washed and analyzed. A third sample was treated at pH 9.0 with $NH_4OH$ solution, filtered, washed and analyzed. A final sample was treated in 3.5M $CaCl_2$ solution, filtered, washed and analyzed. The chemical analysis data for the four samples are shown below:

| Treatment: | NaOH | $NH_4Cl$ | $NH_4OH$ | $CaCl_2$ |
|---|---|---|---|---|
| $SiO_2/Al_2O_3$: | 31.30 | 32.27 | 30.32 | 33.01 |
| Cat. Eq., $M^+/Al$: | 1.73 | 1.05 | 1.12 | 0.89 |
| Cat. Eq., $M^+/(Al + 2Sn)$: | 0.89 | 0.62 | 0.62 | 0.44 |

Ion exchange of the $Sn^{+2}$ substituted mordenite shows a substantial excess in cations relative to the amount of aluminum contained in the framework; particularly for the NaOH treated sample, while the Ca-exchanged sample did not exchange well. The increased ion exchange capacity indicates that $Sn^{+2}$ in the framework also requires a cation. It was noticed that as the pH of the exchange is increased, the ion exchange capacity increases as well. This indicates that the original cations balancing the negative charges on the $Sn^{+2}$ in the framework are protons. The protons are strongly held by the $Sn^{+2}$, making the material weakly acidic, thus requiring the higher pH to exchange the protons.

EXAMPLE 18

Fifty nine gm. $H_3O^+$ mordenite, containing 0.0539 moles $Al_2O_3$, was slurried in 500 ml distilled water and heated at 75° C. A 200 ml. solution containing 0.0913 moles of $SnF_2$ and 0.0915 moles $NH_4HF_2$ in water was added continuously at a rate of 2.5 ml. per minute. The amount of $Sn^{+2}$ added was sufficient to remove and replace 85% of the framework aluminum in the zeolite. The initial pH of the $H_3O^+$ mordenite was 2.68, which decreased to 2.27 at the end of the addition of the $SnF_2$ solution. Following the addition, the slurry was digested at 95° C. for 3 hours, filtered and washed free of soluble aluminum species and fluoride. The resulting product was colorless and contained 6.95 wt. % SnO; the $SiO_2/Al_2O_3$ was 31.0, (the starting ratio of the $H_3O^+$ mordenite was 16.4). The product properties are compared to the starting $H_3O^+$ mordenite in the following Table X:

TABLE X

| | Starting $H_3O^+$ mordenite | LZ-252 Product |
|---|---|---|
| $SiO_2/Al_2O_3$: | 16.45 | 31.03 |
| Cation Equivalent, $M^+/Al$: | 0.08 | 0.68 |
| Cation Equivalent, $M^+/(Al +0.08 +2Sn)$: | 0.39 | |
| wt. % $Sn^{+2}$ as SnO: | 0 | 6.95 |
| wt. % fluoride: | 0 | 0.07 |
| X-ray Crystallinity, %: | 100 | 83 |
| Asym. Stretch, $cm^{-1}$: | 1082 | 1086 |
| Sym. Stretch, $cm^{-1}$: | 797 | 806 |
| Absorbance at 3710 $cm^{-1}$: | 0.403 | 0.280 |
| "z" value: | 0.171 | 0.119 |

The data in the above Table indicate that $Sn^{+2}$ has substituted into the zeolite framework. The X-ray crystallinity value for the substituted product remains high and the amount of defects in the structure are reduced compared to the starting $H_3O^+$ mordenite.

Four samples of the $Sn^{+2}$ substituted sample described above were treated in the following manner. One sample was treated in 3.5M NaCl and titrated with 1.0N NaOH solution to pH 12, filtered, washed and analyzed. A second sample was placed into 3.5M KCl solution and titrated to pH 12 with 1.0 KOH, filtered, washed and analyzed. A third sample was treated at pH 10.0 with 10 N $NH_4OH$ solution, filtered, washed and analyzed. A final sample was treated in 3.5M $LaCl_3$ solution, filtered, washed and analyzed. The chemical analysis data for the four samples are shown below:

| Treatment: | NaOH | KOH | $NH_4OH$ | $LaCl_3$ |
|---|---|---|---|---|
| $SiO_2/Al_2O_3$: | 31.03 | 33.92 | 33.36 | 32.40 |
| Cat. Eq., $M^+/Al$: | 1.83 | 2.09 | 1.38 | 0.70 |
| Cat. Eq., $M^+/(Al + 2Sn)$: | 0.89 | 0.92 | 0.62 | 0.31 |

Ion exchange of the $Sn^{+2}$ substituted mordenite shows a substantial excess in cations relative to the amount of aluminum contained in the framework; particularly for the two samples titrated to pH 12. The La-exchanged sample did not exchange well, and the $NH_4^+$ exchanged only part of the $Sn^{+2}$ protons. As stated above, the increased ion exchange capacity indicates that $Sn^{+2}$ in the framework also requires a cation. Increased exchange capacity with increasing pH indicates that the original cations balancing the negative charges on the $Sn^{+2}$ in the framework are protons which are strongly held by the $Sn^{+2}$, making the material weakly acidic.

EXAMPLE 19

Five gm. $H_3O^+$ mordenite, containing 0.0062 moles $Al_2O_3$, was slurried in 100 ml distilled water and heated at 75° C. A 50 ml. solution containing 0.0061 moles of $SnF_4$ and 0.0061 moles of $NH_4HF_2$ in water was added in 5 ml. increments every 5 minutes. The amount of $Sn^{+4}$ added was sufficient to remove and replace 50% of the framework aluminum in the zeolite. The initial pH of the $H_3O^+$ mordenite was 2.09, which dropped to 1.98 during the addition of the $SnF_4$ solution, but was 2.1 at the end of the addition. Following the addition, the slurry was digested at 75° C. for 1 hour, filtered and washed free of soluble aluminum species and fluoride. The resulting product contained 16.34 wt. % $SnO_2$; the $SiO_2/Al_2O_3$ was 34.8, (the starting ratio of the $H_3O^+$ mordenite was 11.7); there was a small decrease in absorbance in the hydroxyl region of the infrared spectrum measured at 3710 cm$^{-1}$ attributed to hydrogen bonded OH groups in dealuminated sites. The data indicate substitution of $Sn^{+4}$ in framework tetrahedral sites. Comparison of the product properties with the starting $H_3O^+$ mordenite is shown in the following Table Y:

TABLE Y

|  | Starting $H_3O^+$ mordenite | LZ-252 Product |
|---|---|---|
| $SiO_2/Al_2O_3$: | 11.67 | 34.82 |
| Cation Equivalent, M$^+$/Al: | 0.06 | 0.56 |
| wt. % $Sn^{+4}$: | 0 | 16.34 |
| wt. % fluoride: | 0 | 0.24 |
| X-ray Crystallinity, %: | 100 | 62 |
| Asym. Stretch, cm$^{-1}$: | 1069 | 1084 |
| Sym. Stretch, cm$^{-1}$: | 796 | 810 |
| Absorbance at 3710 cm$^{-1}$: | 0.203 | 0.172 |
| "z" value: | 0.086 | 0.073 |
| McBain $O_2$, wt. %: | 19.7 | 171 |
| McBain $H_2O$, wt. %: | 16.3 | 9.5 |
| McBain neopentane, wt. %: | 6.1 | 3.3 |
| McBain $SF_6$, wt. %: | 12.3 | 7.9 |

The data in the above Table indicate that $Sn^{+4}$ has substituted into the zeolite framework, but there has been some loss in crystallinity as evidenced by the reduced adsorption capacities.

EXAMPLE 20

Ten gm. $NH_4Y$, containing 0.0215 moles of $Al_2O_3$ was slurried in 100 ml distilled $H_2O$ and heated at 75° C. A 25 ml. solution containing 0.0108 moles of $SnF_4$ and 0.0107 moles of $NH_4HF_2$ in water was added in 1.4 ml. increments approximately every 5 minutes. The amount of $Sn^{+4}$ added was sufficient to remove and replace 25% of the framework aluminum in the zeolite. The initial pH of the slurry at 75° C. was 4.35, which decreased to 4.21 during the addition and was 4.54 at the end of the addition. Following the addition, the slurry was digested for three hours at 95° C., filtered and washed free of soluble aluminum species and fluoride. The resulting product contained 14.56 wt. % $SnO_2$; the $SiO_2/Al_2O_3$ was 7.16 (the starting ratio of the $NH_4Y$ was 5.09). There was substitution of $Sn^{+4}$ and the sample was approximately 28% dealuminated. Comparison of the properties of the product zeolite with the starting $NH_4Y$ is shown in the following Table Z:

TABLE Z

|  | Starting $NH_4Y$ | Product Zeolite |
|---|---|---|
| $SiO_2/Al_2O_3$: | 5.09 | 7.16 |
| Cation Equivalent, M$^+$/Al: | 1.05 | 0.99 |
| wt. % $SnO_2$: | 0 | 14.56 |
| wt. % fluoride: | 0 | 0.14 |
| X-ray Crystallinity, %: | 100 | 40 |
| Asym. Stretch, cm$^{-1}$: | 1020 | 1032 |
| Sym. Stretch, cm$^{-1}$: | 786 | 791 |
| Absorbance at 3710 cm$^{-1}$: | 0.038 | 0.124 |
| "z" value: | 0.016 | 0.053 |
| McBain $O_2$, wt. %: | 32.1 | 23.5 |
| McBain $H_2O$, wt. %: | 29.4 | 22.1 |
| McBain neopentane, wt. %: | — | 10.2 |
| McBain $SF_6$, wt. %: | — | 17.5 |
| n-butane cracking, $k_A$: | 1.9 | 2.0 |

The data indicate that $Sn^{+4}$ is substituted into the tetrahedral sites in the framework. The low $k_A$ value for the product in butane cracking is consistent with this conclusion, since $SnO_2$ deposited in the pores of the zeolite would show severe cracking activity due to presence of accessible Sn ions.

EXAMPLE 21

Five gm. $NH_4$-L zeolite, containing 0.0095 moles $Al_2O_3$, was slurried in 100 ml distilled water and heated at 75° C. A 50 ml. solution containing 0.0095 moles of $SnF_4$ and 0.0095 moles of $NH_4HF_2$ in water was added in 5 ml. increments every 5 minutes. The amount of $Sn^{+4}$ added was sufficient to remove and replace 50% of the framework aluminum in the zeolite. The initial pH of the $NH_4$-L slurry was 6.55, which dropped to 2.38 during the addition of the $SnF_4$ solution, and was 2.38 at the end of the addition. Following the addition, the slurry was digested at 75° C. for 1 hour, filtered and washed free of soluble aluminum species and fluoride. The pH at the end of the digestion was 2.93. The resulting product contained 17.04 wt. % Sn measured as $SnO_2$; the $SiO_2/Al_2O_3$ was 8.45, (the starting ratio of the $NH_4$-L was 5.92). There was an increase in absorbance in the hydroxyl region of the infrared spectrum measured at 3710 cm$^{-1}$ attributed to hydrogen bonded OH groups in dealuminated sites. However, the measured amount of defects in the structure were insufficient to account for the amount of dealumination. The data indicate substitution of $Sn^{+4}$ in framework tetrahedral sites. Comparison of the product properties with the starting $NH_4$-L is shown in the following Table A1:

TABLE A1

|  | Starting $NH_4$-L | LZ-273 Product |
|---|---|---|
| $SiO_2/Al_2O_3$: | 5.92 | 8.45 |
| Cation Equivalent, M$^+$/Al: | 0.99 | 1.00 |
| wt. % $Sn^{+4}$: | 0 | 17.04 |
| wt. % fluoride: | 0 | 0.34 |
| X-ray Crystallinity, %: | 100 | 40 |
| Asym. Stretch, cm$^{-1}$: | 1028 | 1032 |
| Sym. Stretch, cm$^{-1}$: | 770 | 771 |
| Absorbance at 3710 cm$^{-1}$: | 0.078 | 0.220 |
| "z" value: | 0.033 | 0.093 |
| McBain $O_2$, wt. %: | 16.2 | 16.6 |

TABLE A1-continued

| | Starting NH$_4$-L | LZ-273 Product |
|---|---|---|
| McBain H$_2$O, wt. %: | 18.0 | 15.3 |
| McBain neopentane, wt. %: | — | 7.9 |
| McBain SF$_6$, wt. %: | — | 11.8 |
| n-butane cracking, k$_A$: | 1.3 | 2.9 |

The data in the above Table indicate that Sn$^{+4}$ has substituted into the zeolite framework. Loss of structure as evidenced by the reduced X-ray crystallinity values can be explained by the incorporation of the larger Sn$^{+4}$ ion into the zeolite framework and by fluorescence of that ion. A more accurate indication of crystal retention is evidenced by the retention of adsorption capacities, which show that both void volume and pore size have been maintained, despite incorporation of 17 wt. % of SnO$_2$ into the zeolite. The n-butane cracking activity value, k$_A$ has also increased.

EXAMPLE 22

Ten gm. NH$_4$L, containing 0.0190 moles of Al$_2$O$_3$ was slurried in 100 ml distilled H$_2$O and heated at 75° C. A 25 ml. solution containing 0.0025 moles of SnF$_4$ and 0.0025 moles of NH$_4$HF$_2$ in water was added in 1 ml. increments every 5 minutes. The amount of Sn$^{+4}$ added was sufficient to remove and replace 7% of the framework aluminum in the zeolite. The initial pH of the slurry at 75° C. was 5.73, which decreased to 2.98 during the addition and was 2.98 at the end of the addition. Following the addition, the slurry was digested for 1 hour at 75° C., filtered and washed free of soluble aluminum species and fluoride. The resulting product contained 3.44 wt. % Sn measured as SnO$_2$; the SiO$_2$/Al$_2$O$_3$ was 6.95 (the starting ratio of the NH$_4$L was 5.92). Comparison of the properties of the product zeolite with the starting NH$_4$L is shown in the following Table A2:

TABLE A2

| | Starting NH$_4$-L | LZ-273 Product |
|---|---|---|
| SiO$_2$/Al$_2$O$_3$: | 5.92 | 6.95 |
| Cation Equivalent, M$^+$/Al: | 0.99 | 0.95 |
| wt. % SnO$_2$: | 0 | 3.44 |
| wt. % fluoride: | 0 | 0.05 |
| X-ray Crystallinity, %: | 100 | 91 |
| Asym. Stretch, cm$^{-1}$: | 1028 | 1029 |
| Sym. Stretch, cm$^{-1}$: | 770 | 769 |
| Absorbance at 3710 cm$^{-1}$: | 0.078 | 0.080 |
| "z" value: | 0.033 | 0.034 |
| McBain O$_2$, wt. %: | 16.2 | 17.2 |
| McBain H$_2$O, wt. %: | 18.0 | 17.1 |
| McBain neopentane, wt. %: | — | 2.7 |
| McBain SF$_6$, wt. %: | — | 4.3 |
| n-butane cracking, k$_A$: | 1.3 | 2.7 |

The data indicate that Sn$^{+4}$ is substituted into the tetrahedral sites in the framework.

EXAMPLE 23

250 gm. NH$_4$-L zeolite, containing 0.4455 moles Al$_2$O$_3$, was slurried in 2.5 liters distilled water and heated at 75° C. A 250 ml. solution containing 0.0632 moles of SnF$_4$ and 0.0633 moles of NH$_4$HF$_2$ in water was added at a constant rate of 5 ml. every 5 minutes by means of a peristaltic pump. The amount of Sn$^{+4}$ added was sufficient to remove and replace 7% of the framework aluminum in the zeolite. The initial pH of the NH$_4$-L slurry was 7.93. Following addition of the SnF$_4$ solution, the pH was 3.59. The slurry was digested at 75° C. for 1 hour, filtered and washed free of soluble aluminum species and fluoride. The pH at the end of the digestion was 3.75. The resulting product contained 3.19 wt. % Sn measured as SnO$_2$; the SiO$_2$/Al$_2$O$_3$ was 6.95, (the starting ratio of the NH$_4$-L was 6.74). There was a small increase in absorbance in the hydroxyl region of the infrared spectrum measured at 3710 cm$^{-1}$ attributed to hydrogen bonded OH groups in dealuminated sites. However, the measured amount of defects in the structure were insufficient to account for the amount of dealumination. The data indicate substitution of Sn$^{+4}$ in framework tetrahedral sites. Comparison of the product properties with the starting NH$_4$-L is shown in the following Table A3:

TABLE A3

| | Starting NH$_4$-L | LZ-273 Product |
|---|---|---|
| SiO$_2$/Al$_2$O$_3$: | 6.74 | 6.95 |
| Cation Equivalent, M$^+$/Al: | 0.98 | 0.95 |
| wt. % Sn$^{+4}$: | 0 | 3.19 |
| wt. % fluoride: | 0 | 0.08 |
| X-ray Crystallinity, %: | 100 | 84 |
| Asym. Stretch, cm$^{-1}$: | 1033 | 1032 |
| Sym. Stretch, cm$^{-1}$: | 772 | 773 |
| Absorbance at 3710 cm$^{-1}$: | 0.058 | 0.082 |
| "z" value: | 0.025 | 0.035 |
| McBain O$_2$, wt. %: | 16.4 | 16.5 |
| McBain H$_2$O, wt. %: | 17.1 | 16.2 |
| McBain neopentane, wt. %: | 6.3 | 6.7 |
| McBain SF$_6$, wt. %: | 13.8 | 13.3 |
| n-butane cracking, k$_A$: | 3.4 | 3.6 |

The data in the above Table indicate that Sn$^{+4}$ has substituted into the zeolite framework.

EXAMPLE 24

250 gm. NH$_4$-L zeolite, containing 0.4455 moles Al$_2$O$_3$, was slurried in 2.5 liters distilled water and heated at 75° C. A 250 ml. solution containing 0.0105 moles of SnF$_4$ and 0.0106 moles of NH$_4$HF$_2$ in water was added at a constant rate of 1.4 ml. every 5 minutes by means of a peristaltic pump. The amount of Sn$^{+4}$ added was sufficient to remove and replace 1.2% of the framework aluminum in the zeolite. The initial pH of the NH$_4$-L slurry was 7.98. Following addition of the SnF$_4$ solution, the pH was 4.12. The slurry was digested at 75° C. for 1 hour, filtered and washed free of soluble aluminum species and fluoride. The pH at the end of the digestion was 4.49. The resulting product contained 0.78 wt. % Sn measured as SnO$_2$; the SiO$_2$/Al$_2$O$_3$ was 6.56, (the starting ratio of the NH$_4$-L was 6.74). There was no change in absorbance in the hydroxyl region of the infrared spectrum measured at 3710 cm$^{-1}$ attributed to hydrogen bonded OH groups in dealuminated sites. The data indicate substitution of Sn$^{+4}$ in framework tetrahedral sites. Comparison of the product properties with the starting NH$_4$-L is shown in the following Table A4:

TABLE A4

| | Starting NH$_4$-L | LZ-273 Product |
|---|---|---|
| SiO$_2$/Al$_2$O$_3$: | 6.74 | 6.56 |
| Cation Equivalent, M$^+$/Al: | 0.98 | 0.93 |
| wt. % Sn$^{+4}$: | 0 | 0.78 |
| wt. % fluoride: | 0 | 0.01 |
| X-ray Crystallinity, %: | 100 | 93 |
| Asym. Stretch, cm$^{-1}$: | 1033 | 1002 |
| Sym. Stretch, cm$^{-1}$: | 772 | 774 |
| Absorbance at 3710 cm$^{-1}$: | 0.058 | 0.058 |
| "z" value: | 0.025 | 0.025 |
| McBain O$_2$, wt. %: | 16.4 | 16.8 |
| McBain H$_2$O, wt. %: | 17.1 | 17.0 |
| McBain neopentane, wt. %: | 6.3 | 6.6 |

TABLE A4-continued

| | Starting NH4-L | LZ-273 Product |
|---|---|---|
| McBain SF6, wt. %: | 13.8 | 13.6 |
| n-butane cracking, $k_A$: | 3.4 | 2.8 |

The data in the above Table indicate that $Sn^{+4}$ has substituted into the zeolite framework.

EXAMPLE 25

The process of U.S. Pat. No. 4,933,161 was used to prepare a $Sn^{+2}$ containing zeolite as follows. To a Teflon TM lined Parr Bomb (23 mole capacity) there were added 0.62 gm HCl, and 3.7 g of $SnCl_2.2H_2O$. The crystals did not dissolve well. To this mixture there was added 2.0 g of the ammonium form of zeolite Y (anhydrous weight). The Teflon TM liner was closed, placed in the stainless steel bomb and heated in a 145° C. oven for 2 days. The reactor was removed from the oven, cooled and the product washed with warm deionized water. The dried product was characterized by standard analytical techniques and compared with the starting zeolite and LZ-238 (from Example 9). The data are compared in Table A5.

TABLE A5

| | Starting NH4Y (Ex. 9) | Example 1 of '161 Ref. | LZ-238 (Ex. 9) |
|---|---|---|---|
| X-Ray, % by Area | 100 | 10 | 30 |
| Unit Cell $a_O$ | 24.71 | 24.65 | 24.54 |
| Chemical Composition: | | | |
| Na2O, wt. % | 2.3 | 0.5 | 1.8 |
| (NH4)2O, wt. % | 9.9 | <0.1 | 5.0 |
| Al2O3, wt. % | 21.8 | 12.8 | 15.0 |
| Total Sn, (as wt. % SnO2) | — | 13.8 | 22.7 |
| SiO2, wt. % | 65.2 | 72.4 | 53.6 |
| SiO2/Al2O3 | 5.08 | 9.63 | 6.07 |
| M+/Al | 1.07 | 0.07 | 0.85 |
| Framework Infrared | | | |
| Asymmetric Stretch, $cm^{-1}$ | 1019 | 1090 | 1027 |
| Symmetric Stretch, $cm^{-1}$ | 787 | 795 | 792 |
| McBain Adsorption Capacity | | | |
| wt. % O2 @ 90K, 100 torr | 32.70 | 9.50 | 23.54 |

The above table shows that LZ-238, which is prepared by the Secondary Syntehsis process, has properties substantially different from the material produced by the procedure of Example 1 of U.S. Pat. No. 4,933,161. Zeolite Y products, treated by the process of the Patent Example 1 are substantially destroyed. Zeolite LZ-238, which is prepared by the Secondary Syntehsis Process, is essentially intact and highly crystalline, despite containing 50% more $Sn^{2+}$ than that found in the product of the '161 patent.

While the large Sn atom is a heavy scatterer in x-ray crystallinity measurements causing apparent substantial x-ray crystallinity loss, O2 adsorption capacity measurements show maintenance of high capacity for LZ-238 (>70%), while the zeolite prepared by the procedure of the '161 patent has lost most of its adsorption capacity (<30%). In this case, O2 adsorption capacity is a better measure of crystallinity than is an x-ray powder pattern.

Additionally, the cation equivalency of LZ-238 is 0.85 while that of the product of the '161 patent is 0.07 showing that it has lost virtually all of its framework aluminum.

EXAMPLE 26

The process of U.S. Pat. No. 4,933,161 was used to prepare a $Sn^{+4}$ containing zeolite. To a Teflon TM liner of a 23 mL Parr Bomb there were added 5.6 g of $SnCl_4.5H_2O$ and 1.0 g of distilled water. The crystals dissolved well. To this solution there were added a 2.0 g (anhydrous weight) of the ammonium form of zeolite Y. The Teflon TM liner was closed, placed in the stainless steel bomb and heated in a 160° C. oven for 2 days. The reactor was removed from the oven, cooled and the product washed with warm deionized water. The dried product was characterized by standard analytical techniques and compared with the starting ammonium Y zeolite and LZ-275 ($Sn^{+4}$ substituted NH4-Y zeolite) and the results presented in Table A6.

TABLE A6

| | NH4Y | Example 2 of '161 Ref. | LZ-275 |
|---|---|---|---|
| X-Ray, % by Area | 100 | 0 | 40 |
| Unit Cell $a_O$ | 24.71 | — | 24.70 |
| Chemical Composition: | | | |
| Na2O, wt. % | 2.3 | 0.1 | 1.8 |
| (NH4)2O, wt. % | 9.9 | <0.1 | 5.9 |
| Al2O3, wt. % | 21.8 | 7.7 | 14.7 |
| Total Sn, (as wt. % SnO2) | — | 8.0 | 14.6 |
| SiO2, wt. % | 65.2 | 79.5 | 62.0 |
| SiO2/Al2O3 | 5.08 | 17.62 | 7.16 |
| M+/Al | 1.07 | 0.02 | 0.99 |
| Framework Infrared | | | |
| Asymmetric Stretch, $cm^{-1}$ | 1019 | 1097 | 1032 |
| Symmetric Stretch, $cm^{-1}$ | 787 | 800 | 791 |
| McBain Adsorption Capacity | | | |
| wt. % O2 @ 90K, 100 torr | 32.70 | 0.0 | 23.48 |

The above table shows that LZ-275, which is prepared by the Secondary Synthesis process, has properties substantially different from the material produced by the procedure of Example 2 of U.S. Pat. No. 4,933,161. Zeolite Y products, treated by the process of the '161 patent (Example 2) are totally destroyed. Zeolite LZ-275, which is prepared by the Secondary Synthesis Process, is essentially intact and highly crystalline, despite containing nearly twice the $Sn^{4+}$ content of that found in the product of the '161 patent.

While the large Sn atom is a heavy scatterer in x-ray crystallinity measurements causing apparent substantial x-ray crystallinity loss, O2 adsorption capacity measurements show maintenance of high capacity for LZ-275 (>70%), while the zeolite prepared by the procedure of Patent Example 2 has lost all of its adsorption capacity (0% retention). In this case, O2, adsorption capacity is a better measure of crystallinity than is an x-ray powder pattern.

In addition, cation equivalent of LZ-275 is totally maintained, while the product prepared by the process of the '161 patent (Example 2) is totally lost (M+/Al=0.99 for LZ-275 vs M+/Al=0.02 for the product of Example 2).

PROCESS APPLICATIONS

The molecular sieves compositions of this invention have unique surface characteristics making them useful as molecular sieves and as catalyst or as bases for catalysts in a variety of separation, hydrocarbon conversion and oxidative combustion processes. These composition can be impregnated or otherwise associated with catalytically active metals by the numerous methods known in the art and used, for example, in fabricating catalysts compositions containing alumina or aluminosilicate materials.

The instant molecular sieve compositions may be employed for separating molecular species in admixture with molecular species of a different degree of polarity or having different kinetic diameters by contacting such mixtures with a molecular sieve composition having pore diameters large enough to adsorb at least one but not all molecular species of the mixture based on the polarity of the adsorbed molecular species and/or its kinetic diameter. When the instant compositions are employed for such separation processes the compositions are at least partially activated whereby some molecular species selectively enter the intracrystalline pore system thereof.

The hydrocarbon conversion reactions which may be catalyzed by the instant molecular sieve compositions include; cracking, hydrocracking; alkylation of both the aromatic and isoparaffin types; isomerization (including xylene isomerization); polymerization; reforming; hydrogenation; dehydrogenation; transalkylation; dealkylation; and hydration.

When catalyst composition containing the instant molecular sieve compositions also contains a hydrogenation promoter, such promoter may be platinum, palladium, tungsten, nickel or molybdenum and may be used to treat various petroleum stocks including heavy petroleum residual stocks, cyclic stocks and other hydrocrackable charge stocks. These stocks can be hydrocracked at temperatures in the range of between about 400 F. and about 825 F. using molar ratios of hydrogen to hydrocarbon in the range of between about 2 and about 80, pressures between about 10 and about 3500 p.s.i.g., and a liquid hourly space velocity (LHSV) of between about 0.1 and about 20, preferably between about 1.0 and about 10.

Catalyst compositions containing the instant molecular sieve compositions may also be employed in reforming processes in which the hydrocarbon feedstocks contact the catalyst at temperatures between about 700 F. and about 1000 F., hydrogen pressures of between about 100 and about 500 p.s.i.g., LHSV values in the range between about 0.1 and about 10 and hydrogen to hydrocarbon molar ratios in the range between about 1 and about 20, preferably between about 4 and about 12.

Further, catalysts containing the instant molecular sieve compositions which also contain hydrogenation promoters, are also useful in hydroisomerization processes wherein the feedstock(s), such as normal paraffins, is converted to saturated branched-chain isomers. Hydroisomerization processes are typically carried out at a temperature between about 200 F. and about 600 F., preferably between about 300 F. and about 550 F. with an LHSV value between about 0.2 and about 1.0. Hydrogen is typically supplied to the reactor in admixture with the hydrocarbon feedstock in molar proportions of hydrogen to the feedstock of between about 1 and about 5.

Catalyst compositions similar to those employed for hydrocracking and hydroisomerization may also be employed at between about 650 F. and about 1000 F., preferably between about 850 F. and about 950 F. and usually at somewhat lower pressures within the range between about 15 and about 50 p.s.i.g. for the hydroisomerization of normal paraffins. Preferably the paraffin feedstock comprises normal paraffins having a carbon number range of $C_7$-$C_{20}$. The contact time between the feedstock and the catalyst is generally relatively short to avoid undesirable side reactions such as olefin polymerization and paraffin cracking. LHSV values in the range between about 0.1 and about 10, preferably between about 1.0 and about 6.0 are suitable.

The low alkali metal content of the instant compositions make them particularly well suited for use in the conversion of alkylaromatic compounds, particularly for use in the catalytic disproportionation of toluene, xylene, trimethylbenzenes, tetramethylbenzenes and the like. In such disproportionation processes it has been observed that isomerization and transalkylation can also occur. The catalysts containing the instant molecular sieve compositions and employed for such processes will typically include Group VIII noble metal adjuvants alone or in conjunction with Group VI-B metals such as tungsten, molybdenum and chromium which are preferably included in such catalyst compositions in amounts between about 3 and about 15 weight-percent of the overall catalyst composition. Extraneous hydrogen can, but need not be present in the reaction zone which is maintained at a temperature between about 400 and about 750 F., pressures in the range between about 100 and about 2000 p.s.i.g. and LHSV values in the range between about 0.1 and about 15.

Catalysts containing the instant molecular sieve compositions may be employed in catalytic cracking processes wherein such are preferably employed with feedstocks such as gas oils, heavy naphthas, deasphalted crude oil residues etc. with gasoline being the principal desired product. Temperature conditions are typically between about 850 and about 1100 F., LHSV values between about 0.5 and about 10 pressure conditions are between about 0 p.s.i.g. and about 50 p.s.i.g.

Catalysts containing the instant molecular sieve compositions may be employed for dehydrocyclization reactions which employ paraffinic hydrocarbon feedstocks, preferably normal paraffins having more than 6 carbon atoms, to form benzene, xylenes, toluene and the like. Dehydrocyclization processes are typically carried out using reaction conditions similar to those employed for catalytic cracking. For such processes it is preferred to use a Group VIII non-noble metal cation such as cobalt and nickel in conjunction with the molecular sieve composition.

Catalysts containing the instant molecular sieve compositions may be employed in catalytic dealkylation where paraffinic side chains are cleaved from aromatic nuclei without substantially hydrogenating the ring structure at relatively high temperatures in the range between about 800 F. and about 1000 F. at moderate hydrogen pressures between about 300 and about 1000 p.s.i.g. with other conditions being similar to those described above for catalytic hydrocracking. Catalysts employed for catalytic dealkylation are of the same type described above in connection with catalytic dehydrocyclization. Particularly desirable dealkylation reactions contemplated herein include the conversion of methylnaphthalene to naphthalene and toluene and/or xylenes to benzene.

Catalysts containing the instant molecular sieve compositions may be used in catalytic hydrofining wherein the primary objective is to provide for the selective hydrodecomposition of organic sulfur and/or nitrogen compounds without substantially affecting hydrocarbon molecules present therewith. For this purpose it is preferred to employ the same general conditions described above for catalytic hydrocracking. The catalysts are the same typically of the same general nature as described in connection with dehydrocyclization operations. Feedstocks commonly employed for catalytic hydroforming include: gasoline fractions; kerosenes; jet fuel fractions; diesel fractions; light and heavy gas oils; deasphalted crude oil residua; and the like. The feedstock may contain up to about 5 weight-percent of sulfur and up to about 3 weight-percent of nitrogen.

Catalysts containing the instant molecular sieve compositions may be employed for isomerization processes under conditions similar to those described above for reforming although isomerization processes tend to require somewhat more acidic catalysts than those employed in reforming processes. Olefins are preferably isomerized at temperatures between about 500 F. and about 900 F., while paraffins, naphthenes and alkyl aromatics are isomerized at temperatures between about 700 F. and about 1000 F. Particularly desirable isomerization reactions contemplated herein include the conversion of n-heptane and/or n-octane to isoheptanes, iso-octanes, butane to iso-butane, methylcyclopentane to cyclohexane, metaoxylene and/or ortho-xylene to para-xylene, 1-butene to 2-butene and/or isobutene, n-hexene to isohexane, cyclohexane to methylcyclopentene etc. The preferred cation form is a combination of a molecular sieve of this invention and polyvalent metal compounds (such as sulfides) of metals of Group II-A, Group II-B and rare earth metals. For alkylation and dealkylation processes the instant molecular sieve compositions having pores of at least 5 are preferred. When employed for dealkylation of alkyl aromatics, the temperature is usually at least 350 F. and ranges up to a temperature at which substantial cracking of the feedstock or conversion products occurs, generally up to about 700 F. The temperature is preferably at least 450 F. and not greater than the critical temperature of the compound undergoing dealkylation.

Pressure conditions are applied to retain at least the aromatic feed in the liquid state. For alkylation the temperature can be as low as 250 F. but is preferably at least 350 F. In alkylation of benzene, toluene and xylene, the preferred alkylation agents are olefins such as ethylene and propylene.

The molecular sieve compositions of this invention may be employed in conventional molecular sieving processes as heretofore have been carried out using aluminosilicate, aluminophosphate or other commonly employed molecular sieves. The instant compositions are preferably activated, e.g. calcined in air or nitrogen, prior to their use in a molecular sieve process.

The molecular sieve compositions of this invention are also useful as adsorbents and are capable of separating mixtures of molecular species both on the basis of molecular size (kinetic diameters) and based on the degree of polarity of the molecular species. When the separation of molecular species is based upon selective adsorption based on molecular size, the instant molecular sieve composition is chosen in view of the dimensions of its pores such that at least the smallest molecular species of the mixture can enter the intracrystalline void space while at least the largest species is excluded. When the separation is based on degree of polarity it is generally the case that the more hydrophilic molecular sieve composition will preferentially adsorb the more polar molecular species of a mixture having different degrees of polarity even though both molecular species can communicate with the pore system of the molecular sieve composition.

We claim as our invention:

1. A process for preparing a molecular sieve having a three dimensional microporous framework structure which has a unit empirical formula on an anhydrous basis of:

where "w", "x", and "y" are the mole fractions of tin, aluminum and silicon, respectively, present as framework tetrahedral oxide units, said mole fractions being such that they are within the trigonal area defined by points A, B, and C of FIG. 13, which points have the following values of w, x and y:

| Point | w    | x    | y    |
|-------|------|------|------|
| A     | 0.49 | 0.01 | 0.50 |
| B     | 0.01 | 0.49 | 0.50 |
| C     | 0.01 | 0.01 | 0.98 | said molecular sieve characterized in that it has a cation equivalency of at least about 0.8 and an oxygen adsorption capacity of at least 70% of its theoretical capacity as measured at 100 torr and 90° K. the process comprising contacting a crystalline microporous aluminosilicate zeolite having a framework structure of aluminum and silicon tetrahedral oxide units, pore diameters of at least about 3 Angstroms and a molar ratio of $SiO_2/Al_2O_3$ of at least 2, with a fluoro salt of tin, said fluoro salt being in the form of an aqueous solution or slurry, at a pH of about 3 to about 7, whereby framework aluminum atoms of the zeolite are removed and replaced by extraneous tin atoms.

2. The process of claim 1 where the crystalline microporous aluminosilicate zeolite is at least 50 percent in an ammonium or hydronium cationic form.

3. The process of claim 1 where the crystalline microporous aluminosilicate zeolite is at least 85 percent in an ammonium or hydronium cationic form.

4. The process according to claim 1 where the crystalline microporous aluminosilicate zeolite is selected from the group consisting at least one of zeolite Y, zeolite L, mordenite or zeolite LZ-202.

* * * * *